(12) United States Patent
Browne et al.

(10) Patent No.: US 11,841,789 B2
(45) Date of Patent: Dec. 12, 2023

(54) VISUAL AIDS FOR DEBUGGING

(71) Applicant: Microsoft Technology Licensing, LLC, Redmond, WA (US)

(72) Inventors: Keen McEwan Browne, Berkeley, CA (US); Shane Arney, Richmond, CA (US); Clara Emma Kliman-Silver, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1154 days.

(21) Appl. No.: 16/104,062

(22) Filed: Aug. 16, 2018

(65) Prior Publication Data

US 2018/0357152 A1 Dec. 13, 2018

Related U.S. Application Data

(63) Continuation-in-part of application No. 15/417,086, filed on Jan. 26, 2017, now Pat. No. 10,803,401.

(60) Provisional application No. 62/555,584, filed on Sep. 7, 2017, provisional application No. 62/547,339, filed on Aug. 18, 2017, provisional application No. 62/287,861, filed on Jan. 27, 2016.

(51) Int. Cl.
*G06F 11/00* (2006.01)
*G06F 11/36* (2006.01)
(Continued)

(52) U.S. Cl.
CPC ........ *G06F 11/3664* (2013.01); *G06F 3/0481* (2013.01); *G06F 9/46* (2013.01);
(Continued)

(58) Field of Classification Search
CPC ............. G06F 11/3664; G06F 11/3688; G06F 11/3692; G06K 9/6256
See application file for complete search history.

(56) References Cited

U.S. PATENT DOCUMENTS 5,581,662 A 12/1996 Furuta et al.
5,619,618 A 4/1997 Bigus
(Continued)

FOREIGN PATENT DOCUMENTS

AU 2001251476 A8 10/2001
CN 101645083 A 2/2010
(Continued)

OTHER PUBLICATIONS

"Summons to Attend Oral Proceedings Issued in European Patent Application No. 17745030.1", dated Feb. 25, 2022, 6 Pages.
(Continued)

*Primary Examiner* — Joshua P Lottich
(74) *Attorney, Agent, or Firm* — Alleman Hall Creasman & Tuttle LLP

(57) ABSTRACT

An AI engine is disclosed that is configured to work with a graphical user interface ("GUI") including, in some embodiments, one or more AI-engine modules and a visual debugging module of the GUI. A learner AI-engine module is configured to train one or more AI models on one or more concepts of a mental model defined in a pedagogical programming language. An instructor AI-engine module is configured to coordinate with one or more simulators for respectively training the one or more AI models on the mental model. The visual debugging module is configured to provide a visualization window for each AI model while the one or more AI models are at least training with the learner module respectively in the one or more simulators. A viewer can glean insight and explainability into the training of the AI models while the simulations are running and arriving at various states.

20 Claims, 24 Drawing Sheets

Figure 1A:
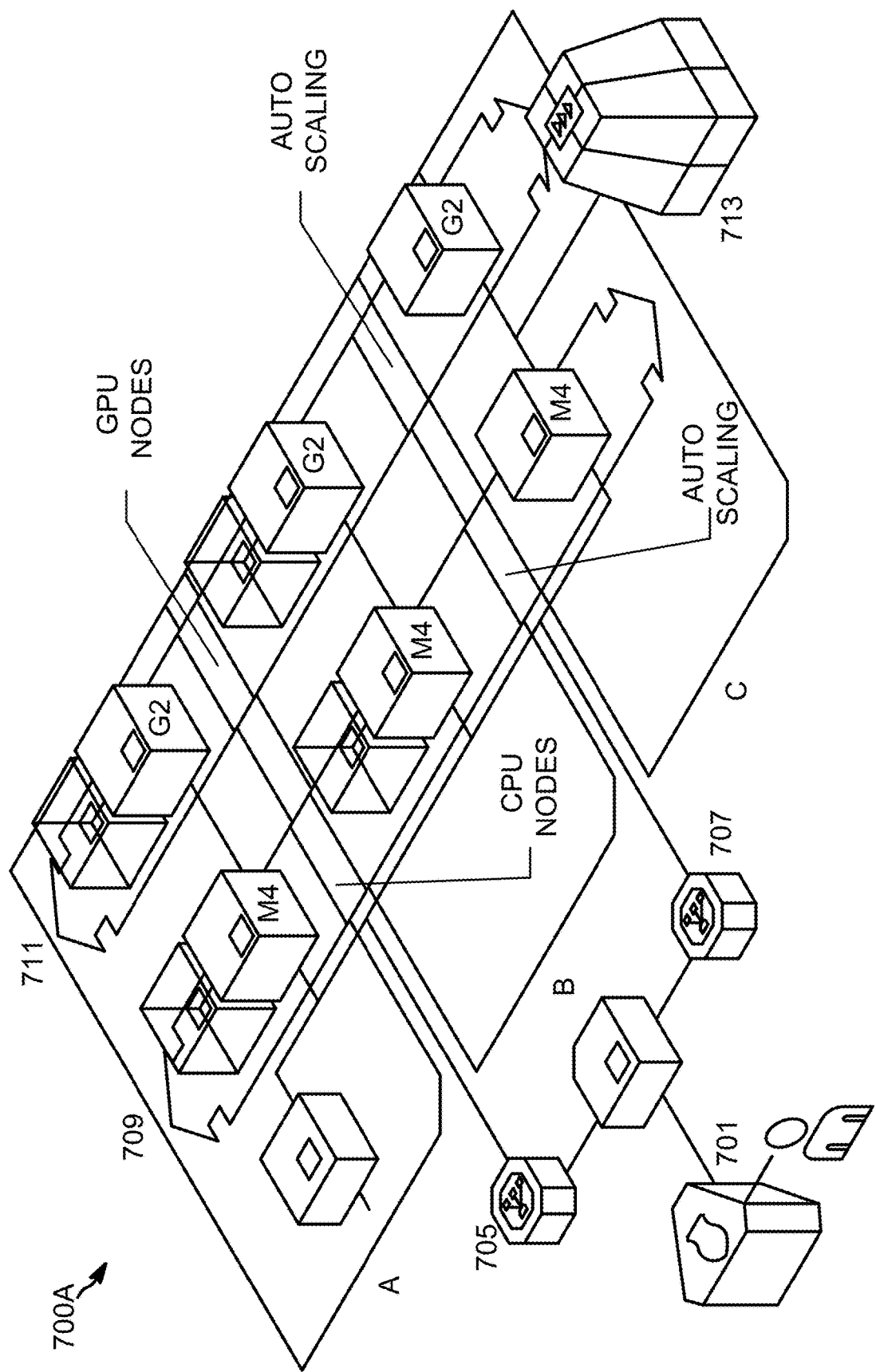

(51) Int. Cl.

| | | |
|---|---|---|
| *G06F 3/0481* | (2022.01) | |
| *G06N 3/10* | (2006.01) | |
| *G06N 3/082* | (2023.01) | |
| *G06N 3/006* | (2023.01) | |
| *G06F 9/46* | (2006.01) | |
| *G06F 18/214* | (2023.01) | |
| *G06N 3/044* | (2023.01) | |
| *G06N 3/045* | (2023.01) | |
| *G06N 5/01* | (2023.01) | |

(52) U.S. Cl.
 CPC ...... *G06F 11/3688* (2013.01); *G06F 11/3692* (2013.01); *G06F 18/214* (2023.01); *G06N 3/006* (2013.01); *G06N 3/044* (2023.01); *G06N 3/045* (2023.01); *G06N 3/082* (2013.01); *G06N 3/105* (2013.01); *G06N 5/01* (2023.01)

(56) References Cited

U.S. PATENT DOCUMENTS

| | | |
|---|---|---|
| 5,681,496 A | 10/1997 | Brownlow et al. |
| 6,449,603 B1 | 9/2002 | Hunter |
| 7,016,881 B2 | 3/2006 | Li et al. |
| 7,313,550 B2 | 12/2007 | Kulkarni et al. |
| 7,386,522 B1 | 6/2008 | Bigus et al. |
| 7,801,591 B1 | 9/2010 | Shusterman |
| 7,936,915 B2 | 5/2011 | Brown et al. |
| 8,396,286 B1 | 3/2013 | Aradhye et al. |
| 8,442,839 B2 | 5/2013 | Yen et al. |
| 8,521,664 B1 | 8/2013 | Lin et al. |
| 9,213,527 B2 | 12/2015 | Krueger et al. |
| 9,235,653 B2 | 1/2016 | Talmon et al. |
| 9,390,404 B2 | 7/2016 | Ivanic et al. |
| 9,443,192 B1 | 9/2016 | Cosic |
| 9,460,088 B1 | 10/2016 | Sak et al. |
| 9,524,461 B1 | 12/2016 | Huynh |
| 9,558,454 B2 | 1/2017 | Strassner |
| 10,504,030 B2 | 12/2019 | Kipersztok et al. |
| 10,586,173 B2 | 3/2020 | Hammond et al. |
| 10,691,843 B2 | 6/2020 | Estee et al. |
| 10,800,040 B1 | 10/2020 | Beckman et al. |
| 10,847,266 B1 * | 11/2020 | Ross .................. G06Q 50/01 |
| 10,990,894 B2 | 4/2021 | Shaashua et al. |
| 11,188,821 B1 | 11/2021 | Kalakrishnan et al. |
| 11,423,454 B2 | 8/2022 | Addepalli |
| 2003/0004672 A1 | 1/2003 | Thurman |
| 2003/0041047 A1 | 2/2003 | Chang et al. |
| 2003/0204311 A1 | 10/2003 | Bush |
| 2004/0122788 A1 | 6/2004 | Griffith et al. |
| 2004/0255291 A1 | 12/2004 | Sierer et al. |
| 2005/0034109 A1 | 2/2005 | Hamilton et al. |
| 2005/0114280 A1 | 5/2005 | Rising |
| 2005/0125440 A1 | 6/2005 | Hirst |
| 2005/0132032 A1 | 6/2005 | Bertrand |
| 2005/0197991 A1 | 9/2005 | Wray et al. |
| 2005/0238198 A1 | 10/2005 | Brown et al. |
| 2006/0166174 A1 | 7/2006 | Rowe et al. |
| 2006/0218107 A1 | 9/2006 | Young |
| 2006/0271210 A1 | 11/2006 | Subbu et al. |
| 2007/0101331 A1 | 5/2007 | Krebs |
| 2007/0168328 A1 | 7/2007 | Peralta |
| 2008/0298544 A1 | 12/2008 | Dugan |
| 2009/0106165 A1 | 4/2009 | Solomon |
| 2009/0106178 A1 | 4/2009 | Chu |
| 2009/0119587 A1 | 5/2009 | Allen et al. |
| 2009/0204563 A1 | 8/2009 | Gerber et al. |
| 2010/0070948 A1 | 3/2010 | Rama et al. |
| 2010/0088258 A1 | 4/2010 | Oaten et al. |
| 2010/0094790 A1 | 4/2010 | Gnojewski |
| 2010/0106714 A1 | 4/2010 | Lim et al. |
| 2010/0232686 A1 | 9/2010 | Dewan et al. |
| 2010/0280863 A1 | 11/2010 | Wilcock et al. |
| 2011/0087627 A1 | 4/2011 | David et al. |
| 2012/0139930 A1 | 6/2012 | Rogers |
| 2012/0159090 A1 | 6/2012 | Andrews et al. |
| 2012/0209794 A1 | 8/2012 | Jones, III |
| 2012/0239598 A1 | 9/2012 | Cascaval et al. |
| 2012/0310864 A1 | 12/2012 | Chakraborty et al. |
| 2014/0302476 A1 | 10/2014 | Sorensen et al. |
| 2015/0066929 A1 | 3/2015 | Satzke et al. |
| 2015/0269609 A1 | 9/2015 | Mehanian et al. |
| 2015/0339570 A1 | 11/2015 | Scheffler |
| 2016/0034809 A1 | 2/2016 | Trenholm et al. |
| 2016/0078361 A1 | 3/2016 | Brueckner et al. |
| 2016/0188843 A1 | 6/2016 | Staples, II et al. |
| 2016/0260428 A1 | 9/2016 | Matsuda et al. |
| 2016/0283202 A1 | 9/2016 | Sellers-Blais |
| 2016/0314402 A1 | 10/2016 | Buccapatnam Tirumala et al. |
| 2016/0358098 A1 | 12/2016 | Duesterwald et al. |
| 2017/0019315 A1 | 1/2017 | Tapia et al. |
| 2017/0061283 A1 | 3/2017 | Rasmussen et al. |
| 2017/0091670 A1 | 3/2017 | Gulin et al. |
| 2017/0193361 A1 | 7/2017 | Chilimbi et al. |
| 2017/0213126 A1 | 7/2017 | Hammond et al. |
| 2017/0213128 A1 | 7/2017 | Hammond et al. |
| 2017/0213131 A1 | 7/2017 | Hammond et al. |
| 2017/0213132 A1 | 7/2017 | Hammond et al. |
| 2017/0213154 A1 | 7/2017 | Hammond et al. |
| 2017/0213155 A1 | 7/2017 | Hammond et al. |
| 2017/0213156 A1 | 7/2017 | Hammond et al. |
| 2017/0220943 A1 | 8/2017 | Duncan et al. |
| 2017/0262769 A1 | 9/2017 | Mcshane et al. |
| 2017/0294027 A1 | 10/2017 | Babenko et al. |
| 2017/0308800 A1 | 10/2017 | Cichon et al. |
| 2018/0060759 A1 | 3/2018 | Chu et al. |
| 2018/0191867 A1 | 7/2018 | Siebel et al. |
| 2018/0240062 A1 | 8/2018 | Crabtree et al. |
| 2018/0293057 A1 | 10/2018 | Sun et al. |
| 2018/0293463 A1 | 10/2018 | Brown |
| 2018/0293493 A1 | 10/2018 | Kalamkar et al. |
| 2018/0293498 A1 | 10/2018 | Campos et al. |
| 2018/0293517 A1 | 10/2018 | Browne et al. |
| 2018/0307945 A1 | 10/2018 | Haigh et al. |
| 2018/0357047 A1 | 12/2018 | Brown et al. |
| 2018/0357543 A1 | 12/2018 | Brown et al. |
| 2018/0357552 A1 | 12/2018 | Campos et al. |
| 2019/0095794 A1 | 3/2019 | Aldana López et al. |
| 2019/0232488 A1 | 8/2019 | Levine et al. |
| 2020/0117427 A1 | 4/2020 | McGloin et al. |
| 2020/0250583 A1 | 8/2020 | Hammond et al. |
| 2020/0265302 A1 | 8/2020 | Sanyal et al. |
| 2021/0042530 A1 | 2/2021 | Kim et al. |
| 2021/0248514 A1 * | 8/2021 | Celia .................. G06Q 30/0208 |
| 2021/0406774 A1 | 12/2021 | Browne et al. |
| 2022/0138656 A1 | 5/2022 | Le et al. |
| 2022/0164879 A1 * | 5/2022 | Celia .................. G06K 9/6215 |
| 2022/0172050 A1 | 6/2022 | Dalli et al. |

FOREIGN PATENT DOCUMENTS

| | | |
|---|---|---|
| CN | 102075560 A | 5/2011 |
| CN | 102141991 A | 8/2011 |
| CN | 102222005 A | 10/2011 |
| CN | 102509039 A | 6/2012 |
| CN | 102591654 A | 7/2012 |
| CN | 102707982 A | 10/2012 |
| CN | 104106276 A | 10/2014 |
| CN | 104520880 A | 4/2015 |
| CN | 104965978 A | 10/2015 |
| CN | 105068661 A | 11/2015 |
| WO | 2015017706 A2 | 2/2015 |

OTHER PUBLICATIONS

"Final Office Action Issued in U.S. Appl. No. 15/416,970", dated Mar. 3, 2020, 7 Pages.

"Final Office Action Issued in U.S. Appl. No. 15/417,086", dated Feb. 25, 2020, 18 Pages.

"Non-Final Office Action Issued in U.S. Appl. No. 15/416,904", dated Aug. 14, 2019, 11 Pages.

(56) References Cited

OTHER PUBLICATIONS

"Notice of Allowance Issued in U.S. Appl. No. 15/417,075", dated Aug. 14, 2019, 9 Pages.
"Extended Search Report Issued in European Patent Application No. 17745025.1", dated Aug. 23, 2019, 9 Pages.
"Extended Search Report Issued in European Patent Application No. 17745016.0", dated Aug. 20, 2019, 8 Pages.
"Extended Search Report Issued in European Patent Application No. 17745030.1", dated Sep. 2, 2019, 7 Pages.
"Non Final Office Action Issued in U.S. Appl. No. 15/416,970", dated Nov. 21, 2019, 12 Pages.
"Non Final Office Action Issued in U.S. Appl. No. 15/417,033", dated Nov. 26, 2019, 13 Pages.
"Non-Final Office Action Issued in U.S. Appl. No. 15/416,970", dated Aug. 4, 2020, 7 Pages.
"Office Action Issued in European Patent Application No. 17745016.0", dated Jul. 13, 2020, 9 Pages.
Lirov, Yuval, "Computer Aided Neural Network Engineering", In the Journal of Neural Networks, vol. 5, Issue 4, Jul. 1992, pp. 711-719.
Perera, et al., "ANNEbot: An Evolutionary Artificial Neural Network Framework", In the Proceedings of 4th International Conference on Intelligent and Advanced Systems, Jun. 12, 2012, pp. 40-45.
"Notice of Allowance Issued in U.S. Appl. No. 16/009,153", dated Jul. 1, 2021, 11 Pages.
"Office Action issued in European Application No. 17745030.1", dated Jul. 15, 2021, 4 Pages.
"Office Action issued in European Application No. 17745025.1", dated Jul. 15, 2021, 4 Pages.
"Build, Ship, Run Any App, Anywhere", Retrieved From: https://web.archive.org/web/20170120165452/https://www.docker.com/, Retrieved On: Jan. 20, 2017, 7 Pages.
"Services Overview", Published By Bonsai AI, Inc, 3 Pages.
"What's The Difference Between an Application, Process, and Services?", Retrieved From: https://superuser.com/questions/209654/whats-the-difference-between-an-application-process-and-services. Retrieved On: January 20, 2017, 1 Page.
Campos, et al., "Concept Network Reinforcement Learning For Flexible Dexterous Manipulation", Retrieved From https://medium.com/@BonsaiAI/concept-network-reinforcement-learning-for-flexible-dexterous-manipulation-47bf459b19b9, Sep. 19, 2017, 11 Pages.
Chung, Kiuk, "Generating Recommendations at Amazon Scale With Apache Spark and Amazon DSSTNE", Retrieved From: https://aws.amazon.com/blogs/big-data/generating-recommendations-at-amazon-scale-with-apache-spark-and-amazon-dsstne/, Jul. 9, 2016, 8 Pages.
Dunn, Jeffrey, "Introducing FBLearner Flow: Facebook's AI Backbone", Retrieved From: https://web.archive.org/web/201 80717150507/https://code.fb.com/core-data/introducing-fblearner-flow-facebooks-ai-backbone/, May 9, 2016, 9 Pages.
Gray, Kathryn E.., "Toward Customizable Pedagogic Programming Languages", A dissertation submitted to the faculty of The University of Utah in partial fulfillment of the requirements for the degree of Doctor of Philosophy in Computer Science, Aug. 2006, 156 Pages.
Gudimella, et al., "Deep Reinforcement Learning For Dexterous Manipulation With Concept Networks", Retrieved From: https://arxiv.org/pdf/1709.06977.pdf, Sep. 20, 2017, 16 Pages.
Hammond, et al., "AI For Everyone: An Introduction to Bonsai BRAIN and Inkling", In Bonsai AI, Inc. Whitepaper, Jan. 2016, 16 Pages.
He, Jinru, "Auto Scaling Pinterest", Retrieved From: https://web.archive.org/web/20161114182239/https://engineering.pinterest.com/blog/auto-scaling-pinterest, Sep. 16, 2016, 8 Pages.
Ma, Kevin, "Applying Deep Learning To Related Pins", Retrieved From: https://web.archive.org/web/20170214195127/https://engineering-pinterest.com/blog/applying-deep-learning-related-pins, Jan. 12, 2017, 6 Pages.

"International Search Report and Written Opinion Issued in PCT Application No. PCT/US2017/015446", dated Apr. 10, 2017, 6 Pages.
"International Search Report and Written Opinion Issued in PCT Application No. PCT/US2017/015460", dated May 5, 2017, 11 Pages.
"International Search Report and Written Opinion Issued in PCT Application No. PCT/US2017/015470", dated Apr. 21, 2017, 11 Pages.
Raschka, Sebastian, "Fitting A Model Via Closed-Form Equations Vs. Gradient Descent Vs Stochastic Gradient Descent Vs Mini-Batch Learning. What Is The Difference?", Retrieved From: https://sebastianraschka.com/faq/docs/closed-form-vs-gd.html. Retrieved From: Jan. 17, 2017, 6 Pages.
Tessler, et al., "A Deep Hierarchical Approach to Lifelong Learning in Minecraft", Retrieved From: https://arxiv.org/pdf/1604.07255.pdf, Nov. 30, 2016, 10 Pages.
Hengst, Bernhard, et al., "Safe State Abstraction and Reusable Continuing Subtasks in Hierarchical Reinforcement Learning", In Proceedings of 20th Joint Conference on Artificial Intelligence, Dec. 2, 2007, 11 pages.
"International Search Report & Written Opinion Issued in PCT Application No. PCT/US2018/037650", dated Aug. 31, 2018, 10 Pages.
"Office Action and Search Report Issued in Chinese Patent Application No. 201780020322.4", dated Oct. 26, 2021, 8 Pages.
"Office Action Issued in Chinese Patent Application No. 201780020323.9", dated Nov. 29, 2021, 6 Pages.
"Non Final Office Action Issued in U.S. Appl. No. 16/009,039", dated Dec. 14, 2020, 32 Pages.
Luchian et al., "Automation of the infrastructure and services for an OpenStack deployment using chef tool", In 15th RoEduNet Conference: Networking in Education and Research, IEEE, Sep. 7, 2016, 5 Pages.
"Non Final Office Action Issued in U.S. Appl. No. 16/008,751", dated Dec. 1, 2020, 26 Pages.
"Summons to attend oral proceedings Issued in European Patent Application No. 17745016.0", dated Oct. 23, 2020, 7 Pages.
Ciancio et al., "Heuristic techniques to optimize neural network architecture in manufacturing applications", In Journal of Neural Computing and Applications vol. 27, Issue 7, Jul. 31, 2015, pp. 2001-2015.
"First Office Action and Search Report Issued in Chinese Patent Application No. 201780020322.4", dated Apr. 2, 2021, 12 Pages.
Arendt, et al., "A Tool Environment for Quality Assurance based on the Eclipse Modeling Framework", In Journal of Automated Software Engineering, vol. 20, Issue 2, Dec. 11, 2012, pp. 141-184.
Yang, et al., "Intelligent Search Engine Based on Knowledge Library", In Journal of Computer and Information Technology, vol. 18, Issue 2, Apr. 30, 2010, pp. 41-44.
"First Office Action and Search Report Issued in Chinese Patent Application No. 201780020323.9", dated May 24, 2021, 21 Pages.
"Non Final Office Action Issued in U.S. Appl. No. 15/416,988", dated Oct. 3, 2019, 11 Pages.
"Non Final Office Action Issued in U.S. Appl. No. 15/417,056", dated Oct. 17, 2019, 10 Pages.
"Non Final Office Action Issued in U.S. Appl. No. 15/417,086", dated Nov. 7, 2019, 13 Pages.
Beale, et al., "Neural Network Toolbox 7 User's Guide", Retrieved from http://citeseerx.ist.psu.edu/viewdoc/download?doi=10.1.1.220.1640&rep=rep1&type=pdf, 2010, 951 Pages.
"Non Final Office Action Issued in U.S. Appl. No. 16/008,775", dated Jun. 16, 2022, 34 Pages.
"Non Final Office Action Issued in U.S. Appl. No. 16/104,044", dated Jun. 24, 2022, 16 Pages.
"Non Final Office Action Issued in U.S. Appl. No. 16/104,060", dated Jul. 5, 2022, 11 Pages.
"Non Final Office Action Issued In U.S. Appl. No. 16/854,687", dated Jul. 13, 2022, 6 Pages.
"Notice of Allowance Issued in European Patent Application No. 17745025.1", dated Jul. 14, 2022, 7 Pages.

(56) References Cited

OTHER PUBLICATIONS

Mnih, et al., "Human-Level Control through Deep Reinforcement Learning", In Journal of Nature, vol. 518, Issue 7540, Feb. 26, 2015, pp. 529-533.
Silver, et al., "Mastering the Game of Go with Deep Neural Networks and Tree Search", In Journal of Nature, vol. 529, Issue 7587, Jan. 28, 2016, pp. 484-489.
Sutton, et al., "Between MDPs and Semi-MDPs: A Framework for Temporal Abstraction in Reinforcement Learning", In Journal of Artificial Intelligence, vol. 112, Issue 1-2, Aug. 1999, pp. 181-211.
"Final Office Action Issued in U.S. Appl. No. 16/008,775", dated Oct. 27, 2022, 35 Pages.
"Notice of Allowance Issued in U.S. Appl. No. 16/104,044", dated Oct. 19, 2022, 18 Pages.
"Notice of Allowance Issued in U.S. Appl. No. 16/104,060", dated Nov. 14, 2022, 11 Pages.
"Notice of Allowance Issued in U.S. Appl. No. 16/854,687", dated Nov. 23, 2022, 8 Pages.
"Notice of Allowance Issued in U.S. Appl. No. 17/447,642", dated Sep. 30, 2022, 10 Pages.
"Notice of Allowance Issued in European Patent Application No. 17745025.1", dated Oct. 27, 2022, 2 Pages.
"First Office Action and Search report Issued in Chinese Patent Application No. 201780020299.9", dated Nov. 18, 2022, 11 Pages.
"Notice of Allowance Issued in U.S. Appl. No. 16,008,775", dated Apr. 10, 2023, 11 Pages.
"Notice of Allowance Issued in U.S. Appl. No. 16/104,044", dated Jan. 31, 2023, 12 Pages.
"Non Final Office Action Issued in U.S. Appl. No. 16/104,054", dated Apr. 5, 2023, 48 Pages.
"Notice of Allowance Issued in U.S. Appl. No. 16/104,060", dated Feb. 28, 2023, 10 Pages.
"Notice of Allowance Issued in U.S. Appl. No. 16/854,687", dated Mar. 8, 2023, 6 Pages.
"Notice of Allowance Issued in U.S. Appl. No. 17/447,642", Feb. 24, 2023, 11 Pages.
Brys, et al., "Reinforcement Learning from Demonstration through Shaping", In Proceedings of Twenty-Fourth International Joint Conference on Artificial Intelligence. Jun. 27, 2015, pp 3352-3358.
Jankowska, et al., "Application of Perceptron Neutral Networks for Fault Detection", In Journal of IFAC Proceedings Volumes, vol. 33, Issue 11, Jun. 1, 2000, pp. 207-212.
Mitri, Nicholas Gabi, "Hierarchical Temporal Memory: An Investigative Look Into A New Cortical Algorithm", In thesis Submitted to Department of Electrical and Computer Engineering, American University of Beirut, Apr. 27, 2015, 123 Pages.
Owens, et al., "A Multi-Output-Layer Perceptron", In Journal of Neural Computing & Applications, vol. 4, Mar., 1996, pp. 10-20.
"Second Office Action Issued in Chinese Patent Application No. 201780020299.9", dated Jul. 8, 2023, 6 Pages.
"Notice of Allowance Issued in U.S. Appl. No. 16/104,060", dated Jun. 14, 2023, 8 Pages.
"Notice of Allowance Issued in U.S. Appl. No. 17/447,642", dated Jun. 28, 2023, 7 Pages.
"Final Office Action Issued in U.S. Appl. No. 16/104,054", dated Oct. 2, 2023, 31 Pages.

\* cited by examiner

Cont.

The visualization window for each AI model of the one or more AI models at least includes a first tab and a real-time plot of the one or more data series while the training of that AI model is occurring.
12

The real-time plot includes plotting discrete or continuous plots depending upon the data series having discrete or continuous variables. The data series are data series selected from a group consisting of i) actions taken by the AI model, ii) states of a simulator as a data source for that AI model, iii) functions related to the training of that AI model, and iv) any combination of these.
14

The real-time plot of the one or more data series while the training of that AI model is occurring may include a plot of two or more different data series independently selectable by the viewer at any time during the training of that AI model. The plot of the two different data series are shown together in real time during the training. Additionally, the plot may be of at least one composite data series formed as a function of difference between two different data series independently selectable by the viewer at any time during the training of that AI model.
16

The first tab of the visualization window may include a plot of the one or more data series as a scrolling multi-episode plot. The multi-episode plot can be paused when the pause button of the first tab is activated to allow the viewer to further glean the insight and the explainability into the training of that AI model for an indefinite amount of time by looking at the visually displayed information without pausing the actual training or any of its training cycles for that AI model.
18

The tracking component may track a timeline of a simulation or other training session and record corresponding information of the 1) computations, 2) graphs, 3) data series and resulting outputs, and 4) any combination of these in a memory. The visual debugging module captures the information of the 1) computations, 2) graphs, 3) data series and resulting outputs, and 4) any combination of these for the simulation and show the information visually both 1) while the simulation or other training source is running as well as 2) when a recording of the timeline with the information visually being shown is requested to be played back on the GUI.
20

Cont.

FIG. 10B

```
                    ┌─ Cont. ─┐
                    └────┬────┘
                         ▼
```

| |
|---|
| The visual debugging module may plot the plot of the one or more data series during the training of the AI model. The plot may include two or more different data series independently selectable by the user viewer at any time during the training of that AI model, including while the plot is paused on a particular episode in a set of the multi-episodes of training.  <u>22</u> |

| |
|---|
| Either data series of the two or more different data series can be changed by the viewer to at least a third different data series while the plot is paused on the particular episode in the set of training episodes. This further enables the viewer to glean the insight and the explainability into the training of the AI model from the different data series during the particular episode of training by viewing the displayed content in the visualization window and the plots.  <u>24</u> |

| |
|---|
| The visualization window for each AI model of the one or more AI models further includes a second tab. The second tab may include a rendering of a graphic of a metagraph including the one or more concepts of the mental model being learned by that AI model.  <u>26</u> |

| |
|---|
| The graphic of the second tab includes providing data going into and out of the metagraph. The data corresponds to one or more selected data series for actions taken for that AI model, states of a simulator for that AI model, functions related to the training of that AI model over time, and any combination of these. The plotting in the first tab of that plot of the one or more data series during the training of that AI model may include, for example, the one or more viewer selected data series.  <u>28</u> |

| |
|---|
| The visual debugging module may capture the data going into and out of the metagraph for at least a multi-episode set of training episodes for training that AI model in a time-series database.  <u>30</u> |

```
                         ▼
                    ┌─ End ─┐
                    └───────┘
```

FIG. 10C

VISUAL AIDS FOR DEBUGGING

CROSS-REFERENCE

This application is continuation-in-part of U.S. patent application Ser. No. 15/417,086 titled "An artificial intelligence engine having multiple independent processes on a cloud-based platform configured to scale," filed Jan. 26, 2017, which claims the benefit of U.S. Provisional Application No. 62/287,861, filed Jan. 27, 2016, titled "Bonsai platform, language, and tooling," each of which is incorporated herein by reference in its entirety. This application also claims the benefit under 35 USC 119 of U.S. Provisional Application No. 62/547,339, titled "An artificial intelligence engine having multiple improvements," filed Aug. 18, 2017, which is also incorporated herein by reference in its entirety. This application also claims the benefit under 35 USC 119 of U.S. Provisional Application No. 62/555,584, titled "An artificial intelligence engine having multiple improvements," filed Sep. 7, 2017, which is also incorporated herein by reference in its entirety.

NOTICE OF COPYRIGHT

A portion of the disclosure of this patent application contains material that is subject to copyright protection. The copyright owner has no objection to the facsimile reproduction by anyone of the material subject to copyright protection as it appears in the United States Patent & Trademark Office's records for this application, but otherwise reserves all copyright rights whatsoever.

FIELD

Embodiments of the design provided herein generally relate to artificial intelligence ("AI") systems and visual aids for debugging AI.

BACKGROUND

Training AI models can take days, weeks, or even longer. Provided herein are time-saving visual training aids and methods thereof for troubleshooting and debugging any training issues while such issues occur in the training of the AI models.

SUMMARY

Provided herein is an AI engine configured to work with a graphical user interface ("GUI") including, in some embodiments, one or more AI-engine modules and a visual debugging module of the GUI in a memory, the one or more AI-engine modules including an instructor module, a learner module, and a predictor module. The learner module, upon execution by one or more processors of the AI engine, is configured to train one or more AI models on one or more concepts of a mental model defined in a pedagogical programming language. The instructor module, upon execution by the one or more processors, is configured to coordinate with one or more simulators for respectively training the one or more AI models on the one or more concepts of the mental model, thereby respectively providing one or more trained AI models. The visual debugging module is configured to provide a visualization window for each AI model of the one or more AI models while the one or more AI models are training with the learner module or predicting with the predictor module. This allows a viewer to glean insight and explainability into the training of the one or more AI models while the one or more simulations are respectively running and arriving at various states.

Also provided herein is a non-transitory computer-readable medium ("CRM") including executable instructions that, when executed on a computer system with one or more processors, cause the computer system to perform the following steps including, in some embodiments, instantiating an artificial intelligence ("AI") engine and a cooperating graphical user interface ("GUI") with a visual debugging module of the GUI. Instantiating the AI engine includes instantiating one or more AI-engine modules including an instructor module, a learner module, and a predictor module. Upon execution of the learner module by the one or more processors, the learner module trains one or more AI models on one or more concepts of a mental model defined in a pedagogical programming language. Upon execution of the instructor module by the one or more processors, the instructor module coordinates with one or more simulators for respectively training the one or more AI models on the one or more concepts of the mental model. The AI engine respectively provides one or more trained AI models as a result. Instantiating the visual debugging module of the GUI includes providing a visualization window for each AI model of the one or more AI models while the one or more AI models are training with the learner module or predicting with the predictor module in the one or more simulators and/or real world implementations. Instantiating the AI engine and the cooperating graphical user interface ("GUI") with the visual debugging module of the GUI enables a viewer to glean insight and explainability into the training of the one or more AI models while the one or more simulations are respectively running and arriving at various states.

These and other features of the design provided herein can be better understood with reference to the drawings, description, and claims, all of which form the disclosure of this patent application.

DRAWINGS

The drawings refer to some embodiments of the design provided herein in which:

FIG. 1A provides a block diagram illustrating an AI system and its cloud-based computing platforms infrastructure in accordance with some embodiments.

Figure 1B:
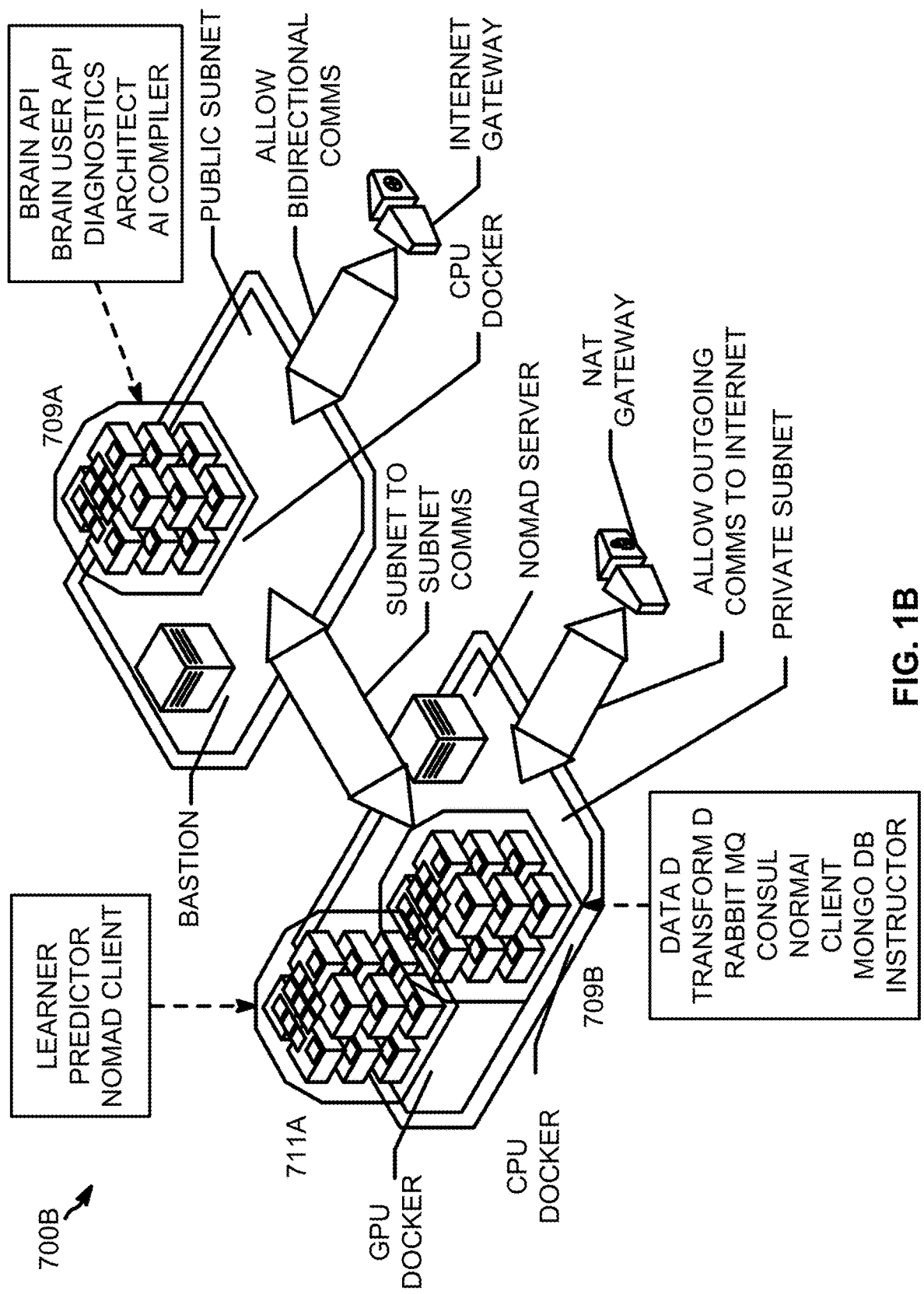

FIG. 1B provides a block diagram illustrating an AI system and its on-premises based computing platforms infrastructure in accordance with some embodiments.

Figure 2:
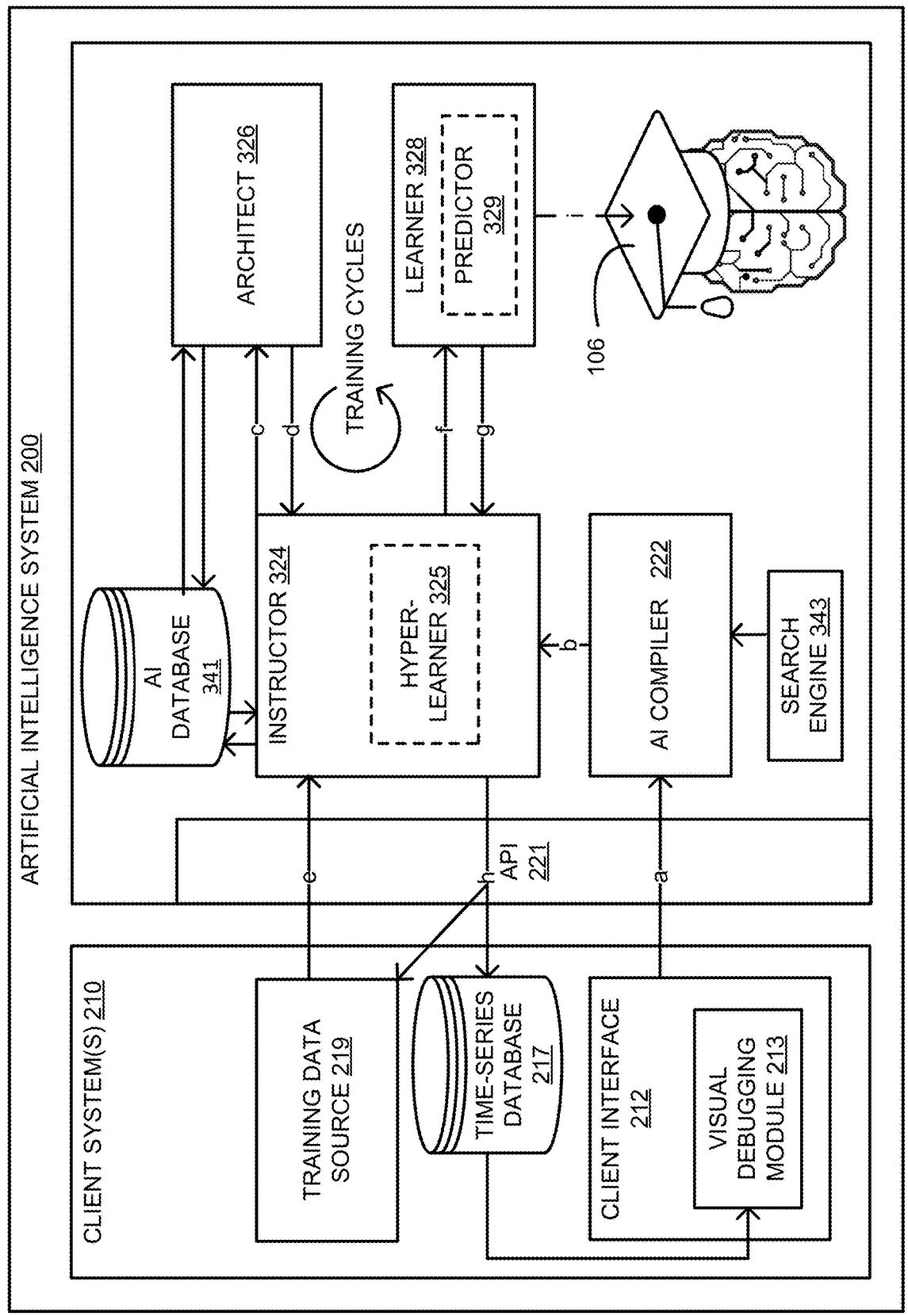

FIG. 2 provides a block diagram illustrating an AI system with an AI engine and visual debugging module in accordance with some embodiments.

Figure 3A:
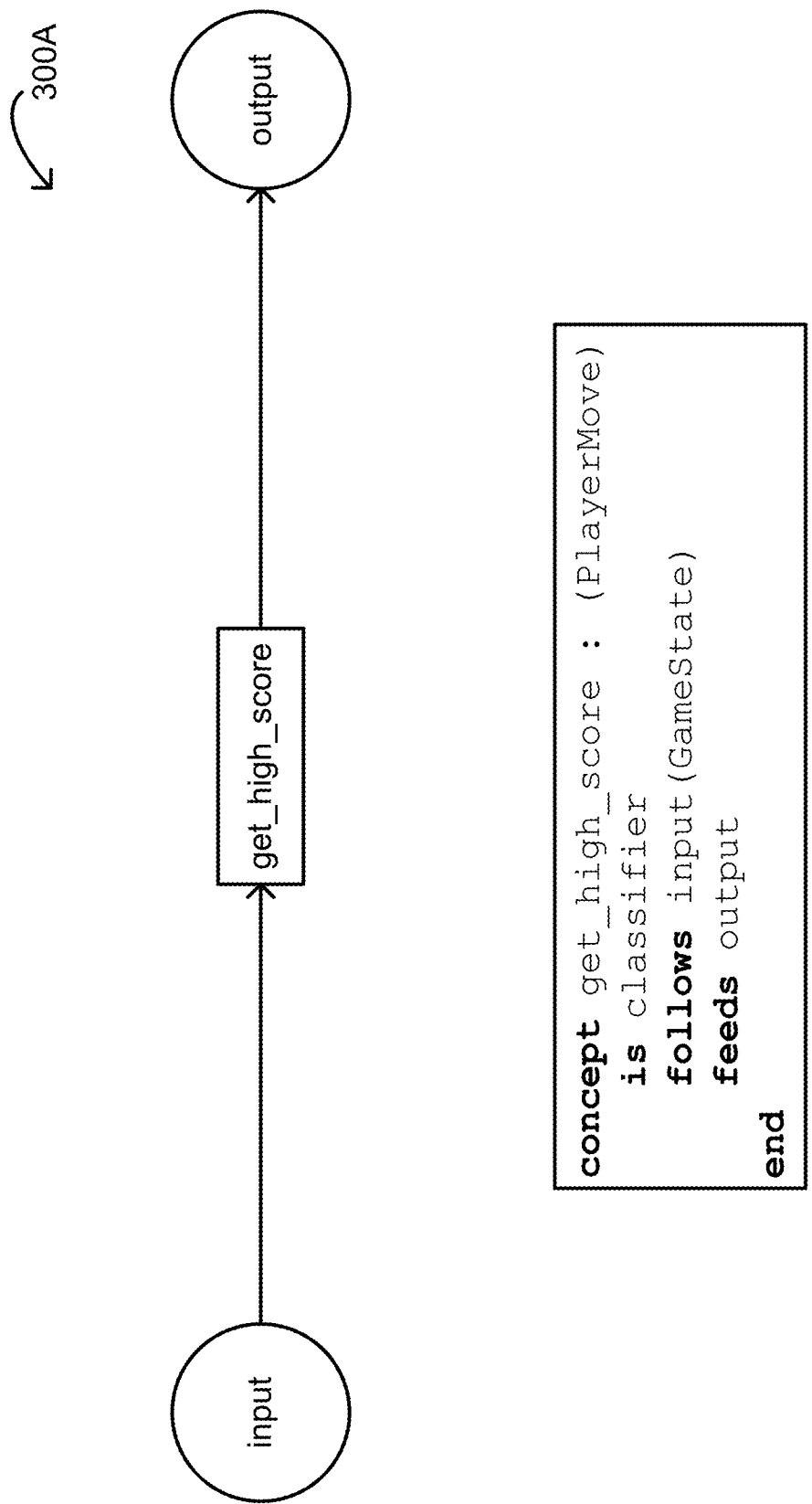

FIG. 3A provides a block diagram illustrating a mental model in accordance with some embodiments.

Figure 3B:
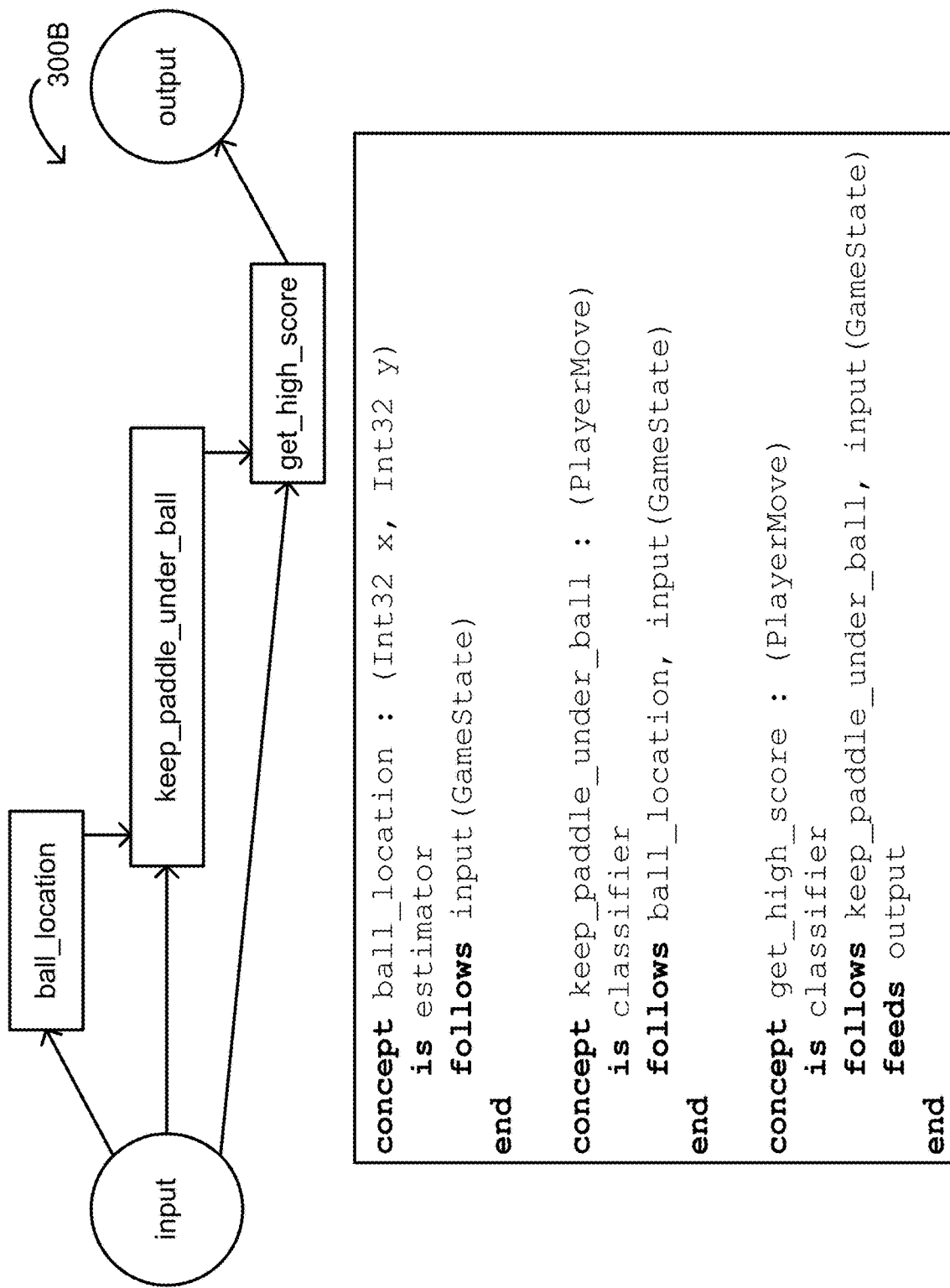

FIG. 3B provides a block diagram illustrating a mental model in accordance with some embodiments.

Figure 4A:
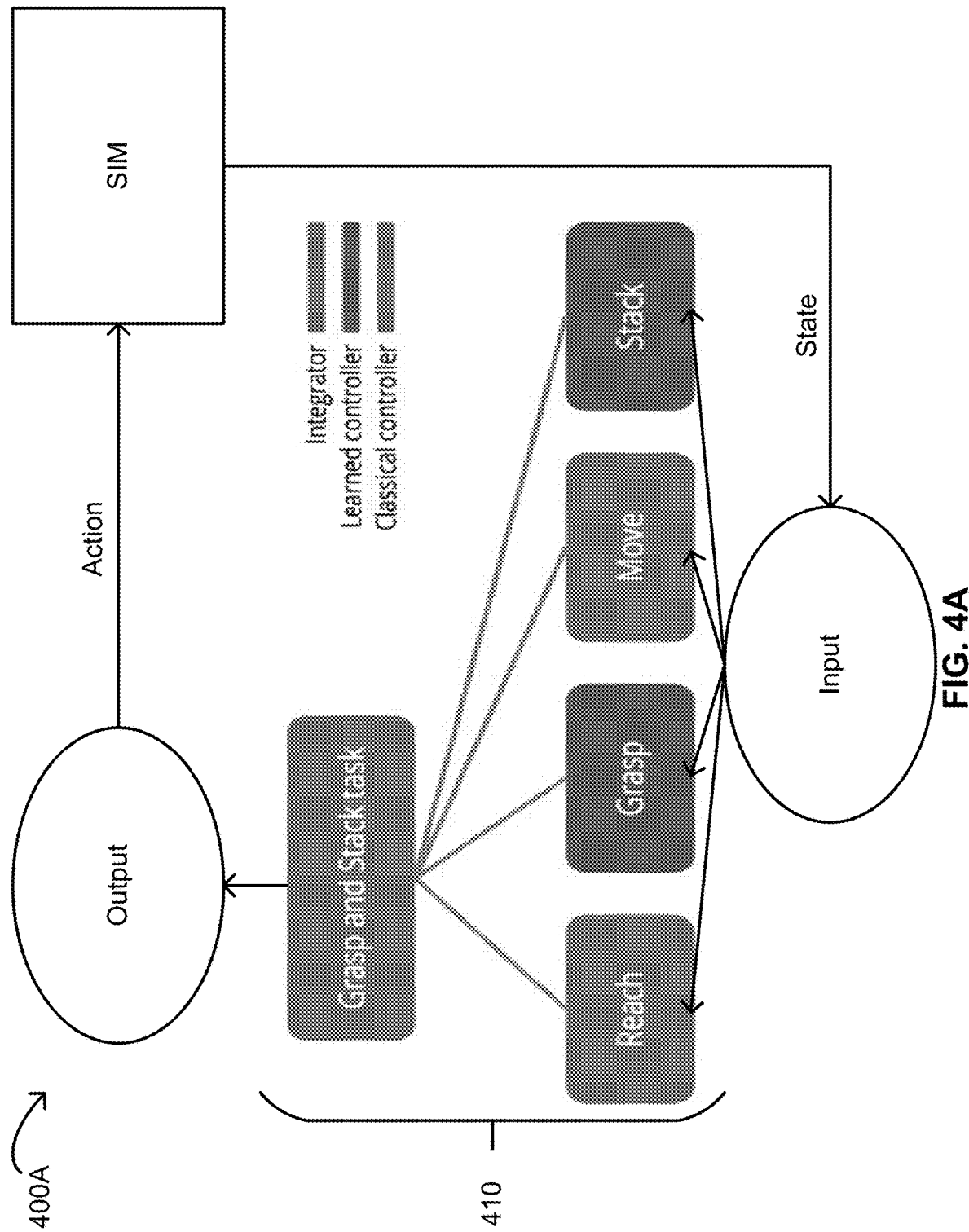

FIG. 4A provides a schematic illustrating a complex task that the AI models can be trained on, where this complex task is divided into a number of simpler tasks each of which is trained on in accordance with some embodiments.

Figure 4B:
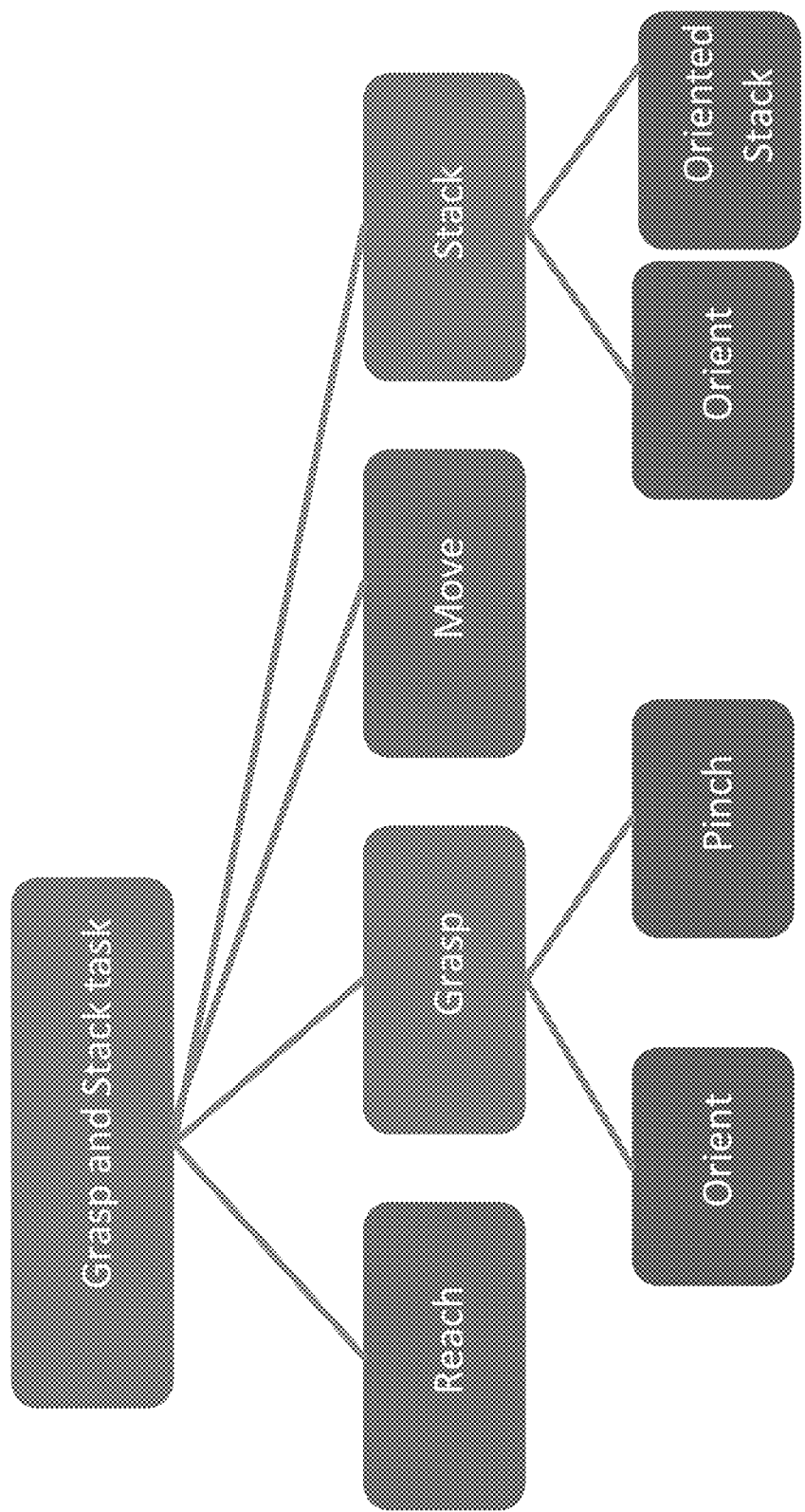

FIG. 4B provides a schematic illustrating a complex task further divided into a number of simpler tasks in accordance with some embodiments.

Figure 4C:
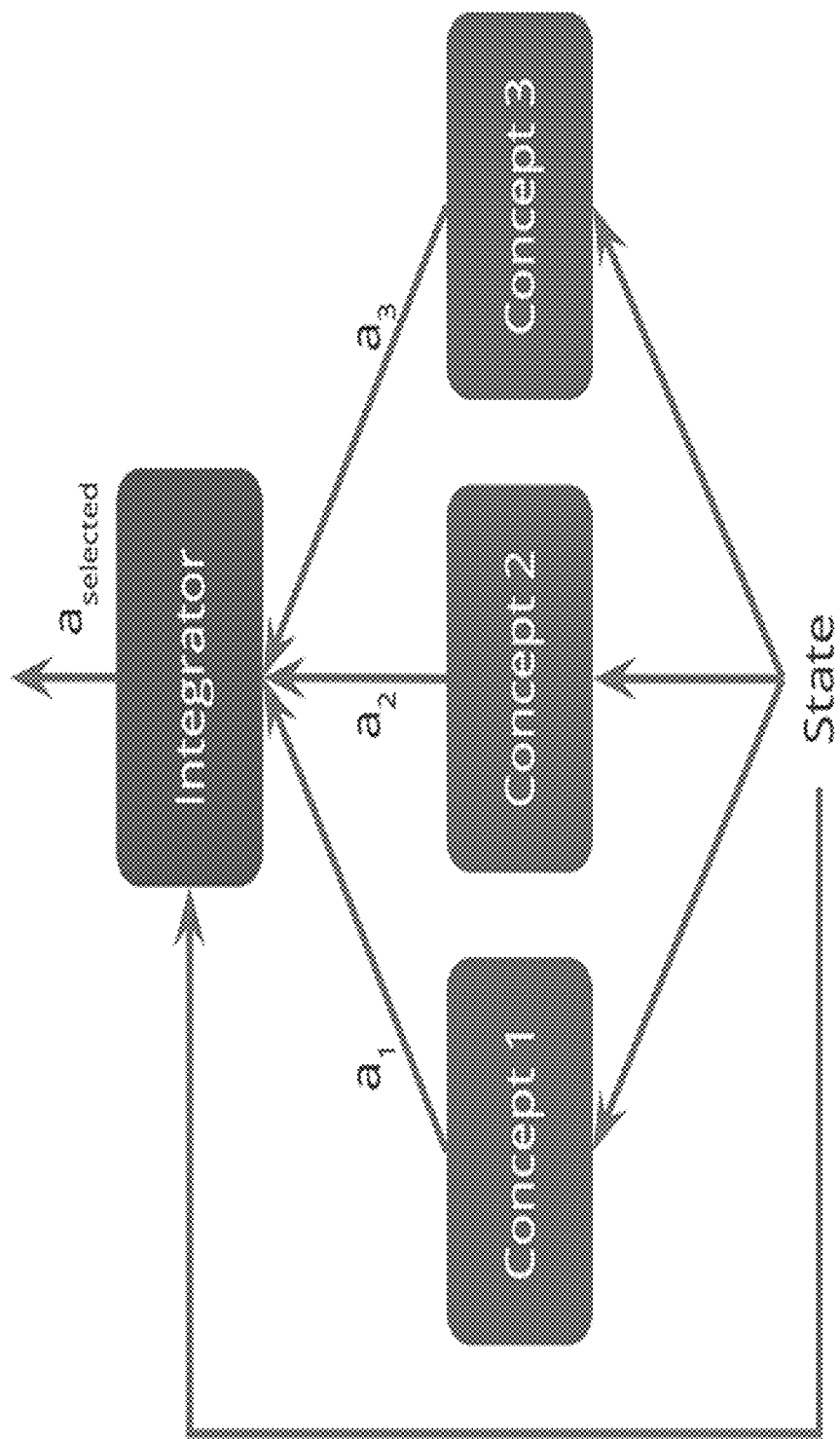

FIG. 4C provides a schematic illustrating an integrator in accordance with some embodiments.

Figure 4D:
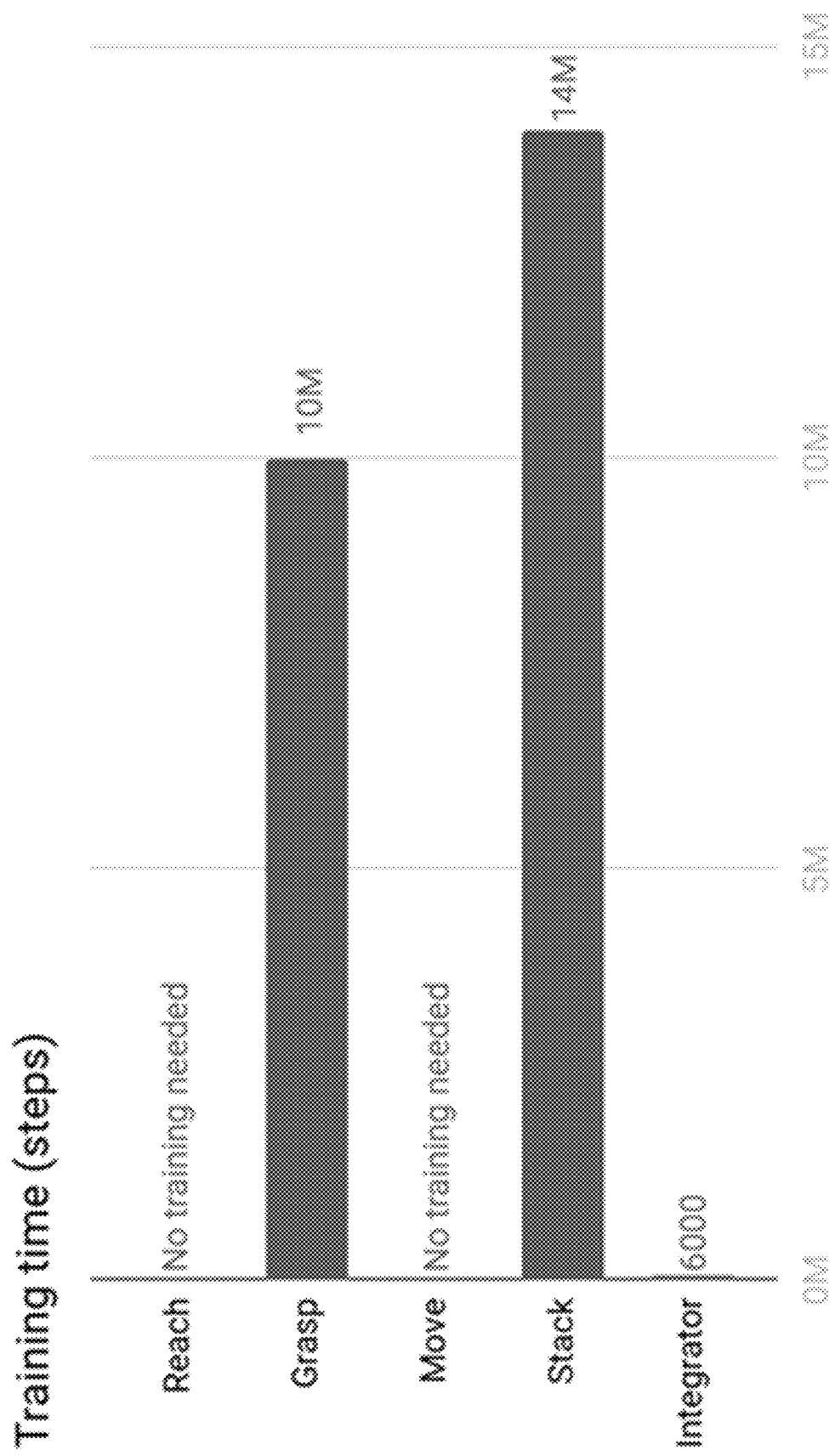

FIG. 4D provides a schematic illustrating numbers of episodes of training for learning various concepts in accordance with some embodiments.

Figure 5A:
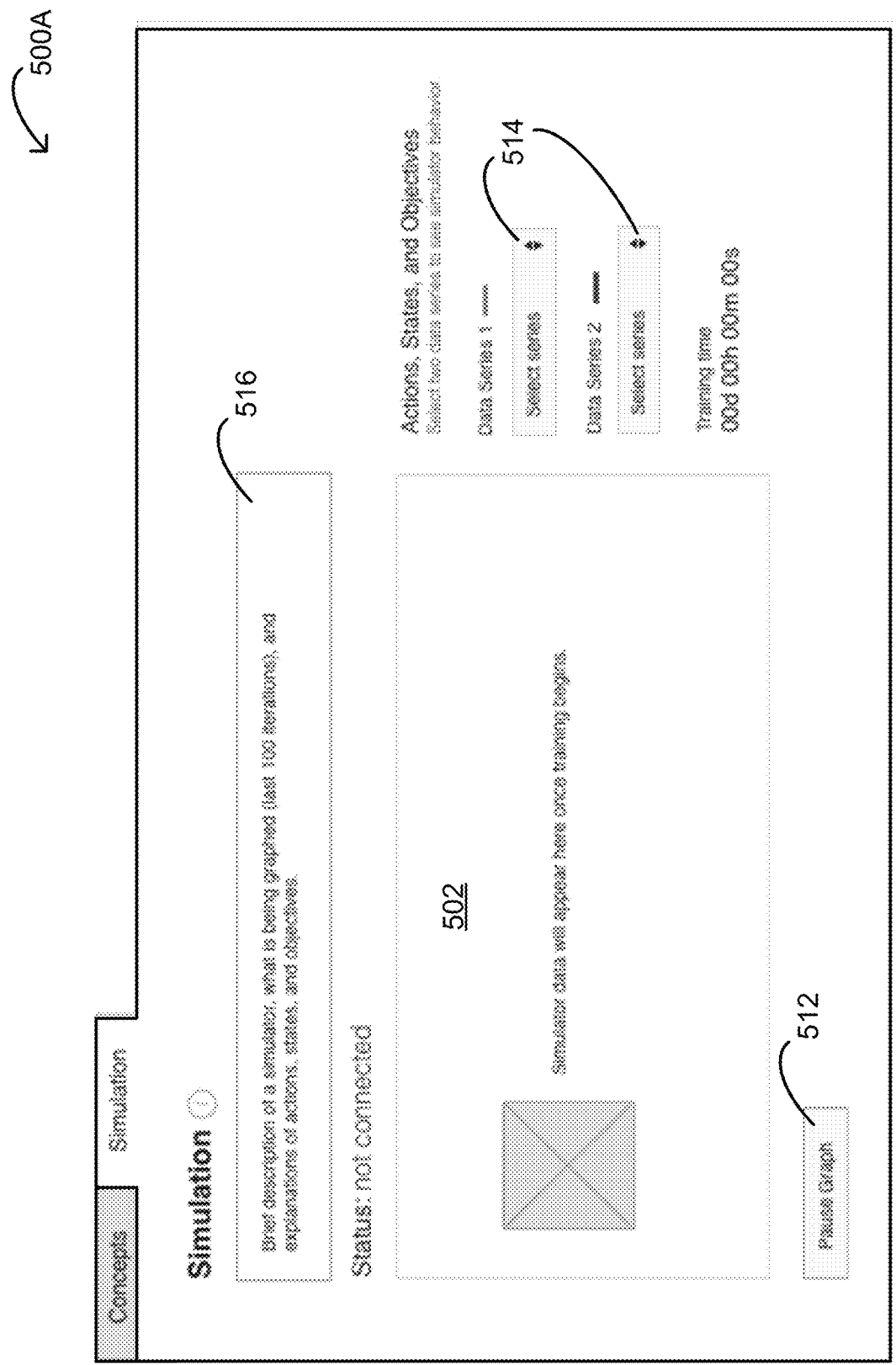

FIG. 5A provides a schematic illustrating a first visualization window of a visual debugging module in accordance with some embodiments.

Figure 5B:
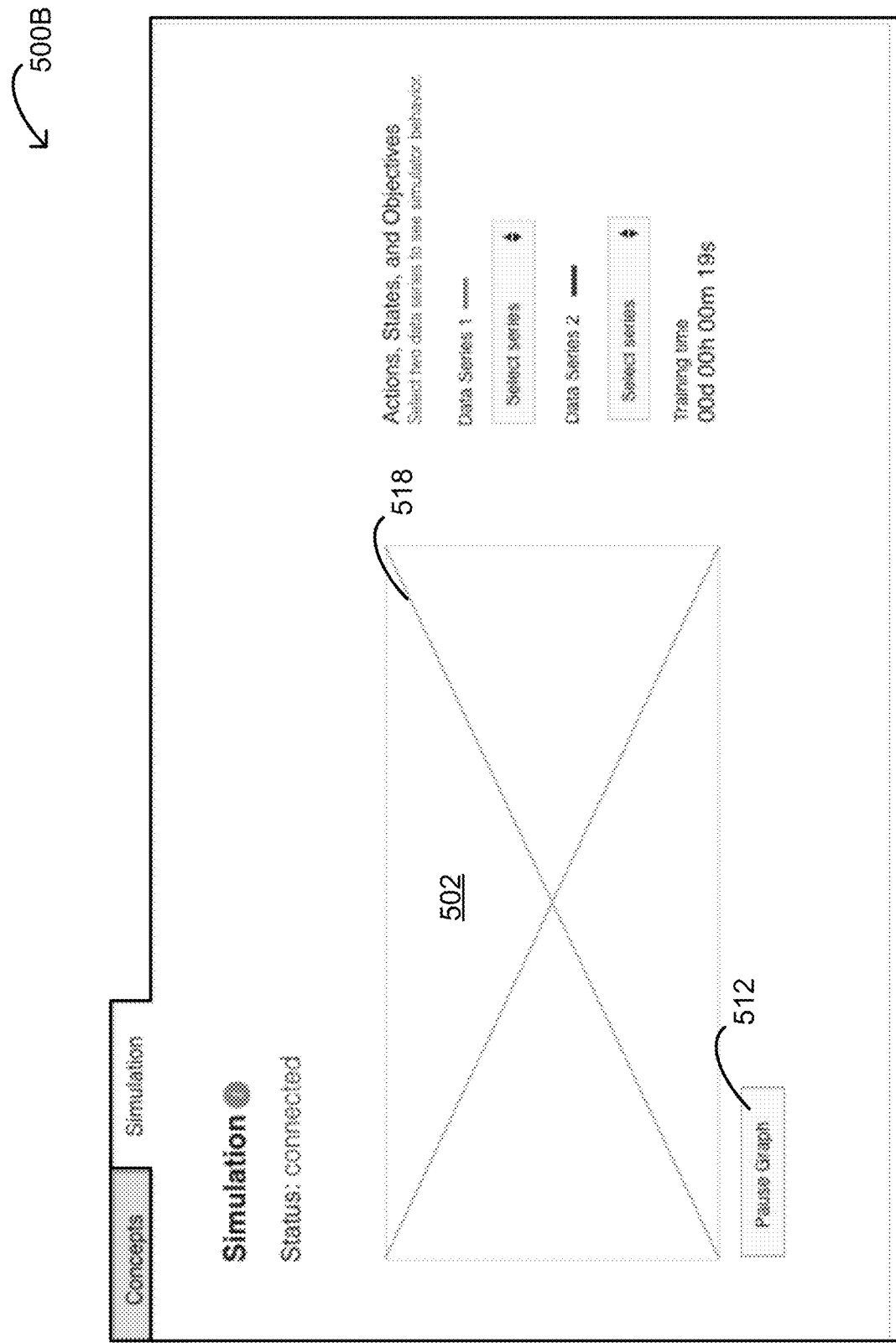

FIG. 5B provides a schematic illustrating a second visualization window of a visual debugging module in accordance with some embodiments.

Figure 5C:
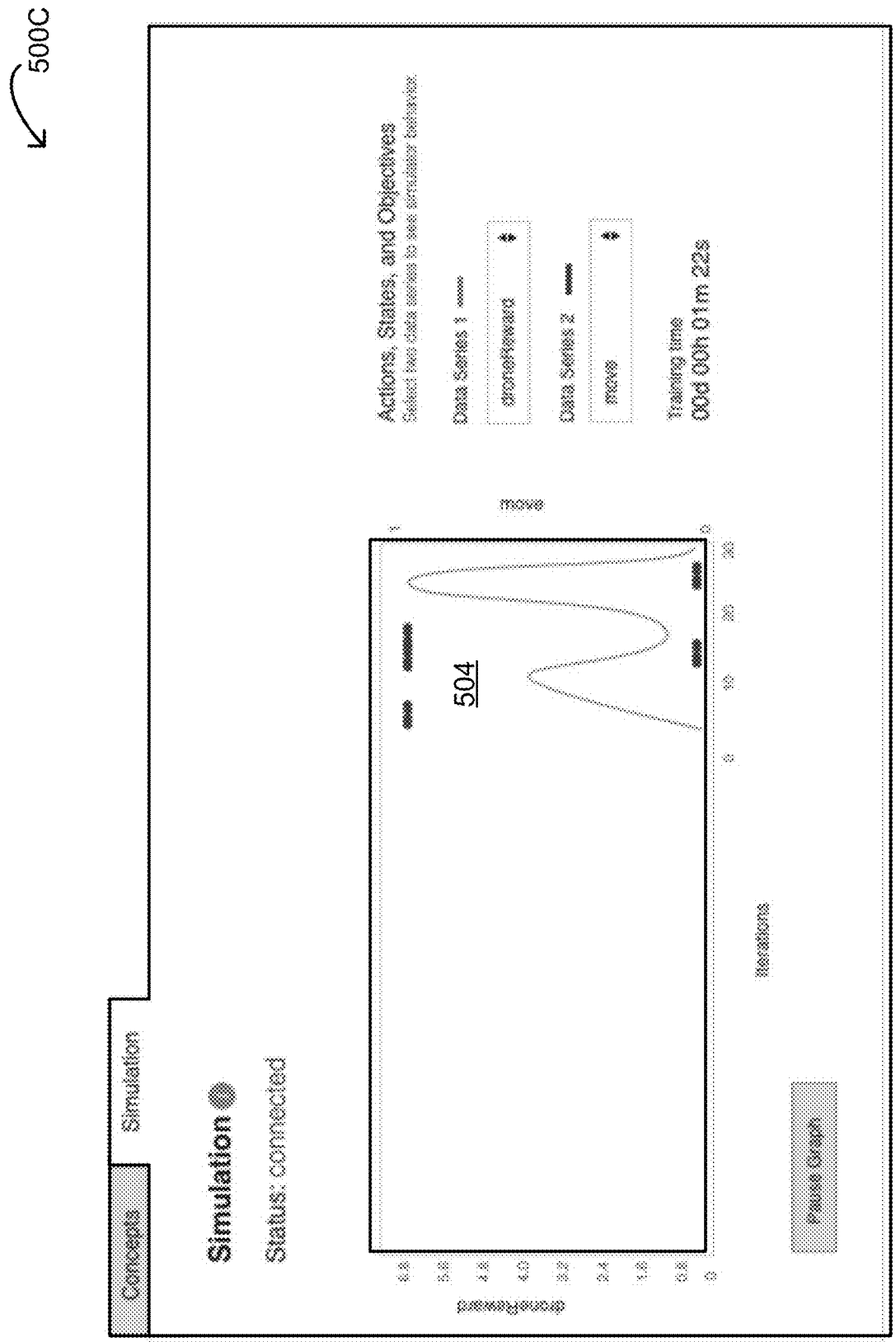

FIG. 5C provides a schematic illustrating a third visualization window of a visual debugging module in accordance with some embodiments.

Figure 5D:
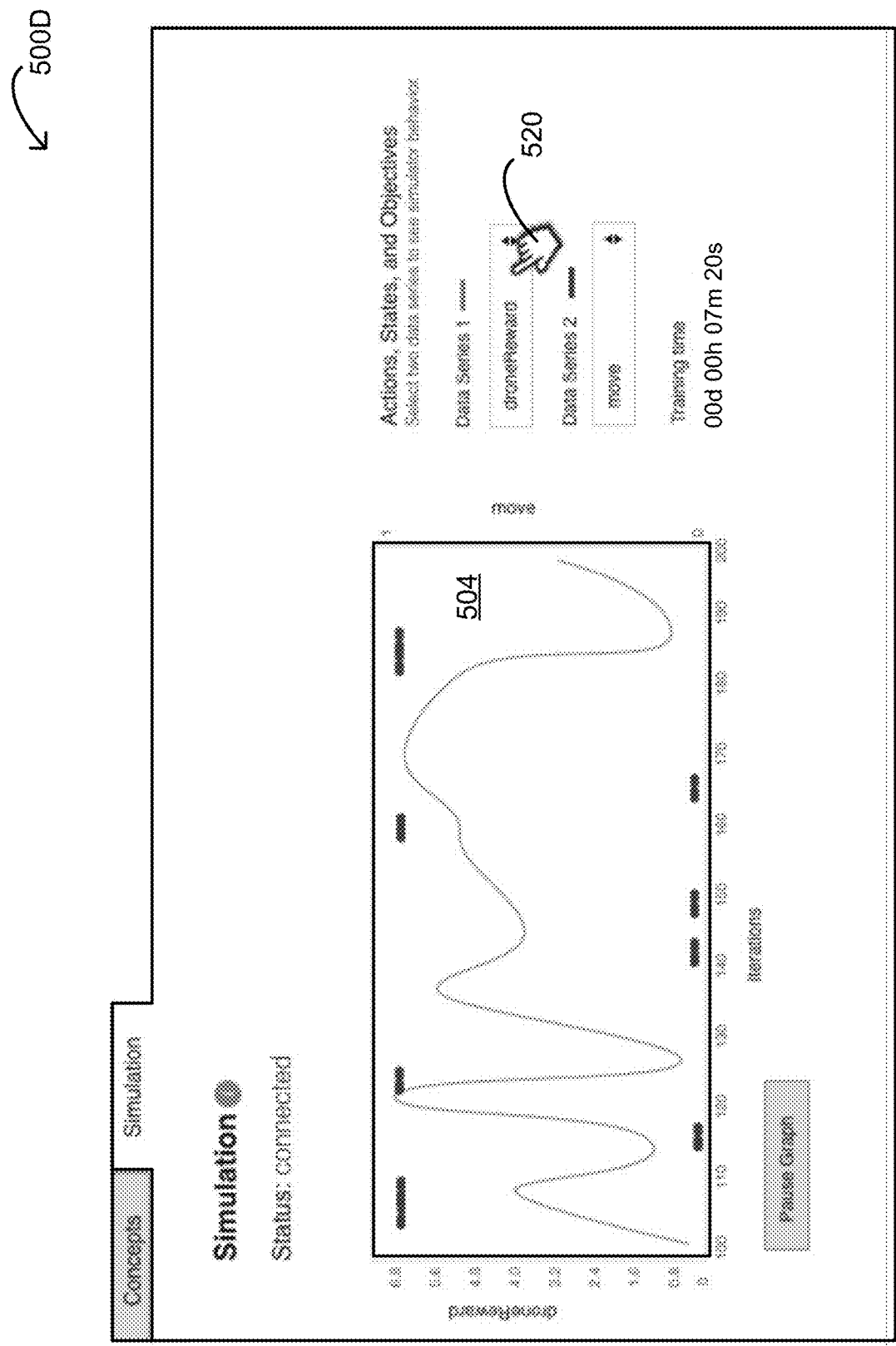

FIG. 5D provides a schematic illustrating a fourth visualization window of a visual debugging module in accordance with some embodiments.

Figure 5E:
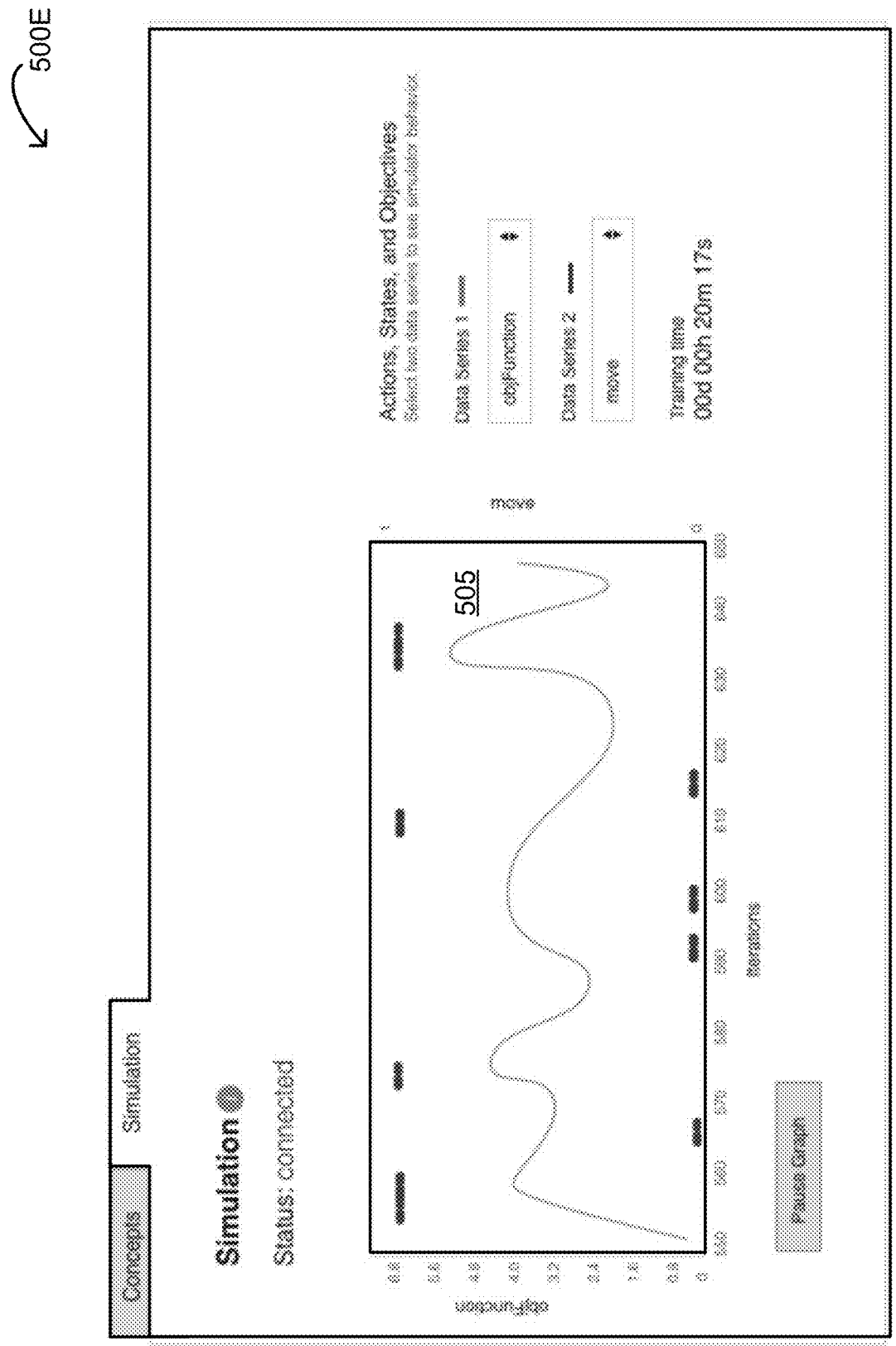

FIG. 5E provides a schematic illustrating a fifth visualization window of a visual debugging module in accordance with some embodiments.

Figure 5F:
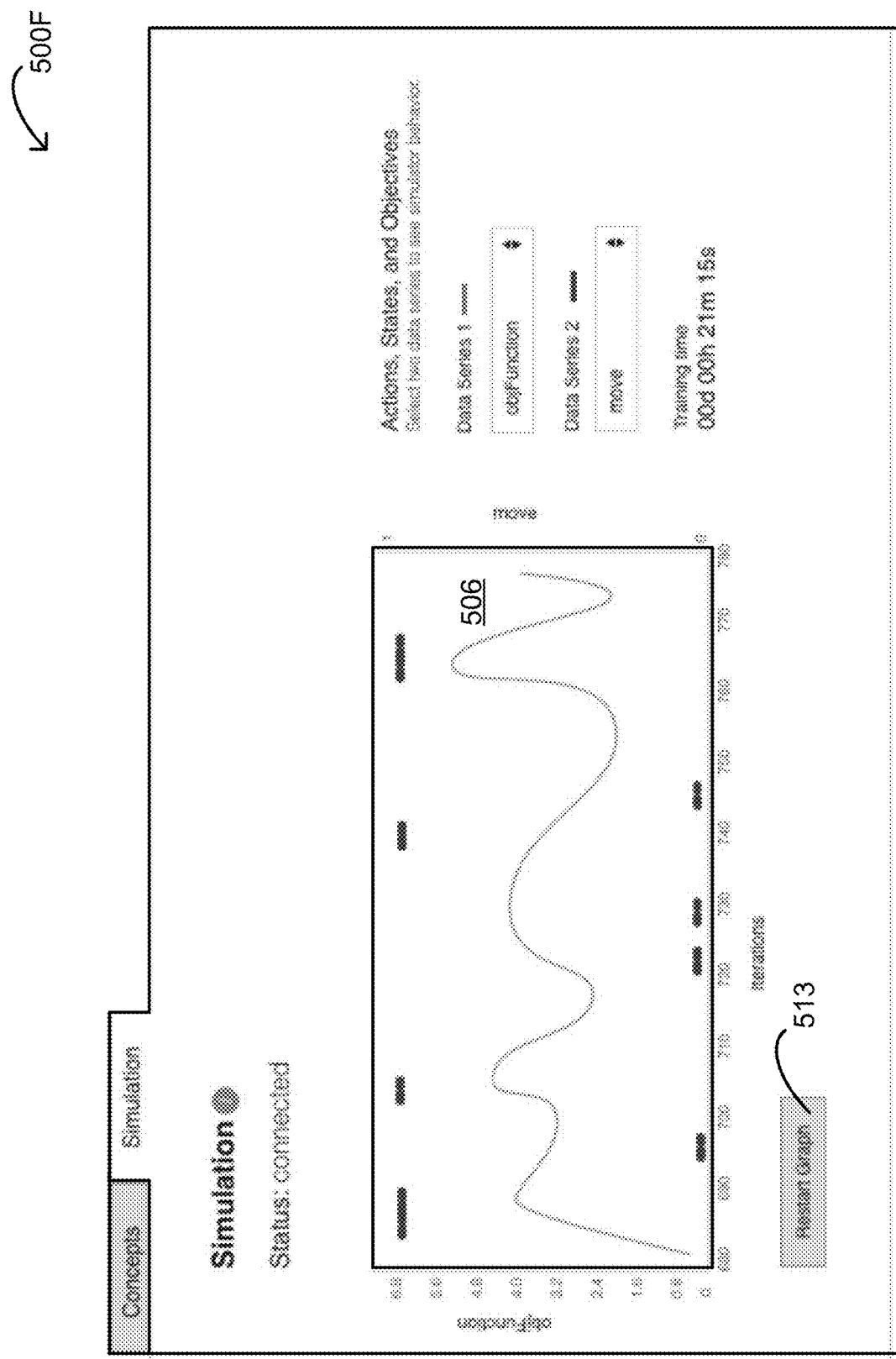

FIG. 5F provides a schematic illustrating a sixth visualization window of a visual debugging module in accordance with some embodiments.

Figure 5G:
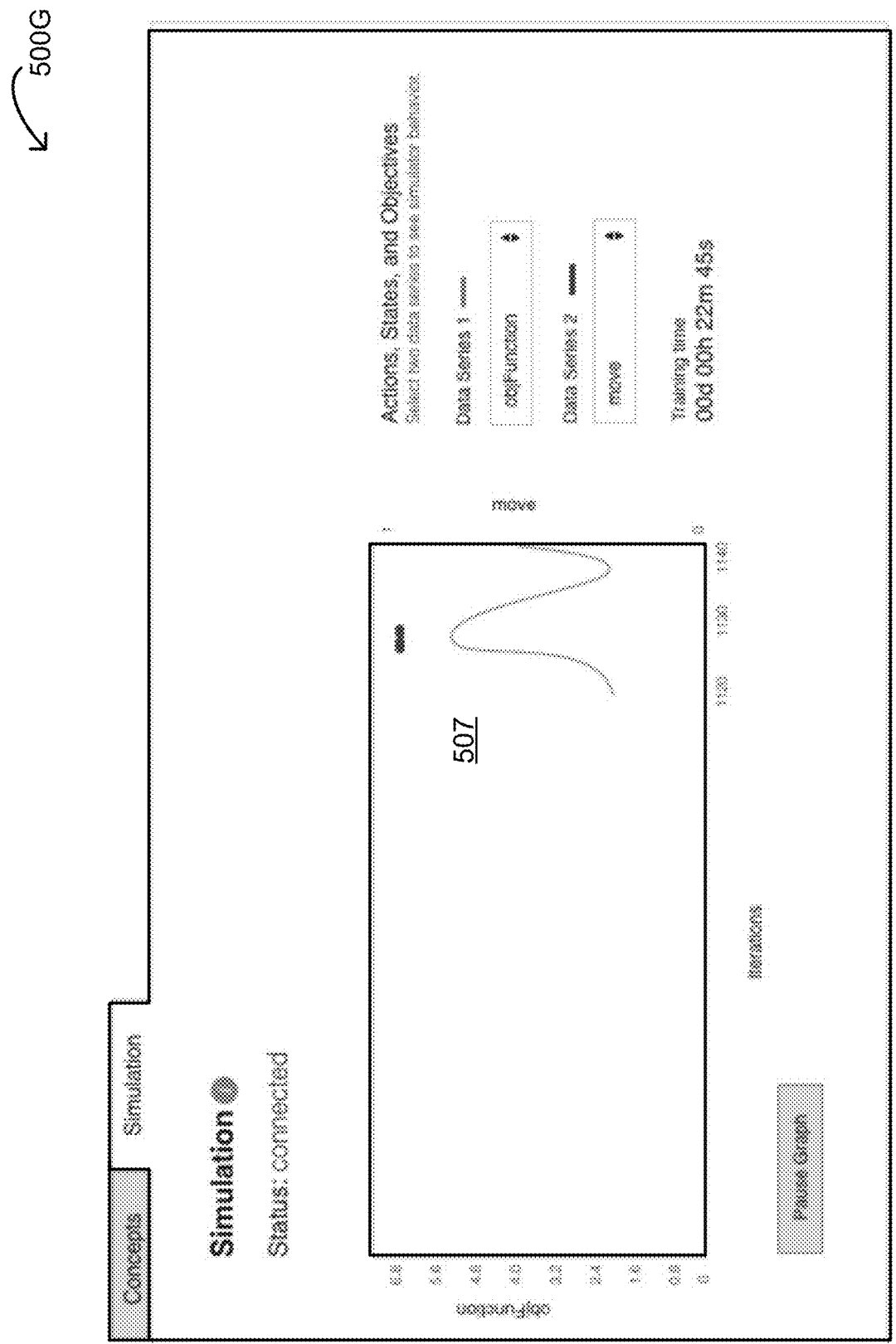

FIG. 5G provides a schematic illustrating a seventh visualization window of a visual debugging module in accordance with some embodiments.

Figure 5H:
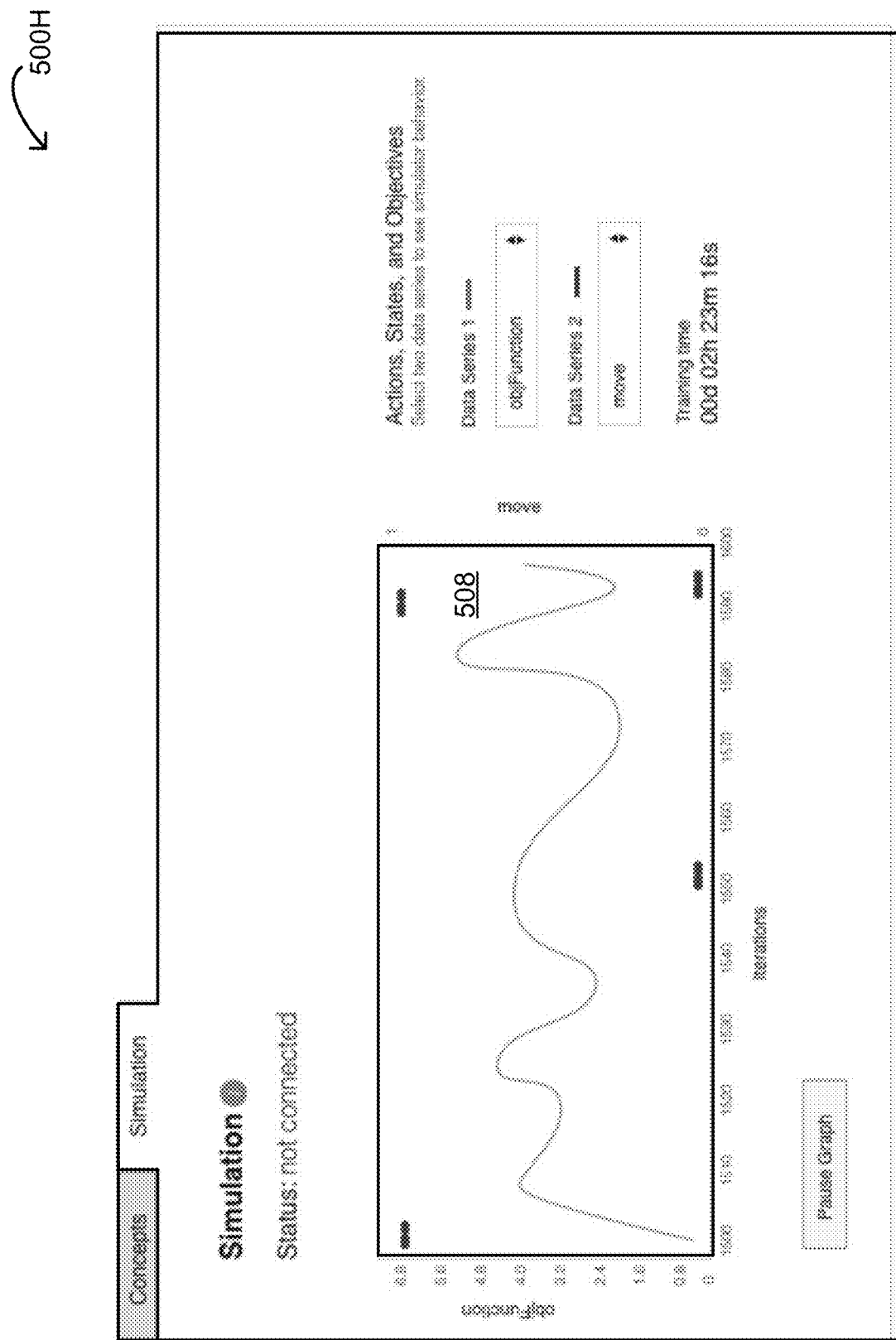

FIG. 5H provides a schematic illustrating an eighth visualization window of a visual debugging module in accordance with some embodiments.

Figure 6:
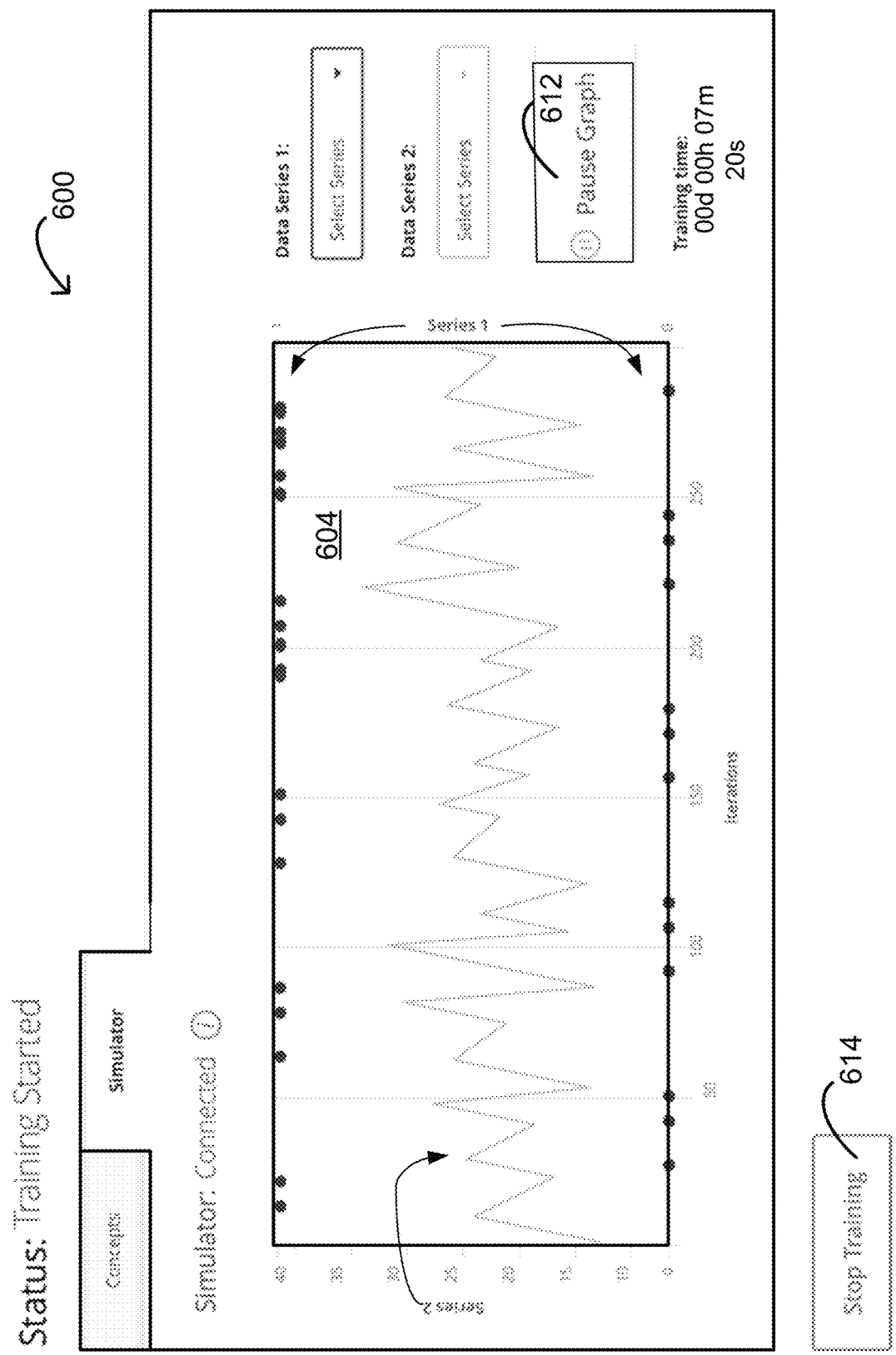

FIG. 6 provides a schematic illustrating a visualization window of a visual debugging module including a user-activated button configured to stop training in accordance with some embodiments.

Figure 7:
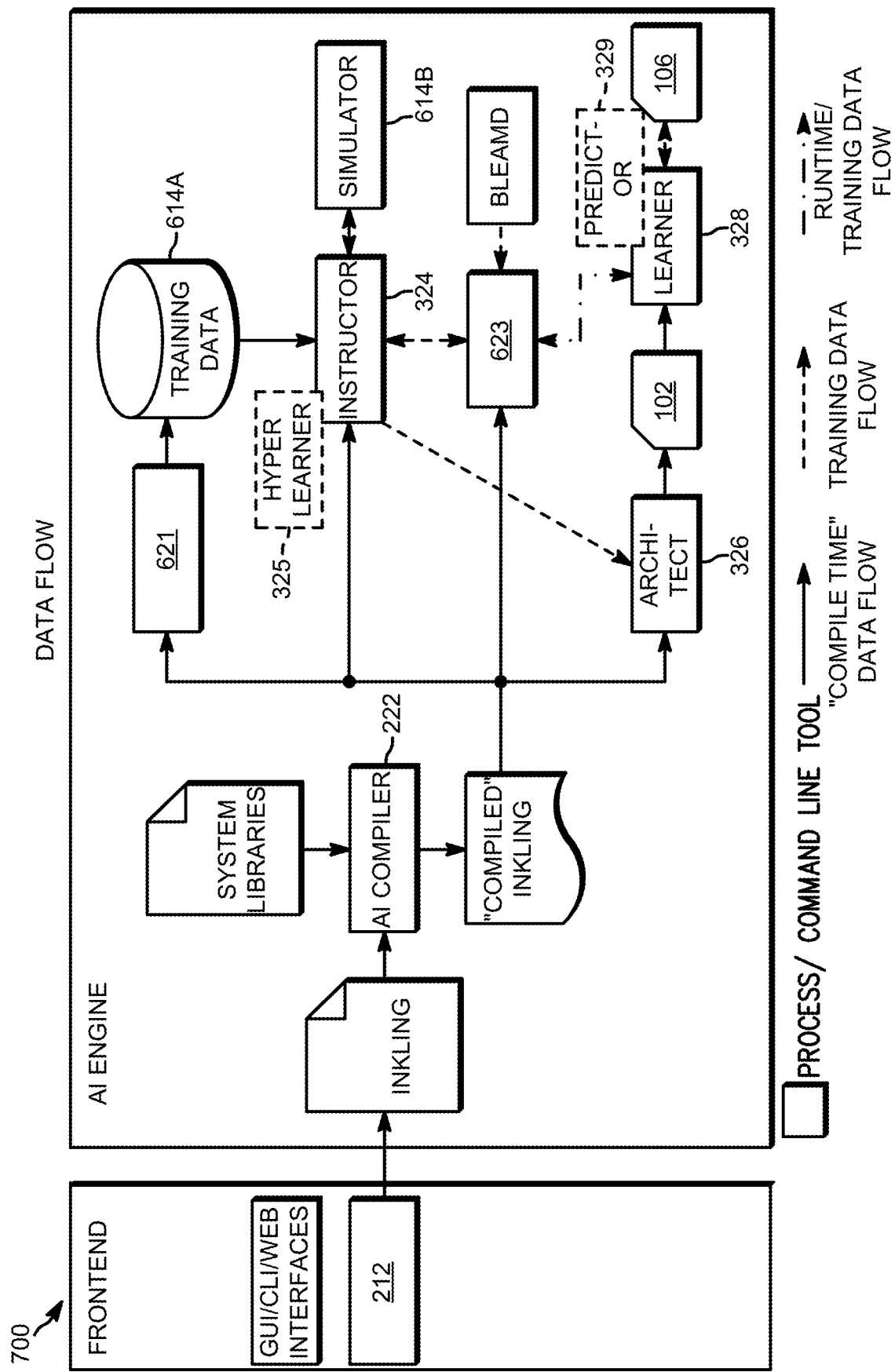

FIG. 7 provides a block diagram illustrating an AI system in accordance with some embodiments.

Figure 8:
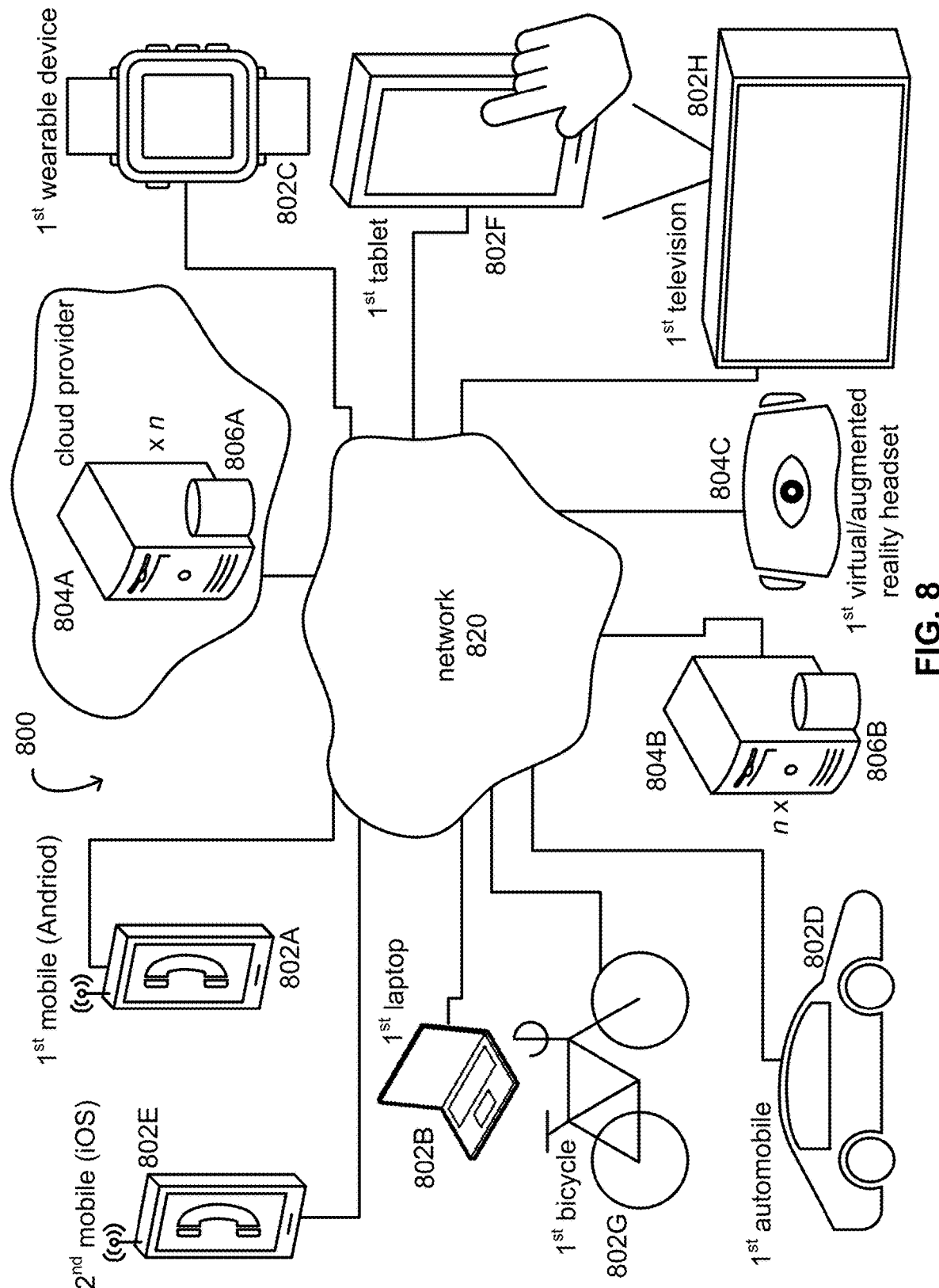

FIG. 8 provides a block diagram illustrating one or more networks in accordance with some embodiments.

Figure 9:
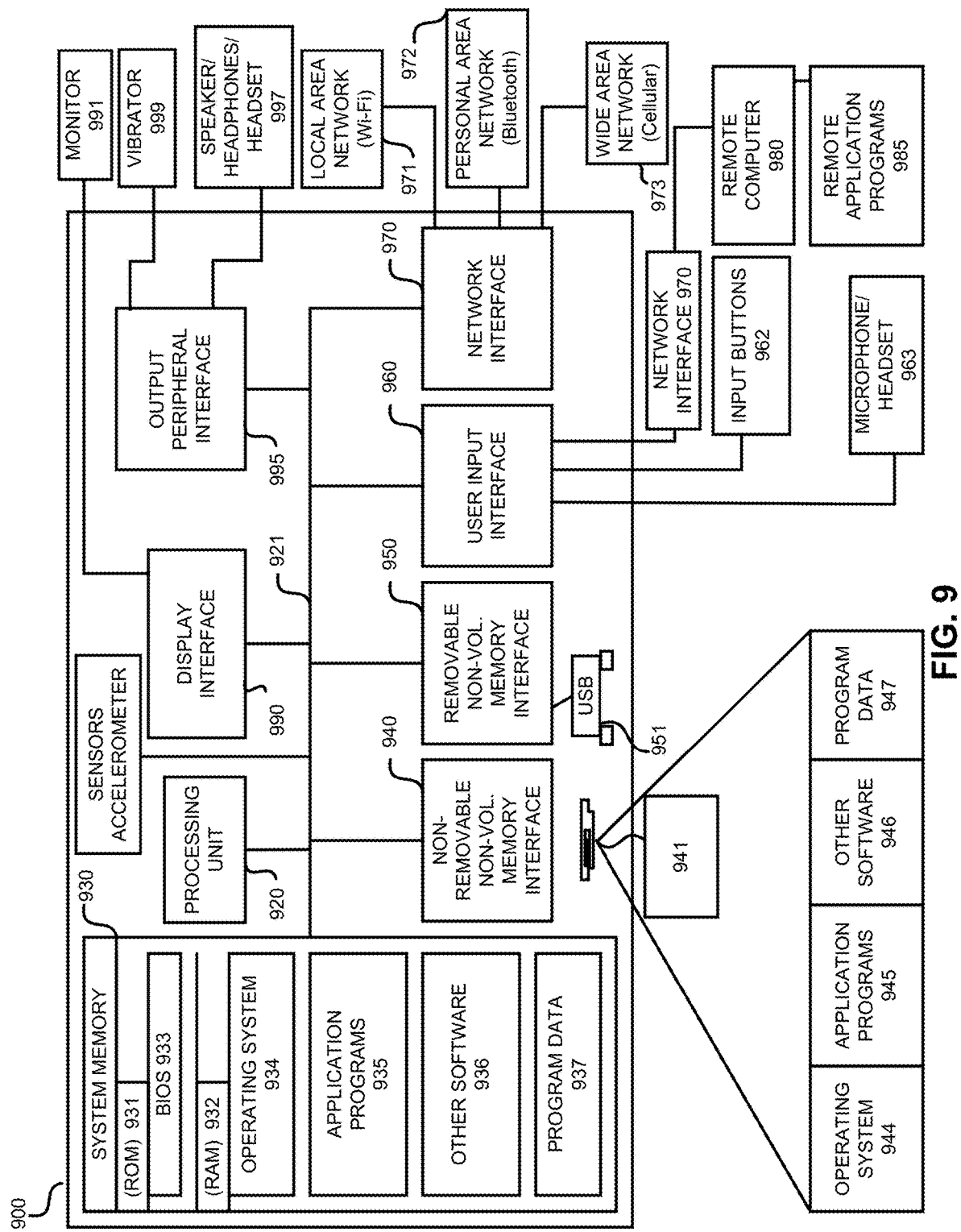

FIG. 9 provides a block diagram illustrating one or more computing systems in accordance with some embodiments.

Figure 10A:
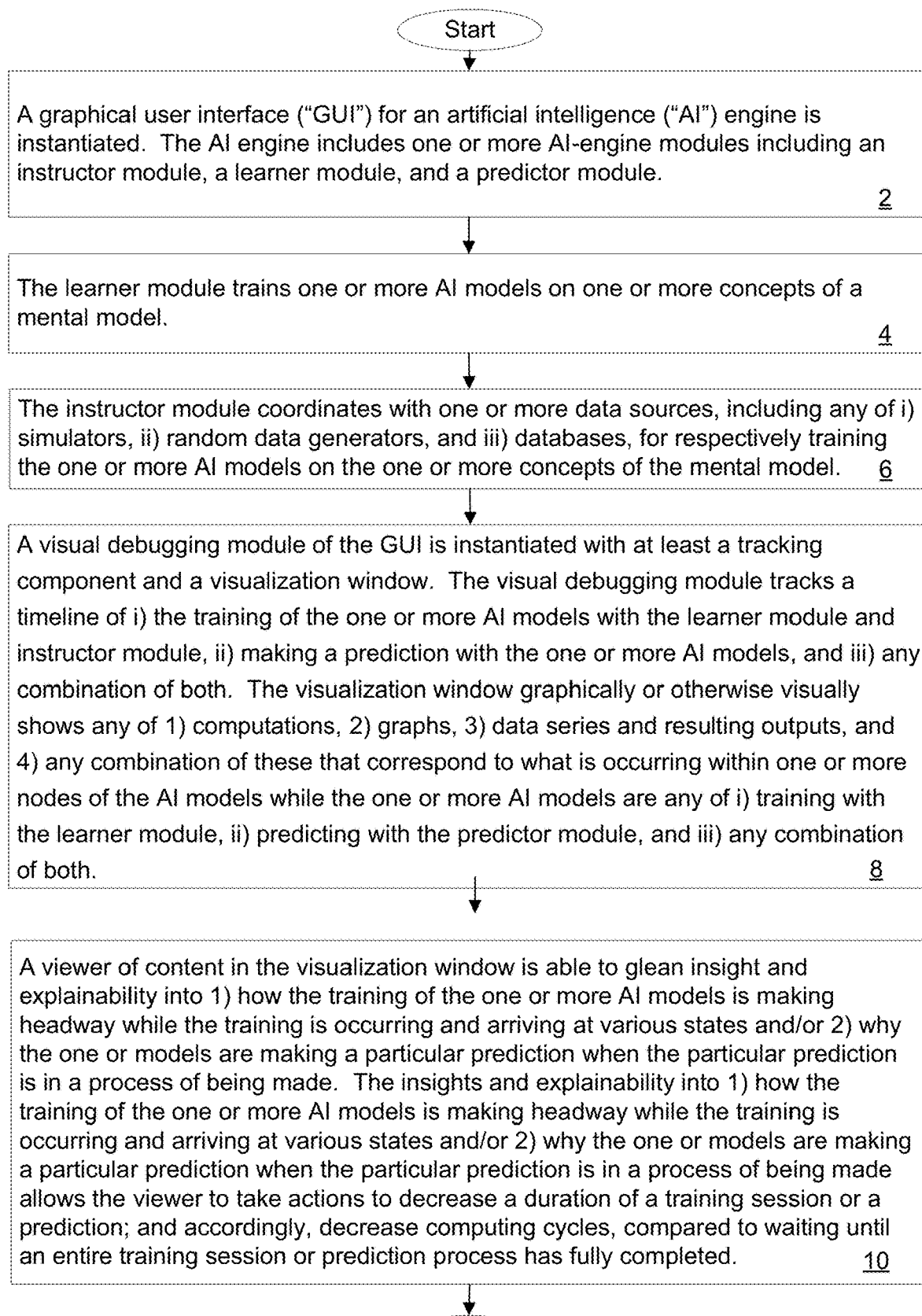

FIGS. 10A through 10C provide a flow diagram illustrating a method for a visual debugging tool for training one or more AI models, and/or making predictions with one or more AI models in accordance with an embodiment.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, memory in a device, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first database, can be made. However, the specific numeric reference should not be interpreted as a literal sequential order but rather interpreted that the first database is different than a second database. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

Training AI models can take days, weeks, or even longer. Provided herein are time-saving visual training aids and methods thereof for troubleshooting and debugging any training issues while such issues occur in the training of the AI models. Troubleshooting faulty (less than desired in accuracy) predictions coming from an AI model can also take a long time.

In general, an AI engine that is configured to work with a graphical user interface ("GUI") is provided. The AI engine includes one or more AI-engine modules including, in some embodiments, an instructor module, a learner module, a predictor module, and a visual debugging module of the GUI. A learner AI-engine module is configured to train one or more AI models on one or more concepts of a mental model defined in a pedagogical programming language. An instructor AI-engine module is configured to coordinate with one or more data sources, including any of i) simulators, ii) random data generators, and iii) databases, for respectively training the one or more AI models on the one or more concepts of the mental model. The visual debugging module may provide a visualization window for each AI model while the one or more AI models are at least training with the learner module and one or more simulators. The visual debugging module of the GUI may have a tracking component and the visualization window. The tracking component tracks a timeline of i) the training of the one or more AI models with the learner module and instructor module, ii) making a prediction with the one or more AI models, and iii) any combination of both. The visualization window graphically or otherwise visually shows any of 1) computations, 2) graphs, 3) data series and resulting outputs, and 4) any combination of these, that correspond to what is occurring within one or more nodes of the AI models while the one or more AI models are any of i) training with the learner module, ii) predicting with the predictor module, and iii) any combination of both. This allows a viewer of content in the visualization window to glean insight and explainability into 1) how the training of the one or more AI models is making headway while the training is occurring and arriving at various states and/or 2) why the one or models are making a particular prediction when the particular prediction is in a process of being made. The insights and explainability into 1) how the training of the one or more AI models is making headway while the training is occurring and arriving at various states and/or 2) why the one or models are making the particular prediction when the particular prediction is in the process of being made allows the viewer to take actions to decrease a duration of a training session or a prediction; and accordingly, decrease computing cycles, compared to waiting until an entire training session or prediction process has fully completed. Such insight provides the viewer with valuable information for troubleshooting and debugging any training issues with the training of the AI models.

FIGS. 1A-4D and FIGS. 7-9 illustrate example computing infrastructure, Artificial Intelligence Engines, training tasks, etc. that may be implemented with the visual debugging module. FIGS. 5A thru 6 and FIGS. 10A-10C illustrate example details about the visual debugging module. All of the FIGs. discuss example details of the design discussed herein.

Visual Debugging Module

FIG. 2 provides a block diagram illustrating an AI system with an AI engine and visual debugging module in accordance with some embodiments. Referring to FIG. 2, the AI engine is configured to work with a GUI that includes a visual debugging module such as the visual debugging module 213. The visual debugging module 213 is configured to provide a visualization window for each AI model of one or more AI models while respectively training the one or more AI models with one or more training data sources 219, such as a simulator. A first artificial intelligence model 106 is shown but many may be trained by the AI engine in parallel. From the visualization window, a viewer can glean insight and explainability into the training of the AI models while the simulations of the simulators are running and arriving at various states. Such insight provides the viewer with valuable information for subsequent troubleshooting and debugging any training issues with the training of the AI model including the training methodology therefor.

The visual debugging module 213 of the GUI may have a tracking component and the visualization window. The visualization window may be a simulator data visualization tool. The visualization window of the visual debugging module 213 graphically or otherwise visually shows any of i) computations, ii) graphs, iii) data series and resulting outputs, and iv) any combination of these in the visualization window that the nodes of the AI model, such as a neural network, was thinking when it arrives at specific conclusion. The visual debugging module 213 captures that information while the simulation is running. Thus, the visualization window visually shows calculations and/or graphs of selected information while the data source, such as a simulation, is still going. This allows a person viewing this information to glean insight into the explainability of how the predictions are being made/and/or training is progressing while the simulation is occurring. This can show how the simulation arrives at its outcome. In addition, the selected graphs can give better insight into why training is proceeding as it is. For example, the graph can show any two or more batched series of data in real time during the training on that graph to see their correlations and relationships. The graph can also show the state data received back and the rewards being calculated by the simulator. As discussed, other training or prediction sources can be used but a simulator will be used as an example.

FIGS. 5A-5H and 6 provide schematics illustrating visualization windows of a visual debugging module in accordance with some embodiments. The visualization window for each AI model provided by the visual debugging module includes at least a first tab, labeled 'Simulation', corresponding to a simulation for the AI model. The first tab can include a real-time plot of any one or more data series during the training of the AI model, which plot results in a training graph for the AI model for troubleshooting and debugging any training issues with the training of the AI model including the training methodology therefor. The visualization window for each AI model provided by the visual debugging module can also include a second tab, labeled 'Concepts', including a graphic of a metagraph including the one or more concepts of the mental model being learned by the AI model. Such a metagraph is shown as the metagraph 400A in FIG. 4A and described in reference to at least FIG. 4A.

FIG. 5A provides a schematic illustrating a first visualization window 500A of a visual debugging module with an empty training graph 502 before training of an AI model commences. At this stage, graphical elements in the visualization window 500A are present to a) alert viewers as to what is coming and b) avoid popping effects once training starts. However, certain graphical elements such as a pause button 512 for pausing the training graph (and not pausing the training itself) and data-series dropdowns 514 for choosing among data series are disabled. An information box 516 is in an auto-expanded state at this stage for first time viewers training AI models so that the information about the training data being graphed is conspicuous.

FIG. 5B provides a schematic illustrating a second visualization window 500B of a visual debugging module with a graphical spinner element 518 that is rendered while waiting for training data to fill the empty training graph 502 such as when training of the AI model commences but the training data are not yet available. Controls such as the pause button 512 remain disabled at this stage because the viewer is not able to control a training graph 504 (see FIG. 5C) until at least some of the training data is plotted in a training graph.

FIG. 5C provides a schematic illustrating a third visualization window 500C of a visual debugging module as the training graph 504 fills with training data such as when training of the AI model commences and simulation data are received. The training graph 504 begins to fill in from right to left as the training data is plotted. The abscissa also fills in at this time with values corresponding to training episodes from right to left. The training graph 504 continuously updates as the training data is made available to the visual debugging module. There can be a brief pause between when the training of the AI model commences and when the training graph 504 appears and, for this reason, the spinner element 518 (see FIG. 5B) is used to indicate to the viewer that the training graph 504 is imminent.

The tracking component tracks a timeline of the training of the one or more AI models. For example, this AI model has been training on this concept for 1 minute and 22 seconds.

The training graph 504 of FIG. 5C is configured to show up to at least a scrolling 100-episode set of training episodes as seen in FIG. 5D; however, the training graph 504 is not limited to a 100-episode set of training episodes as the visual debugging module can be configured to provide fewer training episodes such as 50 or fewer training episodes or more training episodes such 150 or more training episodes. Fewer training episodes allows a viewer to effectively zoom in on a particular number of training episodes for a detailed analysis of the particular number of training episodes. These are merely a few examples of multi-episode sets of training. More training episodes allow a viewer to effectively zoom out for a global analysis of the training of the AI model.

One or more data series, such as two data series, can be pre-selected to be shown in the visualization window together. The selected data series can include actions taken by the AI model, states of the simulator, functions related to the training of the AI model, etc. As shown, a function titled "droneReward" is pre-selected for a first data series of the two data series and an action taken by the AI model titled "move" is pre-selected for a second data series of the two data series. The function titled "droneReward" is a continuous variable, so it is plotted as a curve, whereas the action taken by the AI model titled "Move" is a discrete variable, so it is plotted with discrete dots. As such, the plots for the training graph 504 are discrete or continuous depending upon the data series having discrete or continuous variables.

The information box 516 of FIG. 5A is in a collapsed state in FIG. 5C to reserve space for the training graph 504. Collapsing the information box 516 is configured as a viewer-driven action.

FIG. 5D provides a schematic illustrating a fourth visualization window 500D of a visual debugging module with the training graph 504 filled with training data from training the AI model and a pointer 520 prior to a viewer choosing a different data series for the training graph 504. The visualization window is configured such that the viewer can click on either one of the data series listed in the dropdowns 514 (see FIG. 5A) resulting in a list of choices for the selected data series. The two dropdowns 514 represent independently selectable data series, but the data series are also mutually exclusive of each other in that the listed item selected in Data Series 1 (e.g. "droneReward," "height," etc.) is grayed out in Data Series 2 and vice versa. Such grayed out data series are shown in italics in Tables 1 and 2 below.

TABLE 1

Example data series for dropdowns 514 in FIG. 5D.

| | Data Series 1 | | Data Series 2 |
|---|---|---|---|
| X | droneReward | | *droneReward* |
| | objFunction | | objFunction |
| | angle | | angle |
| | *move* | X | move |
| | height | | height |
| | acceleration | | acceleration |
| | ImagesFound | | ImagesFound |
| | rotation | | rotation |

After the viewer clicks, for example, "height" in Data Series 1, the dropdown lists and the training graph 504 update:

TABLE 2

Example data series for dropdowns 514 in FIG. 5D.

| | Data Series 1 | | Data Series 2 |
|---|---|---|---|
| | droneReward | | droneReward |
| | objFunction | | objFunction |
| | angle | | angle |
| | *move* | X | move |
| X | height | | *height* |
| | acceleration | | acceleration |
| | ImagesFound | | ImagesFound |
| | rotation | | rotation |

The actions taken by the AI model, states of the simulator, and functions related to the training of the AI model in the dropdowns 514 for the different data series are listed in the order that they appear in the corresponding Inkling (available from Bonsai AI, Inc. of Berkeley, Calif.) file (i.e., objectives, then actions, then states). Because there is no particular limit on the foregoing actions, states, and functions in the corresponding Inkling file, there is no particular limit to the actions, states, and functions that can be listed in the dropdowns 514 for the different data series. Indeed, even composite data series formed as a function of difference between two different data series can be listed in the dropdowns 514 for the different data series, which composite data series can likewise be independently selectable at any time during the training of the AI model. Either the Inkling itself can include such composite data series or the visual debugging module can include, as well as calculate on the fly, the composite data series for at least commonly encountered data series.

Note that since time has elapsed, as tracked by the tracking component, between the training graph 504 shown in FIG. 5C and the training graph 504 shown in FIG. 5D, the abscissa has updated. In this example, the training on this concept has now been going for 7 minutes and 20 seconds.

FIG. 5E provides a schematic illustrating a fifth visualization window 500E of a visual debugging module with an updated training graph 505 filled with auto-updated data from training the AI model subsequent to the viewer choosing the different data series for the training graph. Now that the viewer has selected a different listed item for Data Series 1, namely "objFunction," the updated training graph 505 has auto-updated. At least the training data for "droneReward" are redrawn, replacing the training data for "objFunction" in the updated training graph 505, as well as for the training graph 505 going forward (until new parameters are selected).

FIG. 5F provides a schematic illustrating a sixth visualization window 500F of a visual debugging module with a paused training graph 506 while training of the AI model continues. If the visualization window 500F is configured for a 100-episode plot of training episodes, pausing the training graph pauses it around a particular 100-episode plot of training episodes for the viewer to glean insight and explainability into the training of the AI model for an indefinite amount of time. Pausing the training graph does not pause the training of the AI model, as training continues until manually or automatically stopped.

While the training graph is paused, the viewer can continue to change the data series as shown and described in reference to FIG. 5E to explore the data in new data correlations. For example, either data series of the two different data series shown in Tables 1 and 2 can be changed to at least a third different data series while the paused training graph 506 is paused on, for example, a particular 100-episode set of training episodes. The third data series is to allow the viewer to further glean insight and explainability into the training of the AI model from the different data series in new data correlations during the paused set of training episodes.

Again, training data continues to be generated as the training of the AI model continues, but the visual debugging module does not graph the training data in the paused training graph 506 until the paused training graph 506 is restarted as a restarted training graph 507 (see FIG. 5G). At that time, the restarted training graph 507 displays the training data in real-time as the AI model is trained, beginning with the current training episode.

A time-series database such as the time-series database 217 of FIG. 2 can be used to store at least some of the training data up to all of the training data corresponding to training an AI model in some embodiments. In such embodiments, the training graph of an AI model can be continuously scrolled from a beginning of the stored training data up to an end of the stored training data in the time-series database, which is optimized for streaming sequential data for any one or more selected data series. This is useful for a historical review of the training of an AI subsequent to the training of the AI model. That said, an AI model can also be trained to detect and report any training issues from the training graphs presented in the visual debugging window obviating a viewer having to sit and view the training graphs in real-time to make such determinations. Indeed, the foregoing trained AI model would not be overwhelmed by more than two data series and would likely be able to find higher level correlations.

FIG. 5G provides a schematic illustrating a seventh visualization window 500G of a visual debugging module with the restarted training graph 507 in sync with current training of the AI model.

To restart the paused training graph 506, the viewer can press a restart button 513 (see FIG. 5F) to restart as the restarted training graph 507. An area of the visualization graph 500F configured for the training graph clears and training data is once again plotted from the right to the left of the area. Since training of the AI model has continued while the training graph 506 was paused, the abscissa resets with the current training episode. If not collapsed, the information box 516 (see FIG. 5A) can be configured to explain why the training graph restarts without picking up where it left off for new viewers.

FIG. 5H provides a schematic illustrating an eighth visualization window 500H of a visual debugging module with a completed training graph 508 when training of the AI model is complete. As shown under the collapsed information box 516, the simulation is no longer connected, and the pause button 512 is disabled as the completed training graph 508 is no longer updating. However, users can still select different data series from the data series dropdowns 514 (see FIG. 5A).

Again, the visualization window for each AI model provided by the visual debugging module can also include a second tab including a graphic of a metagraph such as the metagraph 400A in FIG. 4A, which metagraph includes the one or more concepts of the mental model being learned by the AI model. The graphic of the second tab provides data going into and out of the metagraph, (See e.g. FIG. 3A showing the data input and output from the concept node of "get high score.") The data can correspond to one or more selected data series for actions taken by the AI model, states of the simulator, functions related to the training of the AI model over time, etc. Selected data series are plotted as the training graph of the any one or more data series during the training of the AI model in the first tab of the visualization window.

FIG. 6 provides a schematic illustrating a visualization window 600 of a visual debugging module with a training graph 604 filled with training data such as when training an AI model and receiving simulation data. The visualization window 600 is like that described in reference to FIGS. 5A-5H; however, a pause button 612 of the visualization window 600 is placed at a right-hand side of the visualization window 600 instead of below the training graph 604 like the visualization windows of FIGS. 5A-5H. As shown in FIG. 6, a training toggle 614 is further included in the visualization window 600 below the training graph 604. Unlike the pause button 612, which pauses the training graph 604 around a particular set of episodes for the viewer to glean insight and explainability into the training of the AI model, toggling the training toggle 614 pauses or even stops (depending upon configuration settings) the training of the AI model. This is useful for the viewer to further glean insight and explainability into the training of the AI model without missing any episodes of the training, which would otherwise occur if the training graph 604 was merely paused. That said, some viewers prioritize a timely completion of the training of the AI model over such further insight and explainability.

Backend Infrastructure

FIG. 1A provides a block diagram illustrating an AI system 700A and its cloud-based computing platforms infrastructure in accordance with some embodiments. A backend cloud platform can exist of various servers, processes, databases, and other components that connect over a network, such as the Internet, to a plurality of computing devices. The backend cloud platform is configured to handle the scaling, efficiency, etc. Such a cloud platform can be a public cloud, Virtual Public Cloud, or a private cloud. Note, a similar computing platform may also be implemented on an on-premises computing platform such as FIG. 1B.

In an embodiment, a user, such as a software developer, can interface with the AI system 700A through an online interface 701. However, the user is not limited to the online interface, and the online interface is not limited to that shown in FIG. 1A. An input may be supplied from an online API, such as www.bons.ai, a command line interface, and a graphical user interface such as an Integrated Development Environment ("IDE") such as Mastermind (available from Bonsai AI, Inc. of Berkeley, Calif.). With this in mind, the AI system 700A of FIG. 1A can enable a user to make API and web requests through a domain name system ("DNS") 701, which requests can be optionally filtered through a proxy to route the API requests to an API load balancer 705 and the web requests to a web load balancer 707. Alternatively, the proxy service may be part of a service running on a CPU computing device. The API load balancer 705 can be configured to distribute the API requests among multiple processes wrapped in their own containers running in a containerization platform, such as a Docker-type network. The web load balancer 707 can be configured to distribute the web requests among the multiple processes wrapped in their own containers running in this containerization platform. The network can include a cluster of one or more central processing unit ("CPU") computing devices 709 and a cluster of one or more graphics processing unit ("GPU") computing devices 711. One or more services running in the network will scale to more or less CPU computing devices 709 and GPU computing devices 711 as needed. The CPU computing devices 709 can be utilized for most independent processes running on the swarm network. The GPU computing devices 711 can be utilized for the more computationally intensive independent processes such as TensorFlow, available from Bonsai AI, Inc. of Berkeley, Calif., and the learner process. Various services may run on either the CPU computing device 709 or in the GPU computing device 711, as capacity in that machine is available at the time.

As further shown in FIG. 1A, a logging stack, such as an Elastisearch-Logstash-Kibana ("ELK") stack cluster, 713 can be shared among all production clusters for dedicated monitoring and indexing/logging.

The cloud-based platform with multiple independent processes is configured for the user to define the AI problem to be solved. In an embodiment, all of the individual processes are wrapped into a container program such as a Docker. The software container allows each instance of that independent process to run independently on whatever computing device that instance is running on.

A software process may be an instance of an executable file configured to perform a task in a finite amount of time i.e. a job. Thus, each process is configured to operate for a finite amount of time to achieve its configured goal and then shut down until invoked again when needed in the future. Several instances of a same process each wrapped in its own container may run simultaneously on one or more computing devices. A service may be a process, which runs in the background. Each independent process is configured to be aware of the existence of the other processes and knows whom to call and what data and types of inputs that other processes look for.

The individual processes in the AI engine utilize a scaling hardware platform, such as Amazon Web Services ("AWS"), so that the individual processes of the AI engine, the amount of Central Processing Units ("CPUs"), Graphics Processing Units ("GPUs"), and RAM may dynamically change overtime and rapidly change to scale to handle multiple users sending multiple AI models to be trained.

For example, an engineer service can be configured to dynamically change an amount of computing devices 709, 711 overtime running independent processes and to rapidly change the amount to scale to handle multiple users sending multiple AI models to be trained. A conductor service or an engineer service can cause a first instance of an instructor process to be instantiated, loaded onto a CPU computing device, and then run on a first CPU computing device 709.

The AI engine may have multiple independent processes on the cloud-based platform. The multiple independent processes may be configured as an independent process wrapped in its own container so that multiple instances of the same processes, e.g. learner process and instructor process, can run simultaneously to scale to handle one or more users to perform actions. The actions can include 1) running multiple training sessions on two or more AI models at the same time, in parallel, 2) creating two or more AI models at the same time, 3) running a training session on one or more AI models while creating one or more AI models at the same time, 4) deploying and using two or more trained AI models to do predictions on data from one or more data sources, and 5) any combination of these four, on the same AI engine. CPU bound services can include, for example, a document database for storing AI objects such as an AI database; a Relational Database Server such as PostgreSQL; a time-series database 217 such as InfluxDB database optimized to capture training data going into and out of a metagraph (e.g., metagraph 400A or FIG. 4A) for at least a 100-episode set of training episodes for training an AI model; an AI-model service including an architect module and AI compiler; an AI-model web service; a conductor service; a watchman service; a CPU Engineer service; an instructor process; a predictor service; and other similar processes. GPU Bound services can include, for example, a GPU Engineer service, a learner process, and other computationally heavy services. For example, a first CPU computing device may load and run an architect module. A second CPU computing device may load and run, for example, an instructor process. A first GPU computing device may load and run, for example, a learner process. A first service such as an engineer service, may then change an amount of computing devices running independent processes by dynamically calling in a third CPU computing device to load and run, for example, a second instance of the instructor process, and calling in a second GPU computing device to load and run, for example, a second instance of the learner process.

Scaling in this system may dynamically change both 1) an amount of independent processes running and 2) an amount of computing devices configured to run those independent processes, where the independent processes are configured to cooperate with each other. The dynamic changing of an amount of computing devices, for example, more GPUs or CPUs in order to run additional instance of the independent processes allows multiple users to utilize the cloud-based system at the same time and to, for example, 1) conduct multiple training sessions for AI models in parallel, 2) deploy AI models for use, and 3) create new AI models, all at the same time. Clusters of hardware of CPU devices and GPU devices can be dynamically scaled in and out on, for example, an hourly basis based on percent load capacity used and an amount of RAM memory left compared to a current or expected need.

FIG. 1B provides a block diagram illustrating an AI system 700B and its on-premises based computing platforms infrastructure in accordance with some embodiments. Following on the AI system 700A, a bastion host server and one or more CPU computing devices, such as a first CPU computing device 709A and a second computing device 709B, can be on a public subnet for bidirectional communication through an Internet gateway. One or more GPU computing devices, such as a first GPU computing device 711A, can be on a private subnet communicatively coupled with the public subnet by means of a subnet there between. The one or more CPU computing devices on the public subnet can be utilized on a first CPU computing device 709A by the compiler and the architect module/process that are part of an AI-model service. One or more other CPU computing devices on a second CPU computing device 709B on the private subnet can be utilized by the instructor module. The GPU computing devices can be utilized by the learner module/process and the predictor module/process. As further shown in FIG. 1B, the private subnet can be configured to send outgoing communications to the Internet through a network address translation ("NAT") gateway.

Each of the independent process can be running its own computing device 709A-711A and then using a subnet to communicate communications between the other independent processes. As capacity exists, some independent processes may share a computing device. Also, using the subnets is much faster than, for example trying to conduct communications through the Internet via the Gateway, which would have a longer round-trip delay time or lag time.

Individual processes programmed to achieve and perform different functions within the AI engine are broken up into an individual process, each in its own software container. For example, 1) the architect process can be configured to create, instantiate, and figure out the topology of an AI model corresponding to a concept being trained for AI, 2) an instructor process can be configured to guide the training and how to do the training, and 3) a learner process to carrying out an actual execution of the training as well as 4) a predictor process, during an AI model's deployment, to make use of a trained AI model. Breaking these up into individual processes/modules that are aware of each other and know which process and/or service to call and how to call that process and also know which inputs and outputs to send to each other, allows the training to be broken up into these multiple discrete individual services.

Each backend process is configured as an independent process wrapped in its own container so that multiple instances of the same processes, e.g. learner and instructor, may be running simultaneously to scale to handle multiple users running training sessions, deploying AI modules, and creating AI models, all at the same time. Thus, the backend cloud platform for the AI engine exists with servers, processes, and databases, that allows many users to connect over a wide area network, such as the Internet, from multiple computing devices and then the backend of the cloud platform is configured to handle the scaling, efficiency, etc. by dynamically calling in additional computing hardware machines to load on and run the independent processes of, for example, an instance of the learner and/or instance of the instructor, as needed.

The multiple independent processes carry out four or more separate tasks by interaction with and cooperation between the multiple independent processes. A first task can be creating a shell of an AI model, such as creating an AI model. A second task can be loading in a file of scripted code in a programming language to help define 1) a topology of processing nodes in the AI model, 2) a layout of the concepts making up the AI model, and 3) a selection of an appropriate learning algorithm for the AI model. The file created in pedagogical software programming language, such as Inkling helps the architect module to create the topology of processing nodes in the AI model, the layout of the concepts making up the AI model, etc. derived from the programming code. The third task is starting to train the AI model with a data source, such as a simulator. The fourth task is then deploying and using a trained AI model to do, for example, predictions on data from the data source.

Each independent process, such as 1) the instructor module, 2) the learner module, and 3) the architect module as part of an AI-model service can be configured to be able to operate on either of a CPU computing device or a GPU computing device or both.

Brief Discussion of Components in the AI Engine

FIG. 2 provides a block diagram illustrating an AI system with an AI engine and visual debugging module in accordance with some embodiments.

The AI engine for generating a trained AI model 106 can include one or more AI-generator modules selected from at least an instructor module 324, an architect module 326, and a learner module 328 as shown. The instructor module 324 can optionally include a hyperlearner module 325, which can be configured to select one or more hyperparameters for any one or more of a neural network configuration, a learning algorithm, and the like. The hyperlearner module 325 can optionally be contained in a different AI-generator module such as the architect module 326 or the learner module 328, or the hyperlearner module 325 can be an AI-generator module itself. The learner module 328 can optionally include a predictor module 329, which can provide one or more predictions for a trained AI model. The predictor module 329 can optionally be contained in a different AI-generator module such as the instructor module 324 or the architect module 326, or the predictor module 329 can be an AI-generator module itself. The AI engine including the foregoing one or more AI-generator modules can be configured to generate the trained AI model, such as trained AI model 106, from compiled scripted software code written in a pedagogical software programming language via one or more training cycles with the AI engine.

The visual debugging module 213 of the GUI may include a tracking component and a visualization window. The tracking component tracks a timeline of i) the training of the one or more AI models with the learner module 328 and instructor module 324, ii) making a prediction with the one or more AI models, and iii) any combination of both. The visualization window graphically or otherwise visually shows information that corresponds to what is occurring within one or more nodes of the AI models while the one or more AI models are any of i) training with the learner module, ii) predicting with the predictor module 329, and iii) any combination of both.

Note, each trained AI model itself can be a collection of trained AI objects corresponding to a main concept and a set of sub concepts feeding parameters into the main concept. The AI database can index AI objects corresponding to the main concept and the set of sub concepts making up a given trained AI model so that reuse, recomposition, and reconfiguration of all or part of a trained AI model is possible.

One or more clients 210 can make a submission to create a trained AI model. Once a Mental Model (see FIGS. 3A, 3B, 4A, and 4B) and Curricula have been coded in the pedagogical software programming language, then the code can be compiled and sent to the three main modules, the learner module 328, the instructor module 324, and the architect module 326 of the AI engine for training. One or more user interfaces 212, such a web interface, a graphical user interface, and/or command line interface, will handle assembling the scripted code written in the pedagogical software programming language, as well as other ancillary steps like registering the line segments with the AI engine, together with a single command. However, each module—the AI compiler module 222, the web enabled interface 221 to the AI engine, the learner module 328, etc. can be used in a standalone manner, so if the author prefers to manually invoke the AI compiler module, manually perform the API call to upload the compiled pedagogical software programming language to the modules of the AI engine, etc., they have the flexibility and freedom to do so.

Thus, one or more clients 210 can send scripted code from the one or more user interfaces 212 or another user interface to the AI compiler 222. The AI compiler 222 compiles the scripted software code written in a pedagogical software programming language. The AI compiler 222 can send the compiled scripted code, similar to an assembly code, to the instructor module 324, which, in turn, can send the code to the architect module 326. Alternatively, the AI compiler 222 can send the compiled scripted code in parallel to all of the modules needing to perform an action on the compiled scripted code. The architect module 326 can propose a vast array of machine learning algorithms, such as various neural network layouts, as well as optimize the topology of a network of intelligent processing nodes making up an AI object. The architect module 326 can map between concepts and layers of the network of nodes and send one or more instantiated AI objects to the learner module 328. Once the architect module 326 creates the topological graph of concept nodes, hierarchy of sub concepts feeding parameters into that main concept (if a hierarchy exists in this layout), and learning algorithm for each of the main concept and sub concepts, then training by the learner module 328 and instructor module 324 may begin.

The instructor module 324 can request training data from the training data source 219. Training can be initiated with an explicit start command in the pedagogical software programming language from the user to begin training. In order for training to proceed, the user needs to have already submitted compiled pedagogical software programming language code and registered all of their external data sources such as simulators (if any are to be used) via the user interfaces with the learner and instructor modules 328, 324 of the AI engine.

The training data source 219 can send the training data to the instructor module 324 upon the request. The instructor module 324 can subsequently instruct the learner module 328 on training the AI object with pedagogical software programming language based curricula for training the concepts into the AI objects. Training an AI model can take place in one or more training cycles to yield a trained state of the AI model 106. The instructor module 324 can decide what pedagogical software programming language based concepts and streams should be actively trained in a mental model. The instructor module 324 can know what are the terminating conditions for training the concepts based on user criteria and/or known best practices. The learner module 328 or the predictor 329 can elicit a prediction from the trained AI model 106 and send the prediction to the instructor module 324. The instructor module 324, in turn, can send the prediction to the training data source 219 for updated training data based upon the prediction and, optionally, instruct the learner module 328 in additional training cycles. When the one or more training cycles are complete, the learner module 328 can save the trained state of the network of processing nodes in the trained AI model 106. (Note a more detailed discussion of different embodiments of the components making up the AI engine occurs later.)

Concepts and Mental Models

FIGS. 3A and 3B provide schematics respectively illustrating mental models 300A and 300B in accordance with some embodiments.

Pedagogical programming focuses on codifying two main pillars: 1) What are the concepts associated with the problem domain (and mentally how do they relate to each other)? and 2) How would one go about teaching those concepts?

A concept is something that can be learned. Once learned it can provide intelligent output. An AI object may learn and be trained on a particular concept. An AI object corresponding to a particular concept can receive input data from other AI objects/concepts and simulators, and send output data to other AI objects/concepts or as an AI object corresponding to a main concept produce a final result/output. A concept can be used in isolation, but it is typically more useful to construct some structured relationship of connectivity, such as a hierarchy, between the related concepts, beginning with the relatively simple concepts and then building into more complex concepts. For example, 'ball location' is a relatively simple concept; whereas, 'get high score' with the ball is a more complex concept. In another example, a complex mental model of flying a plane may have a main concept of 'flying a plane' and numerous sub concepts such as 'how to navigate and move a plane from point A to point B', 'how to avoid crashing into objects', 'how to take off into flight', 'how to land from flight', etc. Each of the sub concepts feeds one or more outputs either directly or indirectly into the main concept of 'flying a plane' when undergoing training on the main concept. The architect module 326 creates the structured relationship of connectivity between these concepts based on user supplied guidance in the pedagogical programming language code.

A concept in a pedagogical programming language may be something that an AI object can be trained on and learn. A concept can fall into one of at least two groups: fact and strategy. A fact-type concept can describe a state of one or more things such as an object, a ball, a character, an enemy, a light, a person, or the like. The state can be whether the one or more things are on or off, hot or cold, a number or a letter, or the like. The fact-type concept can also describe a location. A strategy-type concept can reflect a method or a behavior such as "avoid ghosts," "keep the paddle under the ball," "don't run into walls," "turn lights off," "get high score," or the like. Both FIGS. 3A and 3B show mental models including the strategy-type concept "get high score."

A mental model in a pedagogical programming language is also something that an AI object can be trained on and learn. A mental model can include one or more concepts structured in terms of the one or more concepts, and the mental model can further include one or more data transformation streams. As shown in FIG. 3A, a single-concept mental model can include, for example, a strategy-type concept such as "get high score." As shown in FIG. 3B, a multi-concept mental model can include a hierarchical structure including, for example, strategy-type concepts such as "keep paddle under ball" and "get high score" and state-type concepts such as "ball location." The sub concepts of "keep paddle under ball" and "ball location" feed parameters directly or indirectly into the main concept of "get high score" with the ball. A concept in a multi-concept mental model can receive input from other concepts in the mental model, send output to other concepts in the mental model, provide a final output or result output, or a combination thereof. Addition of more concepts to a mental model can decrease training time for an AI object, as well as enable a trained AI object to give smarter, more accurate predictions. Each trained concept may be an AI object.

Foundational Primitives

AI systems and methods provided herein enable a teaching-oriented approach by providing a set of foundational primitives that can be used to represent AI without specifying how the AI is created. These foundational primitives are 1) concepts and mental models, 2) curricula and lessons, and 3) training sources.

More on Concepts and Mental Models

As discussed, the term Mental Model may describe a set of structured concepts. The collection of concepts and their interrelation models the problem domain; and, can be referred to as the mental model. Given this choice of mental model frames, one would then codify the underlying concepts and their relationships.

Curricula and Lessons

A Curriculum is used to teach a concept. To do this, the user needs to provide data to train the concept and tell the AI engine whether the system's understanding of the concept is correct or not. This is analogous to a teacher assigning readings from a book to a student and subsequently testing the student on the contents of the book. The ways in which this data is presented is broken into individual components called Lessons. In the book analogy, Lessons could be individual chapters in the book. Lessons allow the concept to learn bit-by-bit, rather than all at once.

The concept keyword declares an abstract concept that is to be learned by the system. Ultimately, this takes the form of a transformation of data, but no information need be provided about how to perform the calculation. By declaring a concept in the scripted in a pedagogical software programming language, the programmer instructs the architect module 326 of the AI engine that this is a node in the recurrent AI network making up the AI model that must be learned. Consequently, each concept node must have corresponding curricula to teach that node of performing its output function based on its input parameters.

Because concepts are learned by each AI model, their declarations tend to be fairly simple unless one wants to explicitly tell the architect module 326 of the AI what learning algorithms and architecture to use. A typical statement will look something like this:

concept AbstractConceptName
      is estimator, classifier, etc.
      follows AntecedentConcept1, AntecedentConcept2
      feeds DependentConcept1

In an embodiment, the 'follows and feeds keywords' establish connectivity in the directed graph of nodes in the trained AI model in the same way that the 'from and into keywords' do in stream declarations. In addition, however, one can optionally append a plus or minus sign (+/−) to the end of the 'follows or feeds keywords' as hints to the architect module 326. The presence of the plus or minus sign indicates whether inhibition is disallowed or desired, respectively. This is useful in a recurrent context, where, for example, a concept may have many ambiguous interpretations and inhibition can aid in resolving the ambiguity.

The keyword specifies the overall class of concept that is being modeled. For example, a classifier will learn to identify a label corresponding to its input, an estimator will learn to predict a value, a predictor will learn sequences and predict subsequent items in a sequence, etcetera. This keyword is the entirety of the code needed. The system will, using this code, proceed to determine an appropriate learning topology that can realize the intent. In this case, the architect module 326 laid out a deep learning neural network very much like LeNet. The instructor module 324 will then proceed to execute the best available lesson in the curriculum and will stream data to it. Upon deployment, a user would be able to stream, for example, an image into the AI model and get predictions out. Note that at no point were any low level AI or machine learning algorithmic details codified by a user but rather these low level details were generated by the architect module 326 by pulling the topology of a given network processing nodes and a best machine learning algorithmic from reference databases.

The AI model learns by way of, for example, a dataset, a cost/loss function, and an optimization procedure. A machine learning algorithm can be designed to make gaps between training errors and testing small. An AI model such as a neural network can include input and output layers. At each layer except the initial input layer, the AI model can compute the input to each unit as a weighted sum of units from the previous layer. A map of a set of input values to output values can be generated. The AI engine can implement one or more forms of learning in contrast to running a single end-to-end algorithm training. While learning, the AI model interacts with an environment over time. In an embodiment, at each time step or iteration of learning, the AI model receives a state in a state space, selects an action from an action space, and follows a policy, which policy controls the AI model's behavior. The AI model can then receive a scalar or vector reward and transition to the next state according to the environment dynamics, or model, for the reward function. The AI model also receives feedback from its selected actions and performance, which is evaluated to alter its training.

The AI engine achieves, for example, a robotics control benchmark with an order of magnitude fewer training cycles by way of processes provided herein. For example, an overall task can be broken into multiple smaller tasks as provided herein (see, e.g., FIG. 3B) for training in parallel by a one or more machine learning algorithms rather than using a single end-to-end algorithm. Once each AI model is trained on its corresponding individual task, then all of the trained AI models can be trained to work with each other to achieve the overall task. This process trains multiple AI models in parallel and then combines the trained versions of the AI models to achieve a similar desired result to the one end-to-end algorithm but in a faster amount of time and possibly with better accuracy. For example, a simulated robot or computerized numerical control ("CNC") machine may successfully train upon the smaller tasks such as picking up a block and stacking the block on top of another block in parallel to each other and apply machine learning algorithms to learn these task after a number of training cycles. In an embodiment, the process may vary with respect to breaking the overall task into the multiple smaller tasks and combining the trained versions of the trained AI models within a single AI model. The system can combine the trained AI models in various ways based on sub tasks or concepts. And then, an AI model has a tree of learned concepts that amount to the overall task.

Hierarchical mental models of concepts allow developers to break complex tasks into smaller increments. Rather than training, for example, a robotics system to accomplish an overall task using one end-to-end algorithm, a system is trained on multiple, reusable models. Training a system using multiple concepts, for example, an AI model for each of the concepts of reach, grasp, move, and stack can be used and trained on individually and in parallel to each other, which requires far less training time and computing cycles. Then, the four trained concepts can be trained to work with each other to accomplish the end result of a more complex grasping-and-stacking task for which the single end-to-end algorithm would typically be employed.

Starting with a special-purpose programming language, Inkling, developers can codify the specific concepts they want an AI model to learn, how to teach the concepts to the AI model, and the training sources required (e.g. simulations, data, etc.) for teaching the concepts to the AI model. Teaching each individual AI model on learning its particular skill on its own will go faster than trying to train on that skill while additional variables are being thrown into that training curriculum from other concepts.

At a foundational level of the AI engine platform, the AI engine pairs Inkling code with cutting-edge machine learning algorithms to generate and train high-level intelligence models.

Learning is greatly enhanced for an AI model by interacting with a simulation using feedback from a real world environment. It is important to understand whether or not a system's operations and interactions with its environment can be simulated, or modeled. An iterative learning process with an AI model can be very effective in a simulation/ modelling world for later applying the trained AI model in a real world situation. Feedback from working in the real world can be applied to a simulation environment to refine/ tune the training of the AI model(s). The trained AI models can subsequently be deployed in the real world again. For example, in each iteration of learning in a grasp-and-stack task, the AI engine makes a decision about a next set of parameters for friction compensation and a next set of parameters for motion. Due to the many iterations involved, the optimization process is configured to run autonomously. To achieve this, a software layer is added to enable the AI engine to configure and control a next iteration's parameterization for friction compensation and its parameterization for axis motion. The goal in this example is to eliminate a human expert and make the AI engine an expert in selecting parameter values, improve upon degree of precision, and reduce the number of iterations learning and tests needed, and hence the overall time needed to complete training. The AI engine is coded to understand machine dynamics and develop an initial model of machine dynamics. Development of a simulation model is included based on initial measurements. The AI engine's ability exists to set friction and backlash compensation parameters occurs within the simulation model. After an initial model training occurs, then the training of the simulation model with respect to, for example, friction and backlash compensation is extended. The training of the simulation model moves from the simulation model world, after learning is complete, to a real world environment. The training of the AI model takes the learning from the real machine and uses it to improve and tune the simulation model.

Multiple managed simulations occurring at the same time to train multiple AI models(s) improves the system's capability to extract and optimize knowledge faster from large and complex simulations and data and makes users using the system more productive.

The system allows optimizing multiple control systems at once; and supporting users looking to utilize big data sets for simulating multiple tasks and training multiple AI models at once with the big data sets.

A user can run into problem(s) making it difficult and slow to process and optimize their simulation, at scale, running one simulation at a time to train AI models. The AI engine may process high volume, high velocity, and highly varied information (from datasets and simulations) faster to enable enhanced decision making, surface insights, and optimize processes faster by utilizing multiple simulations to train AI models on the following environments:

Initially, the goals of multiple managed simulations is to: 1) Enable multiple managed simulations running in one instance in a cloud (e.g., public cloud, virtual private cloud, or private cloud) to train one AI model. 2) Enable multiple simulations running on one computer (offline) to train at least one AI model. 3) Scale the training performance linearly (or nearly linear) with the number of simulators.

$$\text{performance} = \frac{\text{time to train an AI model with 1 sim}}{\text{time to train the AI model with } n \text{ sims}}$$

Performance of the AI model is considered efficient when the performance is close to or equal to a number of simulations being used to train the AI model.

It is important to note that increasing the number of simulations running at the same time doesn't, at all times, increase the performance. There are potential cases where, depending on the problem size, the performance might remain constant or decrease with the increase in number of simulations.

Later, the goals of multiple managed simulations is to: 1) Enable multiple managed simulations running in multiple instances in a cloud (e.g., public cloud, virtual private cloud, or private cloud) to train one AI model. 2) Enable multiple simulations running on multiple instances in the cloud (public, VPC, private cloud) to train multiple AI models.

In an example use case, systems and methods provided herein can be used for Flexible Dexterous Manipulation. The AI engine platform enables subject matter experts to teach an AI model how to solve complex problems such as the Flexible Dexterous Manipulation including learning how to grasp and stack an object. A key feature of the platform is the ability to 1) define a complex training task in terms of a main concept that can be defined in a pedagogical programming language such as Inkling, 2) divide the main concept into smaller, simpler sub-concepts that can be learned separately by an AI model, and 3) combine the learned sub-concepts corresponding to simpler training tasks using an integrator component to effectively train the AI model on the complex training task. This approach may be used to solve a complex robotics tasks requiring dexterous manipulation, for example, using a simulated robot arm to pick up an object and stack it on another one. Breaking complex tasks into smaller tasks improves training efficiency as well as flexibility because once the sub-concepts are learned, the sub-concepts can be combined in different ways for various complex training tasks.

The challenge in teaching an AI model how to grasp and stack one block on top of another includes coordinating grasper movement as well as different block positions and orientations. Dexterity is hard and flexibility to grasp and stack in different positions and orientations is a must. Breaking complex tasks into smaller tasks improves such training in terms of efficiency and flexibility. This approach is shown in FIGS. 4A, 4B, and 4C.

FIG. 4A provides a schematic illustrating a complex task that the AI models can be trained on, where this complex task is divided into a number of simpler tasks each of which is trained on in accordance with some embodiments.

As shown in FIG. 4A, the main overall task (e.g., grasp-and-stack task) can be divided into four smaller, simpler task such as "reach," as in reach for the object, "grasp," as in grasp the object, "move," as in move the object to the right place, and "stack," as in stack the object on top of something such as another object, each of which can be defined as a concept or sub-concept in a pedagogical programming language. Once the smaller, simpler tasks are learned, a meta-controller or integrator component/concept (see FIG. 4C) is used to combine the smaller simpler tasks into a complete solution for the main overall task. The AI engine platform lets developers teach the AI model how to do the task using AI concepts for each of the smaller, simpler tasks. Again, for this task, the main task can be divided into the smaller, simpler tasks of reach, grasp, move, and stack.

Also with respect to FIG. 4A, the grasp-and-stack task as divided into the four smaller, simpler tasks is representative of a mental model 410 akin to those described in reference to FIGS. 3A and 3B. As with the mental models 300A and 300B respectively of FIGS. 3A and 3B, inputs to the mental model 410 of FIG. 4A, as well as the outputs from the mental model 410 are included in FIG. 4A. In addition, the outputs of the mental model 410 are shown as action inputs to a simulator, and outputs from the simulator are shown as state inputs to the mental model 410. Data flowing through the mental model and the simulator are said to be flowing through a metagraph 400. Such data, also known as training data herein, can be plotted as a training graph and visualized as shown and described in reference to FIGS. 5A-5H and 6.

As shown in FIG. 4B, the smaller, simpler grasp task can be divided into two smaller, even simpler tasks such as "orient," as in orienting a grasper to subsequently grasp the object, and "pinch," as in pinching the object with the grasper. Likewise, the smaller, simpler stack task can be divided into two smaller, even simpler tasks. Once the smaller, even simpler tasks are learned, the meta-controller or integrator component/concept (see FIG. 4C) can be used to combine all the smaller simpler tasks into the complete solution for the main overall task.

Training for each of the smaller simpler tasks or even the main task can be done independently of each other. As such, multiple simulations can occur at the same time for each and every task in order to speed up the overall training on the main task. Once the reach and move concepts, the grasp and stack concepts, the orient and pinch concepts, etc. are trained, then all the concepts can be used in combination to train the AI model to learn the main task.

The hierarchical approach to training AI models in accordance with the foregoing provides several practical benefits. 1) A pre-trained AI model able to solve a task can be used as a component in solving a larger task. 2) Each sub-concept can use the most appropriate approach for that task, whether a classical motion controller, a pre-existing learned model, or a neural network that needs to be trained. 3) Components can be replaced without retraining the overall system. For example, the system switched between single-concept and decomposed graspers and stackers several times in our experiments, and the system could adapt to a different grasper without having to change the change the reach, move, or overall integrator concepts.

Note, the integrator or meta-controller does not require any knowledge of the internals of the sub-concepts it is selecting among. The integrator component may be implemented as below and in FIG. 4C.

As shown in FIG. 4C, the integrator learns to choose the action recommended by the sub-concept most applicable in the current state. This is a learning problem that the systems solves using overall task success as the reward. To make this effective, the system does not choose a new sub-concept at each time step. Instead, the integrator uses long-running concepts: each sub-concept can have pre-conditions for when it can be selected and can run until a condition is met before switching to another task. This gives the designer an easy way to specify constraints like "don't try to grasp until you're close to the object," and "once you start to move, continue that for at least 100 time steps."

In an example, here's how to specify the above using the Inkling language:

```
# ... schema and gear declarations ...
# move is not learned -- it uses a provided controller
    external reach is reach_gear
        follows input(State)
    end
# grasp will be learned by our system
    concept grasp is estimator
        predicts (ManipulatorCommand) # the action
        follows input(State) # the input
    end
# move is not learned -- it uses an provided controller
    external move is move_gear
        follows input(Command)
    end
    concept stack is estimator
        predicts (ManipulatorCommand)
        follows input(State)
    end
# This is the integrator, which picks one of the actions
# from the preceding concepts.
    concept pick_and_stack
        predicts (Command)
        follows reach, grasp, move, stack
        feeds output
    end
# ... curriculum declarations: how to train each learned concept
...
```

The "reach toward the object to pick up" and "move toward target block" actions are simple motions for which the system uses a classical motion controller. The AI engine allows developers to integrate such controllers through various functions of the AI engine. Under the hood, the AI engine can train the grasp and stack task or the concepts corresponding thereto using the Trust Region Policy Organization ("TRPO") algorithm.

FIG. 4D provides a schematic illustrating numbers of episodes of training for learning various concepts in accordance with some embodiments. As shown in FIG. 4D, training the grasp concept took fewer iterations and less simulated robot time than the stacking concepts. Learning the stacking concept dominated training time in this example requiring about 14M steps compared to 10M steps for the grasping concept. The moving task did not require any training, and the integrator trained very quickly. Indeed, training the integrator was orders of magnitude faster than the guided-retraining approach used in an example prior art technique.

As described above, the integrator must choose among the actions selected by its sub-concepts. Note, the integrator can learn how to complement these skills with its own learned actions. Also, these techniques can be applied to real tasks with real robots.

Each submodule can have different state+action spaces. Typically, these can be smaller than a globally-applicable state or action space, which makes problem solving easier and learning faster. The system can mix neural and classical controllers in the same task. The system can enable hierarchical decomposition, and a single concept can itself be an integrator choosing among subcomponents. The system can use this to split grasp into orient-for-grasp, pinch concepts, and similarly split stack.

An example of a trained AI model may be a Basic Recurrent Artificial Intelligence Network (BRAIN), which is an individual AI agent, and which is programmed to learn using a software language such as Inkling. Each BRAIN can reside in the AI engine, which manages and automates much of the lower level, complexities of working with AIs. At its heart, a BRAIN can be a basic network of intelligent processing nodes that comprise a potentially recurrent network, hence the acronym "BRAIN." In an embodiment, a trained AI model, such as trained AI model 106, may be a pedagogically programmed AI model that has been trained on one or more concepts.

Multiple independent processes of an AI engine carry out separate tasks and cooperate with other components. For example, the multiple independent processes can carry out four or more separate tasks by 1) interaction with and 2) cooperation between the multiple independent processes. A first task can be creating a shell of an AI model. A second task can be loading in a file of scripted code in a programming language to help define a topology of processing nodes in the AI model, a layout of the concepts making up the AI model, and a selection of an appropriate learning algorithm(s) for the AI model. The file created in the pedagogical software programming language, such as Inkling, helps the architect module to create the structural details and other details of the AI model. The third task can be starting to train the AI model with a data source, such as a simulator. The fourth task can be then deploying a trained AI model and using the trained AI model to do predictions on data from the data source.

Some of the major independent processes configured into the AI engine can be as follows. An AI-model service may include a HTTP application programming interface, an AI compiler, and an architect module. Note, the architect module could be 1) an independent process on its own or 2) part of the AI-model service as here in this example. Another independent process is the instructor process and CPU engineer service. Another independent process is the predictor process. Another is the watchman process. Another is the learner process with its GPU engineer service. Another is the conductor. Another is the AI-model web service. Note, most of these processes are standalone services but they can be incorporated into a larger coding file to be part of another service or process. A software container is configured to wrap one or more pieces of software in a complete file system containing everything for execution including code, runtime, system tools, system libraries, etc. Note, the HTTP API may be a restful API.

In an embodiment, the CPU engineer may be coded to invoke and put processes onto the CPU computing devices including instances of the instructor process and predictor process, when needed. The GPU engineer may be coded to invoke and put, for example, instances of the learner process onto the GPU hardware as needed. The conductor service and/or engineer service may be configured to handle scaling by dynamically calling in additional computing devices to load on and run additional instances of one or more of the independent processes wrapped in its own container, such as the learner and/or instructor, as needed. When instances of the learner process and/or instructor process are not available to effectively run a training session of a given AI model, then a new instance of the learner process and/or instructor process is invoked and run on a computing device.

The multiple independent processes are configured as an independent process wrapped in its own software container so that multiple instances of the same processes can run simultaneously in order to scale to handle one or more users to perform actions to solve AI problems. The actions to solve AI problems can include 1) running multiple training sessions on two or more AI models at the same time, 2) creating two or more AI models at the same time, 3) running a training session on one or more AI models while creating one or more AI models at the same time, 4) deploying two or more trained AI models and using the trained AI models to do predictions on data from one or more data sources, and 5) any combination of these four, on the same AI engine. In an embodiment, five or more simulations may be simultaneously running at the same time. In an embodiment, ten or more training sessions may be simultaneously running at the same time. In an embodiment, twenty or more training sessions may be simultaneously running at the same time.

A first service of the independent processes is configured to handle scaling by dynamically calling in additional computing devices to load on and run additional instances of one or more of the independent processes wrapped in its own container as needed. An independent process, such as a scheduler, monitors the amount of the available hardware resources, such as percent resources used. An independent process, such as the scheduler, also looks at the incoming resource requests from, for example, the amount of AI model deployments and training sessions occurring on the single AI engine, in order to decide to dynamically change the amount of computing devices operating instances of the independent processes that are in containers. The scheduler may cooperate with or be part of CPU engineer service, conductor service, and/or GPU engineer service. The scheduler may assign a role to each individual process, use an auto scaling service to scale the processes in their software containers in response to load across the systems services, and use a Load Balancer to distribute load across a current set of computing devices, while automatically checking new tasks into the load balancer when auto scaling actions occur. When the scheduler is asked to run a new task, the scheduler determines the individual processes, each in their own containers needing to accomplish the task, and then finds a suitable set of one or more computing machines to run the individual processes by identifying an instance in the cluster of computing devices with available resources. Long running processes, such as an instance of the learner and instance of the instructor, conducting a training session for a particular AI model could each run on its own GPU or CPU computing device in the cloud. An individual AI model being trained may only take a part of a CPU's capacity or may take up an entire GPU's capacity to train that AI model at that time. Multiple instances of the independent processes may be invoked to handle multiple AI models being trained or being deployed at the same time simultaneously. Note, each of the AI models maybe training or being deployed to solve a completely different problem in completely different technologies.

The first task can be creating a shell of an AI model. In an embodiment in the first task, an architect module of the AI-model service receives a request from a client device of the user to create an AI model. Anyone of three or more different user interfaces may supply a command to request the creation of an AI model. The three different user interfaces are a command line interface, a web interface, and a graphical user interface such as Mastermind. The three different user interfaces allow for multiple users of different levels of capability and programming to all utilize the AI engine hosted on this cloud platform. A request comes in to create an AI model into the AI-model web interface. The AI-model service is called by the AI-model web interface to create an AI model record for that user. The AI-model web interface may also make a call to a user's database in order to verify the account of the user and call up any previous information including account information about the user. The AI-model service then creates an AI model document by calling over to the AI database, for example, the MongoDB document database. The AI-model service registers the request and sends it on to the AI database. The AI database creates a new shell document to contain an AI model to be fleshed out with details and then trained. The new shell will have a unique ID number or at least a unique version of that ID model. When success is indicated, then the AI-model service via the AI-model web interface sends back to the client device of the user of the cloud platform that the initial shell document of the AI model has been successfully created. Thus, the AI-model service registers an incoming request and then creates a shell for the AI model with the architect module. Note, the architect module may be its own independent process in its own container or part of the AI-model service in its container.

The second task can be loading in a file of scripted code in the pedagogical software programming language to help define 1) a topology of processing nodes in the AI model, 2) a layout of the concepts making up the AI model, 3) a selection of an appropriate learning algorithm for the AI model, and 4) other similar details in order to flesh out the details of the AI model and then instantiate the AI model. In an embodiment in the second task, an architect module of the AI-model service receives scripted code to create a topology of neural networks, select one or more learning algorithms, and then instantiate an AI model assigned with a unique identifier, all based on a description of a problem to solve codified in a pedagogical software programming language. The loading of the file written in the pedagogical software programming language occurs. The file written in the pedagogical software programming language is put through a restful web socket. The file is sent to the AI-model service and then the AI-model service applies the AI compiler, which uses a library with executables to compile the scripted code and parse through the scripted code to detect errors in the syntax of the code, etc. The file created in the pedagogical software programming language, such as Inkling, helps the architect module to design a graph of concepts, etc. in the AI model. The architect module of the AI-model service fills out a topology of the processing nodes in the model, a layout of the concepts making up the AI model, and selected appropriate learning algorithm(s) for this AI model into the shell of the AI model. The architect module may look at the type of problem being solved in the pedagogical software programming language and see what similar architectures have worked to solve a similar problem. The architect module portion of the AI-model service also then instantiates, for example, the topology for neural networks and graph of concepts for each concept node derived from statements written in the codified pedagogical software programming language. After the shell of the AI model with the topology of the graph of processing nodes is created with the appropriate learning algorithm(s) and has been assigned a unique ID, then the AI database stores the AI models as well as portions of AI models. After the shell of the AI model with the topology of the graph of processing nodes is instantiated with the appropriate learning algorithm(s) and has been assigned a unique ID, then the next task starts, which is training an instantiated AI model with a data source.

The third task is starting to train the AI model with some sort of data source, such as a simulator, according to a lesson plan and curriculum. In an embodiment in the third task, an instructor process is configured to carry out a training plan codified in a pedagogical software programming language. The learner process is configured to carry out an actual execution of underlying AI learning algorithms during the training session. The learner module can also consistently update weights of the learning algorithm(s) in the AI model. The instructor process and the learner process of the independent processes cooperate with one or more data sources to train a new AI model. The conductor, via an API, receives a start and set up training command. The conductor may be coded as a service. The conductor service in combination with the AI-model service can be the components in the system responsible for coordinating activities between the instructor process, the learner process, and the training data source. In an embodiment, the conductor is a Docker-type service.

In an embodiment, a client device of the user starts the training of an AI model, via a user interface, by sending a call command to train the AI model to the AI-model service. The AI-model service then sends a start training components command to the conductor. The conductor then sends a request to the AI database to retrieve the instantiated AI model. In an embodiment, the copy of the latest version of the AI model is retrieved. Note, in an embodiment, the conductor obtains multiple versions of the AI model, potentially with different neural networks and learning algorithms in order to train two or more instances of this AI model in parallel on the same AI engine. Each AI model is then trained with its own instances of the independent processes of the learner and instructor. The conductor sends a start instructor command to the CPU engineer, which then starts an instance of the instructor process on a CPU computing device. The CPU engineer invokes as many instances of the instructor process as necessary/as needed to service the multiple AI models being trained. Each time another AI model is being trained another instructor process may be invoked. The conductor also sends a start learner command, via a call, to the GPU engineer. The GPU engineer invokes and starts an instance of a learner module on an available GPU computing device. The GPU engineer invokes as many instances of the learner process as necessary/as needed to service the multiple AI models being trained. Once the instance of the instructor is loaded onto and running on the CPU hardware, the instructor then may go to the AI database to get the curriculum and lessons from the AI database. Training lessons may come from the pedagogical software programming language file, which was compiled and put into the AI database as a document associated with this AI model being trained. Similarly, the learner process once started will send a command to the AI database to get a document of the concepts, their curriculum, and the individual lessons to be trained on, which can be derived from the codified pedagogical software programming language and/or reference databases of best training practices. Note, the learner may receive most of the commands on the training from the instructor process conducting the training session in accordance with the curriculum and individual lesson plans.

Next for the training, the data sources register with the AI-model web interface. The AI-model service opens the web socket, for example, for simulation through the open web socket. The AI-model service acknowledges the registration with the data source. The AI-model service then directly talks to the instructor process that a data source is ready to start sending data to the instructor process. The instructor process sends back that it is ready to start the training. A start command to the data source, such as a simulator, random data generator, etc. is initiated. The data source then connects to the AI model. A recursive and reiterative loop occurs between the instructor process, the learner process, and the data source to send data to the AI model for training. Based on the new data, the AI model updates the state information of different portions making up the AI model and the instructor process sends the updated state information back to the data source. The data source sends more data and/or a prediction to the instructor process. This loop occurs between the instructor and the data source to send data and/or predictions, update and run the training, get back state, and then repeat.

Also, the instructor process can send state and prediction information to the learner process. Thus, in the recursive and reiterative loop, the learner process takes part in training of the instantiated AI model with the state information and predictions. The learner records the new state data for the AI model. The learner process records the episodes and reward information into a time database and sends the current function objective value back to the instructor process. The reiterative loop occurs between training with state and predictions, recording the reward information, and sending back the objective value and a current function occurs between the instructor and the learner. The learner continuously writes to the instructor with the state of the training and writes out new weights for the learning algorithms. Based on constraints or other statements in the code, such as Inkling, eventually the learner knows when to stop the reiterative loop of sending data between the data source, training with that data, making predictions, adjusting coefficient weights, and getting better accuracy with the trained AI model. In the end, the criteria of the trainings are achieved. The instructor process will write out the trained network data to the AI database, where the model being trained has its own unique ID. The overall trained AI model will have learned optimum weights for the coefficients of the learning algorithms for each trained AI object corresponding to either a main concept or sub concept forming the trained AI model. The trained AI model with its unique ID and version of that AI model is then stored in the AI database.

The independent processes can include a watchman service configured to monitor to see if any of 1) when failures occur in any of the other independent processes and 2) when any of the other independent processes exit, and then to tell all of the independent processes that were participating in that training to exit the training session that they were cooperating in. Similarly, the watchman service can monitor deployment and use sessions with the trained AI model and/or AI model creation sessions to tell all of the independent processes that were participating in that AI event to exit when a failure occurs or when one of the other independent processes exit.

The fourth task is then deploying a trained AI model and using the trained AI model to do predictions and/or other actions on data from one or more data sources, such as a simulator, random data generator, database, etc.

A trained AI model may then be used to predict many things. For example, a trained AI model connected to a data source may predict what will occur 1) during an example simulation or 2) during real time streaming such as during a video game to make decisions for the digital creatures in that game, based on the training in the AI model. The data source connects to the trained AI model with a command to the AI-model service. The AI-model service then makes a call to the instructor process to launch a predictor process and to tell the instructor process that registration has occurred. The AI-model service loads the trained AI model. The AI-model service opens up the AI document database for registration. The AI-model service opens up a website socket for simulation. In addition, the AI-model service connects back to the data source and conveys that the data source is registered and that the predictor process is ready to start. Lastly, a loop repeats to start the simulation, send that data to the predictor, and the predictor then makes predictions based on the trained AI models, which are then sent back to the data source until the deployment of the AI model ends.

Note, the AI system uses software defined processes wrapped in a container over using individual daemons because the software defined processes, each in its own container, scale better to a dynamically changing amount or set of hardware configuration. The AI engine may be decoupled from using a set of daemons as coordinating agents between different functions in an AI engine, and may use instances of self-sufficient independent processes, so that the AI engine system can scale to handle multiple users at the same time using the single AI engine hosted on the cloud platform. The multiple users may be creating AI models as well as training AI models.

Each module can be structured as an independent process so it may work with other processes but can exist outside and run its function without the need of the other processes.

More on the AI Engine

The AI system enables developers to more efficiently build, teach, and use intelligence models.

The AI engine takes in a description of a problem and how one would go about teaching concepts covering aspects of the problem to be solved, and the AI engine compiles the coded description into lower-level structured data objects that a machine can more readily understand, builds a network topology of the main problem concept and sub-concepts covering aspects of the problem to be solved, trains codified instantiations of the sub-concepts and main concept, and executes a trained AI model containing one, two, or more neural networks.

The AI engine can abstract generation of a neural network topology for an optimal solution and faster training time with a curriculum and lessons to teach the neural network via recursive simulations and training sessions on each node making up the neural network.

The AI engine can contain a vast array of machine learning algorithms, has logic for picking learning algorithms and guiding training, manages data streaming and data storage, and provides the efficient allocation of hardware resources. The AI engine can be built with an infrastructure that supports streaming data efficiently through the system. The AI engine can use a set of heuristics to make choices about which learning algorithms to use to train each AI model. The set of heuristics also make it possible for the AI engine to choose from any number of possible algorithms, topologies, etc., be able to train a number of AI models in parallel, and then pick the best result from all of the train AI models as the best trained AI model for that task.

Major Components of the AI Engine

FIG. 7 provides a block diagram illustrating an AI system including an AI engine in accordance with some embodiments.

The details for any given implementation of a AI engine may vary substantially, but many have common architectural components such as the following six components: 1) an architect module 326, 2) an instructor module 324, 3) a learner module 328, 4) a compiler module 222, 5) a hyperlearner module 325, and 6) one or more user interfaces 212 exchanging communications into and out of the AI engine including visual debugging module 213 configured to accept training data from the AI engine for plotting and visual debugging of any issue with training methodology. The AI database 341 may cooperate with the modules of the AI engine as discussed above.

The AI engine can be a cloud-hosted platform-as-a-service configured to manage complexities inherent to training AI networks. Thus, the AI engine can be accessible with one or more client-side user interfaces 212, GUI, CLI, and Web interfaces, to allow third parties to submit a description of a problem in a pedagogical programming language with possible sub concepts that factor in that problem and let the online AI engine build and generate a trained intelligence model for one or more of the third parties.

The AI system includes the one or more user interfaces 212 on the one or more client systems and the following on the one or more server systems: the AI compiler module 222; the AI-generator modules including the instructor module 324, the architect module 326, and the learner module 328, the hyperlearner 325, and the predictor module 329. In addition to the foregoing, the AI system can include a training data loader 621 configured to load training data from a training data database 614a, a simulator 614b, and a streaming data server. The training data can be batched training data, streamed training data, or a combination thereof, and the AI engine can be configured to push or pull the training data from one or more training data sources selected from the simulator 614b, a training data generator, the training data database 614a, or a combination thereof. In some embodiments, a data stream manager can be configured to manage streaming of the streamed training data. FIG. 7 shows the architect module 326 configured to propose a neural network layout and the learner module 328 configured to save a trained state of a neural network such as the trained AI model 106.

The AI compiler module 222 automates conversion and compiling of the pedagogical programming language describing the problem (main concept) and sub-concepts factoring into the problem. Each statement recited in the code of the pedagogical programming language program submitted to the AI engine can be complied into a structured data object's defined fields, which can later be generated and instantiated into its own sub-concept node by the architect module 326. Each node can have one or more inputs, one or more neural networks to process the input data, and a resulting output decision/action. The compiled statements, commands, and other codifications fed into the AI compiler can be transformed into a lower level AI specification.

Architect Module

The architect module 326 is the component of the system responsible for proposing and optimizing learning topologies (e.g., neural networks) based on mental models.

Neural networks can be based on a large collection of neural units loosely modeling the way a biological brain solves problems with large clusters of biological neurons connected by axons. Each neural unit is connected with many others, and links can be enforcing or inhibitory in their effect on the activation state of connected neural units. Each individual neural unit can have, for example, a summation function, which combines the values of all its inputs together. There may be a threshold function or limiting function on each connection and on the unit itself such that it must surpass it before it can propagate to other neurons. These systems are self-learning and trained rather than explicitly programmed and excel in areas where the solution or feature detection is difficult to express in a traditional computer program.

Neural networks can consist of multiple layers or a cube design, and the signal path can traverse from front to back. The goal of the neural network is to solve problems in the same way that the human brain would, although several neural networks are much more abstract. Modern neural network projects typically work with a few thousand and up to a few million neural units and millions of connections.

The architect module 326 can take the codified mental model and pedagogy and then propose a set of candidate low-level learning algorithms, topologies of a main concepts and sub-concepts, and configurations thereof the architect module 326 believes will best be able to learn the concepts in the model. This is akin to the work that a data scientist does in the toolkit approach, or that the search system automates in the approach with statistical data analysis tools. Here, it is guided by the pedagogical program instead of being a broad search. The architect module 326 can employ a variety of techniques to identify such models. The architect module 326 can generate a directed graph of nodes. The architect module 326 can break down the problem to be solved into smaller tasks/concepts all factoring into the more complex main problem trying to be solved based on the software code and/or data in the defined fields of the user interface supplied from the user/client device. The architect module 326 can instantiate a main concept and layers of sub-concepts feeding into the main concept. The architect module 326 can generate each concept including the sub-concepts with a tap that stores the output action/decision and the reason why that node reached that resultant output (e.g., what parameters dominated the decision and/or other factors that caused the node to reach that resultant output). This stored output of resultant output and the reasons why the node reached that resultant output can be stored in the trained intelligence model. The tap created in each instantiated node provides explainability on how a trained intelligence model produces its resultant output for a set of data input. The architect module 326 can reference a database of algorithms to use as well as a database of network topologies to utilize. The architect module 326 can reference a table or database of best suggested topology arrangements including how many layers of levels in a topology graph for a given problem, if available. The architect module 326 also has logic to reference similar problems solved by comparing signatures. If the signatures are close enough, the architect module 326 can try the topology used to optimally solve a problem stored in an archive database with a similar signature. The architect module 326 can also instantiate multiple topology arrangements all to be tested and simulated in parallel to see which topology comes away with optimal results. The optimal results can be based on factors such as performance time, accuracy, computing resources needed to complete the training simulations, etc.

In some embodiments, for example, the architect module 326 can be configured to propose a number of neural networks and heuristically pick an appropriate learning algorithm from a number of machine learning algorithms in one or more databases for each of the number of neural networks. Instances of the learner module 328 and the instructor module 324 can be configured to train the number of neural networks in parallel. The number of neural networks can be trained in one or more training cycles with the training data from one or more training data sources. The AI engine can subsequently instantiate a number of trained AI models based on the concepts learned by the number of neural networks in the one or more training cycles, and then identify a best trained AI model (e.g., by means of optimal results based on factors such as performance time, accuracy, etc.) among the number of trained AI models.

The user can assist in building the topology of the nodes by setting dependencies for particular nodes. The architect module 326 can generate and instantiate neural network topologies for all of the concepts needed to solve the problem in a distinct two-step process. The architect module 326 can generate a description of the network concepts. The architect module 326 can also take the description and instantiate one or more topological shapes, layers, or other graphical arrangements to solve the problem description. The architect module 326 can select topology algorithms to use based on factors such as whether the type of output the current problem has either 1) an estimation output or 2) a discrete output and then factors in other parameters such as performance time to complete the algorithm, accuracy, computing resources needed to complete the training simulations, originality, amount of attributes, etc.

Instructor Module

The instructor module 324 is a component of the system responsible for carrying out a training plan codified in the pedagogical programming language. Training can include teaching a network of intelligent processing nodes to get one or more outcomes, for example, on a simulator. To do so, the instructor module 324 can form internal representations about the system's mastery level of each concept, and adapt the execution plan based on actual performance during training. The directed graph of lessons can be utilized by the instructor module 324 to determine an execution plan for training (e.g., which lessons should be taught in which order). The training can involve using a specific set of concepts, a curriculum, and lessons, which can be described in the pedagogical programming language file.

The instructor module 324 can train easier-to-understand tasks earlier than tasks that are more complex. Thus, the instructor module 324 can train sub-concept AI objects and then higher-level AI objects. The instructor module 324 can train sub-concept AI objects that are dependent on other nodes after those other AI objects are trained. However, multiple nodes in a graph may be trained in parallel. The instructor module 324 can run simulations on the AI objects with input data including statistics and feedback on results from the AI object being trained from the learner module 328. The learner module 328 and instructor module 324 can work with a simulator or other data source to iteratively train an AI object with different data inputs. The instructor module 324 can reference a knowledge base of how to train an AI object efficiently by different ways of flowing data to one or more AI objects in the topology graph in parallel, or, if dependencies exist, the instructor module 324 can train serially with some portions of lessons taking place only after earlier dependencies have been satisfied. The instructor module 324 can reference the dependencies in the topology graph, which the dependencies can come from a user specifying the dependencies and/or how the arrangement of AI objects in the topology was instantiated. The instructor module 324 can supply data flows from the data source such as a simulator in parallel to multiple AI objects at the same time where computing resources and a dependency check allows the parallel training.

The instructor module 324 may flow data to train AI objects from many data sources including, but not limited to a simulator, a batch data source, a random-data generator, and historical/guided performance from past performance. A simulator can give data and get feedback from the instructor module 324 during the simulation that can create an iterative reactive loop from data inputs and data outputs from the AI objects. A batch data source can supply batched data from a database in at least one example. A random-data generator can generate random data based on user-input parameters.

When starting a training operation, the instructor module 324 first generates an execution plan. This is the ordering it intends to use when teaching the concepts, and for each concept which lessons it intends to teach in what order. While the execution plan is executing, the instructor module 324 may jump back and forth between concepts and lessons to optimize the learning rate. By not training each concept fully before starting to train dependent concepts, the system naturally avoids certain systemic machine learning problems such as overfitting. The major techniques used to determine when to switch between lessons and concepts for training are reinforcement learning and adaptive learning. For example, for a first main problem of determining an amount of bankruptcies in the United States, a first AI object corresponding to a sub concept may be trained in a first lesson on how to determine bankruptcy filings in California. A second lesson may train the first AI object next on how to determine bankruptcy filings in California and York. Successive lessons on an AI object can build upon and augment earlier lessons that the AI object was trained on.

The instructor module 324 looks to reuse similar training flows that have solved similar problems with similar signatures in the past.

Learner Module

The learner module 328 is a component of the system configured to carry out the actual execution of the low-level, underlying AI algorithms. In training mode, the learner module 328 can instantiate a system conforming to what was proposed by the architect module 326, interface with the instructor module 324 to carry out the computation and assess performance, and then execute the learning algorithm itself. The learner module 328 can instantiate and execute an instance of the already trained system. Eventually, the learner module 328 writes out network states for each trained sub-AI object and then a combination of the topological graph of the main node with all of the sub-nodes into a trained AI model. The learner module 328 can also write the stored output of each node and why that node arrived at that output into the trained AI model, which gives explainability as to how and why the AI proposes a solution or arrives at an outcome.

Hyperlearner Module

The hyperlearner module 325 can perform a comparison of a current problem to a previous problem in one or more databases. The hyperlearner module 325 can reference archived, previously built and trained intelligence models to help guide the instructor module 324 to train the current model of nodes. The hyperlearner module 325 can parse an archive database of trained intelligence models, known past similar problems and proposed solutions, and other sources. The hyperlearner module 325 can compare previous solutions similar to the solutions needed in a current problem as well as compare previous problems similar to the current problem to suggest potential optimal neural network topologies and training lessons and training methodologies.

Simulator

When the curriculum trains using a simulation or procedural generation, then the data for a lesson is not data to be passed to the learning system, but the data is to be passed to the simulator. The simulator can use this data to configure itself, and the simulator can subsequently produce a piece of data for the learning system to use for training. This separation permits a proper separation of concerns. The simulator is the method of instruction, and the lesson provides a way to tune that method of instruction, which makes it more or less difficult depending on the current level of mastery exhibited by the learning system. A simulation can run on a client machine and stream data to the AI engine for training. In such an embodiment, the client machine needs to remain connected to the AI engine while the AI model is training. However, if the client machine is disconnected from the server of the AI engine, it can automatically pick up where it left off when it is reconnected. Note, if the system trains using data, then the data is optionally filtered/augmented in the lessons before being passed to the learning system.

Note, 1) simulations and procedural generation are a good choice versus data in a variety of circumstances; and 2) concepts are a good choice versus streams when you can more easily teach versus calculate.

Training Mode

A machine learning algorithm may have a target/outcome variable (or dependent variable) which is to be predicted from a given set of predictors (independent variables). Using this set of variables, the AI engine generates a function that maps inputs to desired outputs. The coefficients and weights plugged into the equations in the various learning algorithms are then updated after each epoch/pass of training session until a best set of coefficients and weights are determined for this particular concept. The training process continues until the model achieves a desired level of accuracy on the training data.

When in training mode the architect module 326 of the AI engine is configured to i) instantiate the network of processing nodes in any layers of hierarchy conforming to concepts of the problem being solved proposed by the user and ii) then the learner module 328 and instructor module 324 train the network of processing nodes in that AI model. To effect the foregoing, the AI engine can take compiled pedagogical programming language code and generate an AI-model learning topology, and proceed to follow the curricula to teach the concepts as specified. Depending on the model, training can potentially take substantial amounts of time. Consequently, the AI engine can provide interactive context on the status of training including, for example, showing which nodes are actively being trained, the current belief about each node's mastery of its associated concept, overall and fine-grained accuracy and performance, the current training execution plan, and/or an estimate of completion time. As such, in some embodiments, the AI engine can be configured to provide one or more training status updates on training a neural network selected from i) an estimation of a proportion of a training plan completed for the neural network, ii) an estimation of a completion time for completing the training plan, iii) the one or more concepts upon which the neural network is actively training, iv) mastery of the neural network on learning the one or more concepts, v) fine-grained accuracy and performance of the neural network on learning the one or more concepts, and vi) overall accuracy and performance of the neural network on learning one or more mental models.

Because the process of building pedagogical programs is iterative, the AI engine in training mode can also provide incremental training. That is to say, if the pedagogical programming language code is altered with respect to a concept that comes after other concepts that have already been trained, those antecedent concepts do not need to be retrained.

Additionally, in training mode, the user is able to specify what constitutes satisfactory training should the program itself permit indefinite training.

Algorithm Selection

A first step an AI engine can take is to pick an appropriate learning algorithm to train a mental model. This is a notable step in training AI, and it is a step those without AI expertise cannot perform without expert guidance. The AI engine can have knowledge of many of the available learning algorithms, as well as a set of heuristics for picking an appropriate algorithm including an initial configuration to train from.

The process of picking an appropriate algorithm, etc., can be performed by an AI model that has been trained (and will continue to be trained) by the AI engine, meaning the AI model will get better at building AI models each time a new one is built. A trained AI model, thereby, provides enabling AI for proposing neural networks from assembly code and picking appropriate learning algorithms from a number of machine learning algorithms in one or more databases for training the neural networks. The AI engine can be configured to continuously train the trained AI-engine neural network in providing the enabling AI for proposing the neural networks and picking the appropriate learning algorithms thereby getting better at building AI models.

The architect module 326 can also use heuristics, mental model signatures, statistical distribution inference, and Meta-learning in topology and algorithm selection.

First, the AI engine and the architect module 326 thereof can be configured to heuristically pick an appropriate learning algorithm from a number of machine learning algorithms in one or more databases for training the neural network proposed by the architect module 326. Many heuristics regarding the mental model can be used to inform what types of AI and machine learning algorithms can be used. For example, the data types used have a large influence. For this reason, the pedagogical programming language contains rich native data types in addition to the basic data types. If the architect module 326 sees, for example, that an image is being used, a convolutional deep learning neural network architecture might be appropriate. If the architect module 326 sees data that is temporal in nature (e.g., audio data, sequence data, etc.), then a recursive deep-learning neural network architecture like a long short-term memory ("LSTM") network might be more appropriate. The collection of heuristics can be generated by data science and machine learning/AI experts who work on the architect module 326 codebase, and who attempt to capture the heuristics that they themselves use in practice.

In addition to looking at the mental model, the architect module 326 can also consider the pedagogy provided in the pedagogical programming language code. It can, for example, look at the statistical distribution of any data sets being used; and, in the case of simulators, it can ask the simulator to generate substantial amounts of data so as to determine the statistics of data that will be used during training. These distribution properties can further inform the heuristics used.

Meta-Learning

Meta-learning is an advanced technique used by the architect module 326. It is, as the name implies, learning about learning. What this means is that as the architect module 326 can generate candidate algorithm choices and topologies for training, it can record this data along with the signature for the model and the resultant system performance. This data set can then be used in its own learning system. Thus, the architect module 326, by virtue of proposing, exploring, and optimizing learning models, can observe what works and what does not, and use that to learn what models it should try in the future when it sees similar signatures.

To effect meta-learning, the AI engine can include a meta-learning module configured to keep a record such as a meta-learning record in one or more databases. The record can include i) the source code processed by the AI engine, ii) mental models of the source code and/or signatures thereof, iii) the training data used for training the neural networks, iv) the trained AI models, v) how quickly the trained AI models were trained to a sufficient level of accuracy, and vi) how accurate the trained AI models became in making predictions on the training data.

For advanced users, low-level details of a learning topology can be explicitly specified completely or in part. The architect module 326 can treat any such pinning of parameters as an override on its default behavior. In this way, specific algorithms can be provided, or a generated model can be pinned for manual refinement.

Guiding Training

The first step the AI engine will take is to pick an appropriate learning algorithm to train the Mental Model. This is a critical step in training AI. The AI engine has knowledge of many of the available learning algorithms and has a set of heuristics for picking an appropriate algorithm as well as an initial configuration to train from.

Once an algorithm is chosen, the AI engine will proceed with training the AI model's Mental Model via the Curricula. The AI engine manages all of the data streaming, data storage, efficient allocation of hardware resources, choosing when to train each concept, how much (or little) to train a concept given its relevance within the Mental Model (i.e. dealing with the common problems of overfitting and underfitting), and generally is responsible for producing a trained AI model based on the given Mental Model and Curricula. As is the case with picking an appropriate learning algorithm, guiding training-notably avoiding overfitting and underfitting-to produce an accurate AI solution is a task that requires knowledge and experience in training AIs. The AI engine has an encoded set of heuristics to manage this without user involvement. Similarly, the process of guiding training is also a trained AI model that will get smarter with each trained AI model it trains. The AI engine is thus configured to make determinations regarding i) when to train the AI model on each of the one or more concepts and ii) how extensively to train the AI model on each of the one or more concepts. Such determinations can be based on the relevance of each of one or more concepts in one or more predictions of a trained AI model based upon training data.

The AI engine can also determine when to train each concept, how much (or little) to train each concept based on its relevance, and, ultimately, produce a trained AI model. Furthermore, the AI engine can utilize meta-learning. In meta-learning, the AI engine keeps a record of each program it has seen, the data it used for training, and the generated AIs that it made. It also records how fast those AIs trained and how accurate they became. The AI engine learns over that dataset.

Note, when training of an AI object occurs, the hyper learner module 328 can be configured to save into the AI database 341 two versions of an AI object. A first version of an AI object is a collapsed representation of the AI object. A second version of an AI object is the representation left in its nominal non-collapsed state. When the search engine retrieves the AI object in its nominal non-collapsed state, then another programmer desiring to reuse the AI object will be able to obtain outputs from the non-collapsed graph of nodes with all of its rich meta-data rather and then a collapsed concept with a single discrete output. The state of the AI data objects can be in a non-collapsed state so the trained AI object has its full rich data set, which then may be used by the user for reuse, reconfigured, or recomposed into a subsequent trained AI model.

The database management system also indexes and tracks different AI objects with an indication of what version is this AI object. Later versions of an AI object may be better trained for particular task but earlier versions of the AI object may be more generally trained; and thus, reusable for wider range of related tasks, to then be further trained for that specific task.

The AI database 341 and other components in the AI engine cooperate to allow migrations of learned state to reconfigure a trained AI object. When a system has undergone substantial training achieving a learned state, and a subsequent change to the underlying mental models might necessitate retraining, it could be desirable to migrate the learned state rather than starting training from scratch. The AI engine can be configured to afford transitioning capabilities such that previously learned high dimensional representations can be migrated to appropriate, new, high dimensional representations. This can be achieved in a neural network by, for example, expanding the width of an input layer to account for alterations with zero-weight connections to downstream layers. The system can then artificially diminish the weights on connections from the input that are to be pruned until they hit zero and can then be fully pruned.

Deploy and Use

Once a trained AI model has been sufficiently trained, it can be deployed such that it can be used in a production application. The interface for using a deployed trained AI model is simple: the user submits data (of the same type as the trained AI model was trained with) to a trained AI model-server API and receives the trained AI model's evaluation of that data.

As a practical example of how to use a deployed trained AI model, a trained AI model can first be trained to recognize hand-written digits from the Mixed National Institute of Standards and Technology ("MNIST") dataset. An image can be created containing a handwritten digit, perhaps directly through a touch-based interface or indirectly by scanning a piece of paper with the handwritten digit written on it. The image can then be down sampled to a resolution of 28×28 and converted to grayscale, as this is the input schema used to train the example trained AI model. When submitted to the trained AI model-server through the trained AI model server API, the trained AI model can take the image as input and output a one-dimensional array of length 10 (whereby each array item represents the probability, as judged by the trained AI model, that the image is a digit corresponding to the index). The array could be the value returned to the user from the API, which the user could use as needed.

Though a linear approach to building a trained AI model is presented in some embodiments, an author-train-deploy workflow does not have to be treated as a waterfall process. If the user decides further refinement of a trained AI model is needed, be it through additional training with existing data, additional training with new, supplemental data, or additional training with a modified version of the mental model or curricula used for training, the AI engine is configured to support versioning of AI models so that the user can preserve (and possibly revert to) the current state of an AI model while refining the trained state of the AI model until a new, more satisfactory state is reached.

Command Line Interface ("CLI")

The CLI is a tool configured to enable users to configure the AI engine. The CLI is especially useful for automation and connection to other tools. Some actions can only be performed using the CLI. Some actions that can be performed using the CLI include loading a pedagogical programming language file and connecting a simulator.

Web Site

The web site is configured as a browser-based tool for configuring and analyzing AI models stored in the AI engine. The website can be used for sharing, collaborating, and learning. Some information that can be accessed from the web site includes a visualization of an AI model's training progress.

Network

FIG. 8 illustrates a number of electronic systems and devices communicating with each other in a network environment in accordance with some embodiments. The network environment 800 has a communications network 820. The network 820 can include one or more networks selected from an optical network, a cellular network, the Internet, a Local Area Network ("LAN"), a Wide Area Network ("WAN"), a satellite network, a fiber network, a cable network, and combinations thereof. In some embodiments, the communications network 820 is the Internet. As shown, there may be many server computing systems and many client computing systems connected to each other via the communications network 820. However, it should be appreciated that, for example, a single client computing system can also be connected to a single server computing system. As such, FIG. 8 illustrates any combination of server computing systems and client computing systems connected to each other via the communications network 820.

The communications network 820 can connect one or more server computing systems selected from at least a first server computing system 804A and a second server computing system 804B to each other and to at least one or more client computing systems as well. The server computing systems 804A and 804B can each optionally include organized data structures such as databases 806A and 806B. Each of the one or more server computing systems can have one or more virtual server computing systems, and multiple virtual server computing systems can be implemented by design. Each of the one or more server computing systems can have one or more firewalls to protect data integrity.

The at least one or more client computing systems can be selected from a first mobile computing device 802A (e.g., smartphone with an Android-based operating system), a second mobile computing device 802E (e.g., smartphone with an iOS-based operating system), a first wearable electronic device 802C (e.g., a smartwatch), a first portable computer 802B (e.g., laptop computer), a third mobile computing device or second portable computer 802F (e.g., tablet with an Android- or iOS-based operating system), a smart device or system incorporated into a first smart automobile 802D, a smart device or system incorporated into a first smart bicycle 802G, a first smart television 802H, a first virtual reality or augmented reality headset 804C, and the like. The client computing system 802B can be, for example, one of the one or more client systems 210, and any one or more of the other client computing systems (e.g., 802A, 802C, 802D, 802E, 802F, 802G, 802H, and/or 804C) can include, for example, the software application or the hardware-based system in which the trained AI model can be deployed. Each of the one or more client computing systems can have one or more firewalls to protect data integrity.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication. No hierarchy is implied unless explicitly stated. Both functions can be in a single communicating system or device, in which case, the client-server and server-client relationship can be viewed as peer-to-peer. Thus, if the first portable computer 802B (e.g., the client computing system) and the server computing system 804A can both initiate and respond to communications, their communications can be viewed as peer-to-peer. Additionally, the server computing systems 804A and 804B include circuitry and software enabling communication with each other across the network 820.

Any one or more of the server computing systems can be a cloud provider. A cloud provider can install and operate application software in a cloud (e.g., the network 820 such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system 804A can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system 804A, can cause the server computing system 804A to display windows and user interface screens in a portion of a display screen space. With respect to a web page, for example, a user via a browser on the client computing system 802B can interact with the web page, and then supply input to the query/fields and/or service presented by the user interface screens. The web page can be served by a web server, for example, the server computing system 804A, on any Hypertext Markup Language ("HTML") or Wireless Access Protocol ("WAP") enabled client computing system (e.g., the client computing system 802B) or any equivalent thereof. The client computing system 802B can host a browser and/or a specific application to interact with the server computing system 804A. Each application has code scripted to perform the functions that the software component is coded to carry out such as presenting fields to take details of desired information. Algorithms, routines, and engines within, for example, the server computing system 804A can take the information from the presenting fields and put that information into an appropriate storage medium such as a database (e.g., database 806A). A comparison wizard can be scripted to refer to a database and make use of such data. The applications may be hosted on, for example, the server computing system 804A and served to the specific application or browser of, for example, the client computing system 802B. The applications then serve windows or pages that allow entry of details.

Computing Systems

FIG. 9 illustrates a computing system 900 that can be, wholly or partially, part of one or more of the server or client computing devices in accordance with some embodiments. With reference to FIG. 9, components of the computing system 900 can include, but are not limited to, a processing unit 920 having one or more processing cores, a system memory 930, and a system bus 921 that couples various system components including the system memory 930 to the processing unit 920. The system bus 921 may be any of several types of bus structures selected from a memory bus or memory controller, a peripheral bus, and a local bus using any of a variety of bus architectures.

Computing system 900 typically includes a variety of computing machine-readable media. Computing machine-readable media can be any available media that can be accessed by computing system 900 and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media such as wireless channels are not included in the machine-readable media. Communication media typically embody computer readable instructions, data structures, other executable software, or other transport mechanism and includes any information delivery media. As an example, some client computing systems on the network 920 of FIG. 9 might not have optical or magnetic storage.

The system memory 930 includes computer storage media in the form of volatile and/or nonvolatile memory such as read only memory (ROM) 931 and random access memory (RAM) 932. A basic input/output system 933 (BIOS) containing the basic routines that help to transfer information between elements within the computing system 900, such as during start-up, is typically stored in ROM 931. RAM 932 typically contains data and/or software that are immediately accessible to and/or presently being operated on by the processing unit 920. By way of example, and not limitation, FIG. 9 illustrates that RAM 932 can include a portion of the operating system 934, application programs 935, other executable software 936, and program data 937.

The computing system 900 can also include other removable/non-removable volatile/nonvolatile computer storage media. By way of example only, FIG. 9 illustrates a solid-state memory 941. Other removable/non-removable, volatile/nonvolatile computer storage media that can be used in the example operating environment include, but are not limited to, USB drives and devices, flash memory cards, solid state RAM, solid state ROM, and the like. The solid-state memory 941 is typically connected to the system bus 921 through a non-removable memory interface such as interface 940, and USB drive 951 is typically connected to the system bus 921 by a removable memory interface, such as interface 950.

The drives and their associated computer storage media discussed above and illustrated in FIG. 9, provide storage of computer readable instructions, data structures, other executable software and other data for the computing system 900. In FIG. 9, for example, the solid state memory 941 is illustrated for storing operating system 944, application programs 945, other executable software 946, and program data 947. Note that these components can either be the same as or different from operating system 934, application programs 935, other executable software 936, and program data 937. Operating system 944, application programs 945, other executable software 946, and program data 947 are given different numbers here to illustrate that, at a minimum, they are different copies.

A user may enter commands and information into the computing system 900 through input devices such as a keyboard, touchscreen, or software or hardware input buttons 962, a microphone 963, a pointing device and/or scrolling input component, such as a mouse, trackball or touch pad. The microphone 963 can cooperate with speech recognition software. These and other input devices are often connected to the processing unit 920 through a user input interface 960 that is coupled to the system bus 921, but can be connected by other interface and bus structures, such as a parallel port, game port, or a universal serial bus (USB). A display monitor 991 or other type of display screen device is also connected to the system bus 921 via an interface, such as a display interface 990. In addition to the monitor 991, computing devices may also include other peripheral output devices such as speakers 997, a vibrator 999, and other output devices, which may be connected through an output peripheral interface 995.

The computing system 900 can operate in a networked environment using logical connections to one or more remote computers/client devices, such as a remote computing system 980. The remote computing system 980 can a personal computer, a hand-held device, a server, a router, a network PC, a peer device or other common network node, and typically includes many or all of the elements described above relative to the computing system 900. The logical connections depicted in FIG. 9 can include a personal area network ("PAN") 972 (e.g., Bluetooth®), a local area network ("LAN") 971 (e.g., Wi-Fi), and a wide area network ("WAN") 973 (e.g., cellular network), but may also include other networks. Such networking environments are commonplace in offices, enterprise-wide computer networks, intranets and the Internet. A browser application may be resident on the computing device and stored in the memory.

When used in a LAN networking environment, the computing system 900 is connected to the LAN 971 through a network interface or adapter 970, which can be, for example, a Bluetooth® or Wi-Fi adapter. When used in a WAN networking environment (e.g., Internet), the computing system 900 typically includes some means for establishing communications over the WAN 973. With respect to mobile telecommunication technologies, for example, a radio interface, which can be internal or external, can be connected to the system bus 921 via the network interface 970, or other appropriate mechanism. In a networked environment, other software depicted relative to the computing system 900, or portions thereof, may be stored in a remote memory storage device. By way of example, and not limitation, FIG. 9 illustrates remote application programs 985 as residing on remote computing device 980. It will be appreciated that the network connections shown are examples and other means of establishing a communications link between the computing devices may be used.

It should be noted that the present design can be carried out on a computing system such as that described with respect to FIG. 9. However, the present design can be carried out on a server, a computing device devoted to message handling, or on a distributed system in which different portions of the present design are carried out on different parts of the distributed computing system.

In some embodiments, software used to facilitate algorithms discussed herein can be embodied onto a non-transitory machine-readable medium. A machine-readable medium includes any mechanism that stores information in a form readable by a machine (e.g., a computer). For example, a non-transitory machine-readable medium can include read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a selfconsistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, Java, HTTP, C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

FIGS. 10A thru 10C provide a flow diagram illustrating a method for a visual debugging tool for training one or more AI models, and/or making predictions with one or more AI models in accordance with an embodiment. As shown, the method includes a number of steps. Note, the following steps may be performed in any order where logically possible, and not all of them need to be performed.

In step 2, a graphical user interface ("GUI") for an artificial intelligence ("AI") engine is instantiated. The AI engine includes one or more AI-engine modules including an instructor module, a learner module, and a predictor module.

In step 4, the learner module trains one or more AI models on one or more concepts of a mental model.

In step 6, the instructor module coordinates with one or more data sources, including any of i) simulators, ii) random data generators, and iii) databases, for respectively training the one or more AI models on the one or more concepts of the mental model.

In step 8, a visual debugging module of the GUI is instantiated with at least a tracking component and a visualization window. The visual debugging module tracks a timeline of i) the training of the one or more AI models with the learner module and instructor module, ii) making a prediction with the one or more AI models, and iii) any combination of both. The visualization window graphically or otherwise visually shows any of 1) computations, 2) graphs, 3) data series and resulting outputs, and 4) any combination of these that correspond to what is occurring within one or more nodes of the AI models while the one or more AI models are any of i) training with the learner module, ii) predicting with the predictor module, and iii) any combination of both.

In step 10, a viewer of content in the visualization window is able to glean insight and explainability into 1) how the training of the one or more AI models is making headway while the training is occurring and arriving at various states and/or 2) why the one or models are making a particular prediction when the particular prediction is in a process of being made. The insights and explainability into 1) how the training of the one or more AI models is making headway while the training is occurring and arriving at various states and/or 2) why the one or models are making a particular prediction when the particular prediction is in a process of being made allows the viewer to take actions to decrease a duration of a training session or a prediction; and accordingly, decrease computing cycles, compared to waiting until an entire training session or prediction process has fully completed.

In step 12, the visualization window for each AI model of the one or more AI models at least includes a first tab and a real-time plot of the one or more data series while the training of that AI model is occurring.

In step 14, the real-time plot includes plotting discrete or continuous plots depending upon the data series having discrete or continuous variables. The data series are data series selected from a group consisting of i) actions taken by the AI model, ii) states of a simulator as a data source for that AI model, iii) functions related to the training of that AI model, and iv) any combination of these.

In step 16, the real-time plot of the one or more data series while the training of that AI model is occurring may include a plot of two or more different data series independently selectable by the viewer at any time during the training of that AI model. The plot of the two different data series are shown together in real time during the training. Additionally, the plot may be of at least one composite data series formed as a function of difference between two different data series independently selectable by the viewer at any time during the training of that AI model.

In step 18, the first tab of the visualization window may include a plot of the one or more data series as a scrolling multi-episode plot. The multi-episode plot can be paused when the pause button of the first tab is activated to allow the viewer to further glean the insight and the explainability into the training of that AI model for an indefinite amount of time by looking at the visually displayed information without pausing the actual training or any of its training cycles for that AI model.

In step 20, the tracking component may track a timeline of a simulation or other training session and record corresponding information of the 1) computations, 2) graphs, 3) data series and resulting outputs, and 4) any combination of these in a memory. The visual debugging module captures the information of the 1) computations, 2) graphs, 3) data series and resulting outputs, and 4) any combination of these for the simulation and show the information visually both 1) while the simulation or other training source is running as well as 2) when a recording of the timeline with the information visually being shown is requested to be played back on the GUI.

In step 22, the visual debugging module may plot the plot of the one or more data series during the training of the AI model. The plot may include two or more different data series independently selectable by the viewer at any time during the training of that AI model, including while the plot is paused on a particular episode in a set of the multi-episodes of training.

In step 24, either data series of the two or more different data series can be changed by the viewer to at least a third different data series while the plot is paused on the particular episode in the set of training episodes. This further enables the viewer to glean the insight and the explainability into the training of the AI model from the different data series during the particular episode of training by viewing the displayed content in the visualization window and the plots.

In step 26, the visualization window for each AI model of the one or more AI models further includes a second tab. The second tab may include a rendering of a graphic of a metagraph including the one or more concepts of the mental model being learned by that AI model.

In step 28, the graphic of the second tab includes providing data going into and out of the metagraph. The data corresponds to one or more selected data series for actions taken for that AI model, states of a simulator for that AI model, functions related to the training of that AI model over time, and any combination of these. The plotting in the first tab of that plot of the one or more data series during the training of that AI model may include, for example, the one or more viewer selected data series.

In step 30, the visual debugging module may capture the data going into and out of the metagraph for at least a multi-episode set of training episodes for training that AI model in a time-series database.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. A computing device, comprising:
   a processor; and
   a memory comprising instructions executable by the processor to
   instantiate an artificial intelligence (AI) engine configured to perform one or more of training an AI model with training data received from a training source and outputting a prediction via the AI model once trained based on input data received from a data source; and
   instantiate a visual debugging module configured to receive one or more of training tracking information from the AI engine while the AI model is being trained by the AI engine and prediction tracking information from the AI engine while the AI model is generating the prediction, track a progress of one or both of the training of the AI model while the AI model is being trained based on the training tracking information and the generation of the prediction via the AI model while the AI model generates the prediction based on the prediction tracking information, and output a user interface comprising a visualization window configured to visually represent the progress of one or both of the training of the AI model while the AI model is being trained, and the prediction generated via the AI model while the AI model generates the prediction, wherein the visualization window includes a graphical representation of one or more of the training tracking information and the prediction tracking information.

2. The computing device of claim 1, wherein the visualization window comprises a graph configured to plot the training data used to train the AI model.

3. The computing device of claim 2, wherein the graph is configured to continuously plot the training data during training.

4. The computing device of claim 3, wherein the visualization window further comprises a pause button selectable to pause plotting of the training data.

5. The computing device of claim 2, wherein the graph is configured to plot two or more data series, each data series selectable via a respective menu.

6. The computing device of claim 2, wherein the instructions are executable to scroll the graph from a beginning of the training data to an end of the training data.

7. The computing device of claim 1, wherein the visualization window further comprises a metagraph including one or more concepts of a mental model learned by the AI model.

8. The computing device of claim 7, wherein the visualization window is configured to visually represent data going into and out of the metagraph.

9. The computing device of claim 1, wherein the visualization window further comprises a training toggle selectable to pause the training of the AI model.

10. The computing device of claim 1, wherein the visualization window is configured to display information regarding a calculation made during one or both of the training of the AI model and the generating of the prediction via the AI model.

11. The computing device of claim 1, wherein the visualization window is configured to display an estimate of completion of the training of the AI model.

12. The computing device of claim 1, wherein the visualization window is configured to visually represent which of one or more nodes of the AI model are being trained.

13. At a computing device, a method, comprising:
    performing one or more of training an artificial intelligence (AI) model with training data received from a training source and outputting a prediction via the AI model once trained based on input data received from a data source;
    receiving one or more of training tracking information while the AI model is being trained and prediction tracking information while the AI model is generating the prediction;
    tracking a progress of one or both of training of the AI model while the AI model is being trained based on the training tracking information and generation of the prediction via the AI model while the AI model generates the prediction based on the prediction tracking information; and
    outputting a user interface comprising a visualization window configured to visually represent the progress of one or both of the training of the AI model while the AI model is being trained, and the generation of the prediction via the AI model while the AI model generates the prediction, wherein the visualization window includes a graphical representation of one or more of the training tracking information and the prediction tracking information.

14. The method of claim 13, wherein the visualization window comprises a graph configured to plot the training data used to train the AI model.

15. The method of claim 13, wherein the visualization window further comprises a metagraph including one or more concepts of a mental model learned by the AI model.

16. The method of claim 13, wherein the visualization window further comprises a training toggle selectable to pause the training of the AI model.

17. The method of claim 13, wherein the visualization window is configured to display information regarding a calculation made during one or both of the training of the AI model and the determining of the prediction via the AI model.

18. The method of claim 13, wherein the visualization window is configured to visually represent which of one or more nodes of the AI model are being trained.

19. A computing device, comprising:
a display;
a processor; and
a memory comprising instructions executable by the processor to
instantiate an artificial intelligence (AI) engine configured to perform one or more of training an AI model with training data received from a training source and outputting a prediction via the AI model once trained based on input data received from a data source; and
instantiate a visual debugging module configured to receive one or more of training tracking information from the AI engine while the AI model is being trained by the AI engine and prediction tracking information from the AI engine while the AI model is the generating the prediction, track a progress of one or both of the training of the AI model while the AI model is being trained based on the training tracking information and the generation of the prediction via the AI model while the AI model generates the prediction based on the prediction tracking information, and output, at the display, a user interface comprising a visualization window configured to visually represent the progress of one or both of the training of the AI model while the AI model is being trained, and the prediction generated via the AI model while the AI model generates the prediction, the visualization window comprising a graph configured to plot the training data used to train the AI model.

20. The computing device of claim 19, wherein the visualization window is configured to display information regarding a calculation made during one or both of the training of the AI model and the generation of the prediction via the AI model.

* * * * *